(12) United States Patent
Harel

(10) Patent No.: US 6,384,843 B1
(45) Date of Patent: *May 7, 2002

(54) APPARATUS AND METHODS FOR ANALYZING SOFTWARE SYSTEMS

(75) Inventor: Avraham Harel, Haifa (IL)

(73) Assignee: Ergolight Ltd., Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 09/478,758

(22) Filed: Jan. 6, 2000

Related U.S. Application Data

(62) Division of application No. 09/273,382, filed on Mar. 22, 1999, now Pat. No. 6,118,447, which is a continuation of application No. 08/870,810, filed on Jun. 6, 1997, now Pat. No. 6,064,381.

(30) Foreign Application Priority Data

Dec. 3, 1996 (IL) ................................................ 119746

(51) Int. Cl.[7] .................................................. G06F 3/14
(52) U.S. Cl. ...................................... 345/762; 345/764
(58) Field of Search ................................ 345/333, 334, 345/335, 336, 337, 338, 339, 762, 765, 744, 705, 707, 764; 419/118, 119; 703/22, 23

(56) References Cited

U.S. PATENT DOCUMENTS 4,500,964 A    2/1985    Nickle (List continued on next page.)

FOREIGN PATENT DOCUMENTS

| EP | 0 566 228 | 10/1993 |
|---|---|---|
| EP | 687988 | 12/1995 |
| WO | WO 95/16949 | 6/1995 |

OTHER PUBLICATIONS

Microsoft Visual Basic 5.0 Reference Library: Programmer's Guide, Microsoft Press pp. 40, 41, 150–152, 663–669, Jan. 1997.*

C.A. Smith, "Agent Function for Viewpoint–Like Interfaces", Xerox Disclosure Journal, vol. 19, No. 6, p. 481, XP000484368.

Research Disclosure, "Method for Guiding Users Through an Application", Jun. 1993, No. 350, Emsworth, GB, p. 429.

Primary Examiner—Cao H. Nguyen
(74) Attorney, Agent, or Firm—Abelman, Frayne & Schwab

(57) ABSTRACT

Computerized apparatus for identifying human difficulties in operating a computerized system, the apparatus including a human difficulty identifier operative to identify putative instances of an end user's experience of difficulty in operating the computerized system, an operation recorder operative to store a record of the end user's operations during each such putative instance, an intention recorder operative to prompt an end user to indicate his intention during each such putative instance and to store the intention in association with the record of operations for the putative instance and an output generator operative to generate an output indication of the record of operations and of the end user's intention for each of the putative instances of experiences of difficulty.

23 Claims, 77 Drawing Sheets

Microfiche Appendix Included
(6 Microfiche, 575 Pages)

U.S. PATENT DOCUMENTS

| | | | |
|---|---|---|---|
| 4,772,206 A | * | 9/1988 | Kevu et al. |
| 4,941,829 A | * | 7/1990 | Eates et al. |
| 5,086,393 A | | 2/1992 | Kerr et al. |
| 5,220,658 A | | 6/1993 | Kerr et al. |
| 5,321,611 A | | 6/1994 | Clark et al. |
| 5,433,615 A | | 7/1995 | Clark |
| 5,437,554 A | | 8/1995 | Clark et al. |
| 5,465,358 A | | 11/1995 | Blades et al. |
| 5,481,667 A | | 1/1996 | Bieniek et al. |
| 5,485,569 A | * | 1/1996 | Goldman et al. |
| 5,490,249 A | | 2/1996 | Miller |
| 5,493,658 A | | 2/1996 | Chiang et al. |
| 5,513,994 A | | 5/1996 | Kershaw et al. |
| 5,535,422 A | | 7/1996 | Chiang et al. |
| 5,565,316 A | | 10/1996 | Kershaw et al. |
| 5,566,291 A | | 10/1996 | Boulton et al. |
| 5,581,684 A | | 12/1996 | Dudzik et al. |
| 5,590,057 A | | 12/1996 | Fletcher et al. |
| 5,590,330 A | * | 12/1996 | Coskun et al. |
| 5,600,789 A | | 2/1997 | Parker et al. |
| 5,627,958 A | | 5/1997 | Potts et al. |
| 5,651,108 A | * | 7/1997 | Cain et al. .................. 345/763 |
| 5,675,510 A | | 10/1997 | Coffey et al. |
| 5,696,914 A | * | 12/1997 | Nahaboo et al. ............ 345/763 |
| 5,850,548 A | * | 12/1998 | Williams |
| 5,936,614 A | * | 8/1999 | An et al. |

* cited by examiner

| Filter for previous definitions | | |
|---|---|---|
| Process | Find String ▾ | Previous Definitions of  [0] |
| Src Diabox | Main ▾ | Standard Operation |
| Tgt Diabox | Find ▾ | Name |
| Menu Bar | Edit ▾ | |
| Menu Item | Find ▾ | |
| Popup | ▾ | |
| Button | ▾ | |
| Toolbar | ▾ | |
| Key | | ◄ ► + −         OK |

Fig. 15

Define Main Tasks

Table   Row              Quit!

| ID | Main user tasks | Children |
|---|---|---|
| 1 | Typing and Editing | 4 |
| 2 | Formatting Text | 5 |
| 3 | Page Design and Layout | 6 |
| 4 | Working with Long Documents | 4 |
| 5 | File Management | 3 |
| 6 | Using Word in a Workgroup | 2 |
| 7 | Using Word with other Applications | 3 |
| 8 | Assembling Documents with Mail Merge | 2 |
| 9 | Automating Your Work | 3 |

[Add Row]    [Specify Sub Tasks]    [OK]

Fig. 16

Define Sub Tasks

Table   Row            Quit!

Main Task   | Typing and Editing |

| ID | Text | Goal |
|----|------|------|
| a | Typing and Revising | 44 |
| b | Finding and Replacing | 13 |
| c | AutoCorrect and AutoText: Reusing Text ar | 1 |
| d | Editing and Proofing Tools | 1 |

[ Add Row ]   [ Specify Goals ]   [ OK ]

Fig. 17

Goal Definition

Table   Row            Quit!

Sub Task    | Finding and Replacing |

Main Task   | Typing and Editing |

| ID | Text | Method |
|----|------|--------|
| a | Finding and replacing text and formatting | 1 |
| b | ------------------------------------------- | 0 |
| c1 | Finding text without formatting | 1 |
| c2 | Finding text with formatting | 1 |
| c3 | Formatting Text | 0 |
| d | Replacing text and formatting | 0 |
| e | Finding and replacing text by using adva | 0 |

[ Add Row ]   [ Specify Methods ]   [ OK ]

Fig. 18

Method Definition

Table  Row         Quit!

Goal      | Finding text without formatting |

Sub Task  | Finding and Replacing |

Main Task | Typing and Editing |

| ID | Text | Step |
|----|------|------|
| a  | Use the Find dialog box | 5 |

[ Add Row ]    [ Specify Procedure ]    [ OK ]

Fig. 19

Procedure Definition

Table  Row         Quit!

Method    | Using the Find dialog box |

Goal      | Finding text without formatting |

Sub Task  | Finding and Replacing |

Main Task | Typing and Editing |

| Step | Text | Operation |
|------|------|-----------|
| 5 | Finish | |
| 4 | Find more instances | |
| 3 | Find first instance | |
| 2 | Enter the text to find | |

Operation
- ○ Move Cursor
- ○ Click Mouse
- ○ Select
- ○ Drag_Drop
- ○ Standard
- ○ Keyboard
- ○ Other

[ Add Row ]  [ EditFind ]  [ Specify Operation ]  [ OK ]

Fig. 20

| Set New Trigger | |
|---|---|
| Step | |
| Process | ▼ |
| Src Diabox | ▼ |
| Tgt Diabox | ▼ |
| Menu Bar | ▼ |
| Menu Item | ▼ |
| Popup | ▼ |
| Button | ▼ |
| Toolbar | ▼ |
| Key | ▼ |
| Trigger ID | ▼ |
| In Range | eCou | OK |

Fig. 21

Standard Operation ...

| | |
|---|---|
| Operation | |
| Process | |
| Src Diabox | Main |
| Tgt Diabox | Find |
| Menu Bar | |
| Menu Item | Find |
| Popup | |
| Button | |
| Toolbar | |
| Key | Ctrl + F |

[Change]  [Apply]

Fig. 22

Controlling ErgoTest Intervention

Dialog Box Filter [ ]

| Problem Indicator | Type |
|---|---|
| User Initiated | Manual |
| Context Information | Help |

Dialog Box [ ]
Menu Bar [ ]
Menu Item [ ]
Popup [ ]
Button [ ]
Hot Key [ F1 ]
Bypass [ Shift + F1 ]

Testing the Specification Integrity

| Sub Tasks with no Goals | Redundant Triggers |
| Goals with no Methods | From Trigger to Task |
| Methods with no Steps | Conflicts |
| Steps without Operations | Modes |
| Missing Triggers | Controls |

Sub Tasks that do not have Goals

Filter: Number of Goals [0] Total Sub Tasks [25]

| Main | Sub | Text |
|---|---|---|
| 3 | 1 | Page Setup: Margins, Page Numbers, and Other |
| 4 | 1 | Outlining and Organizing a Document |
| 5 | 1 | Opening, Saving, and Protecting Documents |
| 7 | 1 | Converting File formats |
| 8 | 1 | Mail Merge: Step by Step |

Main Task [Page Design and Layout] [Goto ...] [OK]

Fig. 25

Goals that do not have methods

Filter: Number of Methods [0] Total Goals [55]

| Main | Sub | Id | Text |
|------|-----|----|----|
| 1 | a | A | Typing text |
| 1 | a | B | ---------------------- |
| 1 | a | C | Inserting text into a document |
| 1 | a | D | Typing over existing text |
| 1 | a | E | Starting a new paragraph |

Sub Task: Formatting Text Characters
Main Task: Formatting Text

[Goto ...] [OK]

Fig. 26

Methods that have no procedure

Filter: Number of Steps [0] Total Methods [2]

| Main | Sub | Goal | Id | Text |
|------|-----|------|----|----|
| 5 | 3 | 1 | 1 | Using the Print dialog box |
| 2 | 1 | - | b | Using the toolbar fields |

Goal: Formatting font style, size, color, ...
Sub Task: Formatting Text Characters
Main Task: Formatting Text

[Goto ...] [OK]

Fig. 27

| Steps with no operation defined | |
|---|---|
| Main Task | Formatting Text |
| Sub Task | Formatting Text Characters |
| Goal | Formatting font style, size, color, ... |
| Method | Using the Find dialog box |
| Step 5 | Finish |

|◀◀ ◀ ▶ ▶▶| Total 6  Goto ...  OK

Fig. 28

| Standard operation, not specified ... | |
|---|---|
| Main Task | Formatting Text |
| Sub Task | Formatting Text Characters |
| Goal | Formatting font style, size, color, ... |
| Method | Using the Find dialog box |
| Step 1 | Open the Find dialog box |

|◀◀ ◀ ▶ ▶▶| Total 9  OK

Fig. 29

| Task Missing | | |
|---|---|---|
| Trigger ID | Source Box | FormatFont |
| EditFind | Target Box | Main |
| EditCut | Process | |
| CancelFormatFont | Menu Bar | |
| CancelFind | Menu Item | |
| FormatButton | Popup | |
| FindFormatClear | Button | Cancel |
| FindNext | Toolbar | |
| EditPaste | Shortcut Key | Esc |

Total 9  OK

Fig. 30

| Task accomplished by Standard Op ... | |
|---|---|
| Operation | EditFind |
| Main Task | Formatting Text |
| Sub Task | Formatting Text Characters |
| Goal | Formatting font style, size, color, ... |
| Method | Using the Find dialog box |
| Step 5 | Finish |
| Total | eTotalN |

Details

User Class [Frequent ▼]

| User | Sessions |
|---|---|
| James | 20 |
| Paul | 5 |

User
- ☐ on delay
- ☐ on Cancel
- ☑ On Help
- ☑ On Undo

[Use Default]

Testing Status

[User Class] [Frequent ▼]

| User | NuSessions | SessionNu | NuProblems |
|---|---|---|---|
| James | 20 | 5 | 0 |
| Paul | 5 | 6 | 0 |

[Restart Problem Report]    [OK]

Fig. 36

```
Monitor the testing of your SW pr...
```

|  | Demo.exe | ☑ on Help |
|---|---|---|
|  | Abe | ☑ on Cancel |
|  |  | ☑ On Undo |

☑ On Delay of [30] Sec

☐ Clear ActionTbl    ☑ Show Mockup
☐ Clear ProblemTbl   [ Start ]

☑ Timer  [1 ⇅]   [ Test ]

Actual delay [XX]   [ Quit ]

Last Action [30/12/99 21:27:37]  [ Actions ]
Last Report [30/12/99 13:04:20]  [ Problems ]

Fig. 37

```
Identify yourself
```

Your class  [Naive  ▼]
Your name   [Abe    ▼]

| Sessions planned | 3 |
| Sessions passed | 1 |
| This Session | 2 |
| Problems reported | 0 |
| Your own reports | 0 |
| To avoid prompt | 5 |

Problem Viewer

| Time |
|---|
| 30/12/99 13:04:20 |
| 30/12/99 13:17:59 |
| 30/12/99 13:30:00 |
| 30/12/99 13:35:17 |
| 30/12/99 20:40:04 |
| 30/12/99 20:47:59 |
| 30/12/99 20:48:23 |
| 30/12/99 20:54:20 |
| 30/12/99 22:28:21 |
| 30/12/99 23:06:14 |
| 30/12/99 23:17:40 |

Main Task ☐ _____

Sub Task ☐ Formatting Text Character

Goal ☐ Format font style, size, color

Method ☐ Using the Find dialog box

Step ☐ Finish

Problem  New test

Intended operation
Toolbar button

Actual Actions

Autohelp

Beta-spy has noticed a delay in your response.

Beta-Guide can help you if this delay
is because of problems in understanding

[Guide]   [Ignore]

Timeout for next   [30] seconds

Fig. 42

| Please specify your main task |
|---|
| I was trying to (select from the list below ...) |

| Id | Double click your intended main task |
|---|---|
| 1 | Typing and Editing |
| 2 | Formatting Text |
| 3 | Page Design and Layout |
| 4 | Working with Long Documents |

Is the task found in the list above?
- ● Not found: Specify your task
  [                    ]   [ Report ]
- ○ The task is in the list (Select!)
  [Typing and Editing]   [ Tips ]

[ Cancel ]

Task Not Found

Problem in: [Print a letter]

Please specify where you looked for the procedure:
- ☐ I ran the Tutorial
- ☐ I looked at the Help/Contents menu item
- ☐ I looked at the Help/Search menu item
- ☐ I looked at the User's Guide

[ Inform ]   [ OK ]

Fig. 50

| Please fill in the following form: |
|---|

Sub task of [Finding and Replacing] □

Specifically, I wanted to (select from list below)

| Double click the intended sub task |
|---|
| Finding and replacing text and formatting |
| Finding text without formatting |
| Finding text with formatting |
| Formatting text |
| Replacing text and formatting |

┌─ Goal found? ─────────────────────────────
│ ○ I cannot see the goal in the list above. My goal is
│ ● The goal is in the list (select above!)
│ [Finding text without formatting]   [but ...]

Fig. 53

| Please fill in the following form: |
|---|

Goal [Finding text without formatting] □

Specifically, I wanted to use ...

| Double click the methods you intended to use |
|---|
| Using the Find dialog box |

┌─ Method found? ───────────────────────────
│ ○ I cannot see the method in the list above
│ ● The method is in the list (select above!)
│ [Using the Find dialog box]   [but ...]

Fig. 54

Please fill in the following form:

Method  [Using the Find dialog box]  [ ]

Specifically, I wanted to invoke ...

| # | Double click the procedure step you tried |
|---|---|
| 1 | Open the Find dialog box |
| 2 | Enter the text to find |
| 3 | Find the first instance |
| 4 | Find more instances |

Operation found?
- ○ I cannot see the operation in the list
- ● The operation is in the list (select above!)

[Open the Find dialog box]  [but ...]

Fig. 55

What control did you tr...

Procedure step

[Open the Find dialog box]

Please specify your action

Operation
- ○ Menu Bar  [Edit]  [ ]
- ○ Popup menu  [ ]
- ○ Dialog button  [Clear Format]
- ○ Toolbar button  [ ]
- ○ Shortcut key  [Esc]
- ○ Other

[Inform]  [OK]

Fig. 56

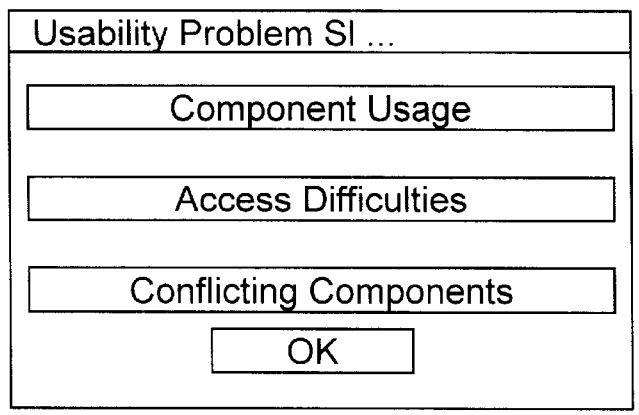
Fig. 57
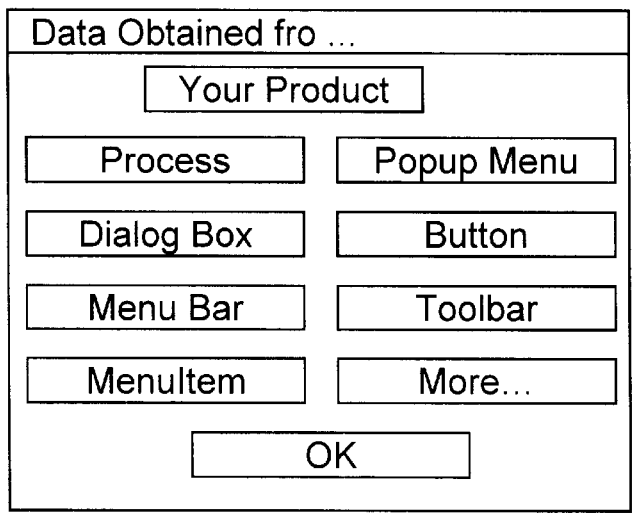
Fig. 58
| Processes | |
|---|---|
| Process | Usage |
| CutToClipboard | 0 |
| CopyToClipboard | 0 |
| PasteFromClipboard | 0 |
| FindString | 0 |
| ChangeFont | 0 |
OK
Fig. 59

| Dialog Box | Usage |
|---|---|
| Main | 98 |
| FormatFont | 0 |
| Find | 3 |
| Replace | 0 |

Dialog Boxes

Fig. 60

Menu Bar

Dialog Box: Main

| Text | Usage |
|---|---|
| Edit | 30 |
| File | 21 |
| Window | 3 |
| View | 4 |
| Format | 2 |

Fig. 61

| MenuItemForm | | |
|---|---|---|
| Box | Main | |
| Bar | Edit | |
| # | Menu Text | Usage |
| 1 | Undo | 12 |
| 2 | Repeat | 2 |
| 3 | | |
| 4 | Cut | 1 |
| 5 | Copy | 0 |
| 6 | Paste | 1 |
| 7 | Paste Special | 0 |

| Popup menu Resources | | |
|---|---|---|
| Box | Find | |
| # | Name | Usage |
| | | |

Button Resources

Box: Find

| Name | Usage |
|---|---|
| Format | 0 |
| Clear Format | 0 |
| Cancel | 11 |

Toolbar Resourc...

Dialog Box: Main

| # | Toolbar Button | Usage |
|---|---|---|
|  | sbFileOpen | 0 |
|  | sbFileNew | 0 |
|  | sbFileSave | 0 |
|  | sbEditCut | 0 |
|  | sbEditCopy | 0 |
|  | sbEditPaste | 0 |

| Summary of conflicts of Windows controls | | |
|---|---|---|
| Control Type<br>○ Menu Bar<br>○ Popup menu<br>○ Dialog Button<br>○ Toolbar Button<br>○ Hot Key | User  Daisy | Session  4 |
| | Active Form | Main Form |
| | Active Control | Memo1 |
| | Actual Control | Edit1 |
| Operation<br>Toolbar button<br>Dialog button<br>Popup menu<br>Shortcut key | Main Task | Typing and Editing |
| | Sub Task | Finding and replacing |
| | Goal | Finding text without for |
| | Method | |
| | Step | |
| | Problem | |
| View Actions | | OK |

Fig. 68

| Get Component |
| --- |

Component Captured Data

| | |
| --- | --- |
| Form | Mockup of a Word Processor |
| Caption | Read only |
| ID | Read only, TCheckBox, l-372,t-92,r68 |

Enter your own component description

| Protect text against accidental change | ✓ |
| --- | --- |

| Tasks | Debug | OK |
| --- | --- | --- |

Fig. 71

| Tasks of selected component |
| --- |

| Component ID | &Edit/&Find ... |
| --- | --- |

| Text | Main Task |
| --- | --- |
| Open the Find dialog box | Typing and Editing |
| | Sub Task |
| | Finding and Replacing |
| | Goal |
| | Finding text without for |
| | Method |
| | Using the Find dialog |

| OK |
| --- |

Fig. 72

| Hyper Spy | | |
|---|---|---|
| UI Component | | |
| Form | d Processor | ○ Form |
| Class | TCheckBox | ○ Control |
| ☑ Static | l-372,t-92,r68,b2 | ● Mode bin |
| | | ○ Menu bar |
| Caption | Read only | ○ Popup |
| Button S | Grayed | ○ Mode Key |
| Shortcut | | ○ Key |
| | | Mode Btn |
| | | Spy |
| Read only, TCheckBox, | Class | OK |

Fig. 73

| Spying the user actions | |
|---|---|
| Menu Identifier | Key Identifier |
| &Edit/&Repeat | ☐ Control  ☐ Caps Lock |
| Ctrl+Y | ☐ Alt  ☑ Insert |
| | ☐ Shift  ☑ Num Lock |
| string  &Repeat | |
| Menu Type  Menu B | k |
| Link Type  Comman | k |
| ☐ cbInMenu | |
| Tmemo.Memo Pan | Mockup of a Wor |
| Component type  Control | Debug Info  OK |

| | ID | Main User Tasks | Children |
|---|---|---|---|
| | 1 | Typing and Editing | |
| | 2 | Formatting Text | |
| | 3 | Page Design and Layout | |
| | 4 | Working with Long Documents | |
| | 5 | File Management | |
| | 6 | Using Word in a Workgroup | |
| | 7 | Using Word with other Applications | |
| | 8 | Assembling Documents with Mail Merge | |
| | 9 | Automating Your Work | |

```
Define Sub Tasks
Table   Row         Quit!
Main Task  |Typing and Editing                    |

| ID | Text                                    |
|----|-----------------------------------------|         OK
| a  | Typing and Revising                     |
| b  | Finding and Replacing                   |
| c  | AutoCorrect and AutoText: Reusing Text ar |
| d  | Editing and Proofing Tools              |

[✓][κ][+][−]  [Set Modes]  [Specify Goals]  [OK]
```

Fig. 79

```
Goal Definition
Table   Row         Quit!
Sub Task   |Finding and Replacing             |
Main Task  |Typing and Editing                |

| ID | Text                                         |
|----|----------------------------------------------|
| a  | Finding and replacing text and formatting    |
| b  |                                              |
| c1 | Finding text without formatting              |
| c2 | Finding text with formatting                 |
| c3 | Formatting Text                              |
| d  | Replacing text and formatting                |
| e  | Finding and replacing text by using advanced |

[✓][κ][+][−]  [Set Modes]  [Specify Methods]  [OK]
```

Fig. 80

| Method Definition | |
|---|---|
| Table   Row         Quit! | |
| Goal | Finding text without formatting |
| Sub Task | Finding and Replacing |
| Main Task | Typing and Editing |

| ID | Text |
|---|---|
| a | Use the Find dialog box |

✓ κ + −    Set Modes | Specify Procedure    OK

Fig. 81

| Procedure Definition | |
|---|---|
| Table   Row         Quit! | |
| Method | Using the Find dialog box |
| Goal | Finding text without formatting |
| Sub Task | Finding and Replacing |
| Main Task | Typing and Editing |

| Step | Text | Operation |
|---|---|---|
| 1 | Open the Find dialog box | Standard |
| 2 | Enter text to find | Keyboard |
| 3 | Find first instance | Standard |
| 4 | Find more instances | Standard |

✓ κ + −    Set Modes | Specify Operation    OK

Fig. 82

For better user control

How to initiate a reporting session

You can always report on operational problems.
All you need to do is just to invoke a dedicated component.

The user interface component used to initiate reporting [Ctrl+F1]
of type [Key]

How to avoid interrupting my fluent operation

You can always prevent ErgoLight from interrupting your operation. All you need to do is just to press a dedicated key combination. Next time, before activating the same user interface component that you have just activated, just press the dedicated key combination.

The key combination used to avoid interrupt [Ctrl+F2]

| Tasks of activated component | |
|---|---|
| 1  Tasks | The component you just used |
|    Show | &Edit/&Find ... |

Description

| To find a word in a document |
|---|

Task using this component.

| Main Task | Typing and Editing |
|---|---|
| Sub Task | Finding and Replacing |
| Goal | Finding text without formatting |
| Method | Using the Find dialog box |

Associated procedure step

| Open the Find dialog box |
|---|

Please specify your intention
○ as shown above, but ... [        ]  [ OK ]
○ different from the task above [ Lookup in task list ]

Fig. 96

| Please specify your main task |
|---|
| I was trying to (select from the list below ...) |

| Id | Double click your intended main task |
|---|---|
| 1 | Typing and Editing |
| 2 | Formatting Text |
| 3 | Page Design and Layout |
| 4 | Working with Long Documents |
| 5 | File Management |
| 6 | Using Word in a Workgroup |

Is the task found in the list above?

○ Not found: Specify your task

[                    ] [Report]

○ The task is in the list (Select!)

[Typing and Editing] [but ...]

[Cancel]

Fig. 97

```
┌─────────────────────────────────────────────────────┐
│ Please specify your subtask                         │
├─────────────────────────────────────────────────────┤
│ Subtask of  │File Management                      │ │
│ Specifically, I wanted to do (select from the list below) ... │
│ ┌─────────────────────────────────────────────────┐ │
│ │Double click the Sub Task intended               │ │
│ ├─┬───────────────────────────────────────────────┤ │
│ │ │Opening, Saving, and Protecting Documents      │ │
│ ├─┤                                               │ │
│ │ │Locating and Managing Documents                │ │
│ ├─┤                                               │ │
│ │ │Printing                                       │ │
│ └─┴───────────────────────────────────────────────┘ │
│                                                     │
├─Sub task found?─────────────────────────────────────┤
│ ○ I cannot see the sub task in the list above. My sub task is │
│ ┌────────────────────────────────────┐  ┌────────┐  │
│ │                                    │  │ Report │  │
│ └────────────────────────────────────┘  └────────┘  │
│ ○ The sub task is on the list (select above!)       │
│ ┌────────────────────────────────────┐              │
│ │Opening, Saving, and Protecting Docu│  ┌────────┐  │
│ └────────────────────────────────────┘  │ but ...│  │
│                                         └────────┘  │
└─────────────────────────────────────────────────────┘
```

Fig. 98

| Please specify your goal |
|---|
| Sub task  [Finding and Replacing] |
| Specifically, I wanted to do (select from the list below) ... |
| Double click your intended goal |
| Finding and replacing text and formatting |
| -------------------------------------------------- |
| Finding text without formatting |
| Finding text with formatting |

Goal
○ I cannot see the goal in the list above. My goal is ...
[                    ]  [Report]
○ The goal is on the list (select above!)
[Finding and replacing text and formatting]  [but ...]

Fig. 99

| Please specify the method you chose |
|---|
| Goal  [Opening an existing document] |
| Specifically, I wanted to use method ... |
| Double click your intended methods |
| Using the toolbar |
| Using the menu bar |

Method found?
○ I cannot see the method in the list above.
[                    ]  [Report]
○ The method is on the list (select above!)
[Using the toolbar]  [but ...]

Fig. 100

```
┌─────────────────────────────────────────────────────────┐
│ Please specify the method you chose                     │
│ Goal    │Opening an existing document            │      │
│ Specifically, I wanted to use method ...                │
│ ┌─────────────────────────────────────────────────────┐ │
│ │ │Double click your intended methods                 │ │
│ │ │Using the toolbar                                  │ │
│ │ │Using the menu bar                                 │ │
│ └─────────────────────────────────────────────────────┘ │
│ ┌─Method found?─────────────────────────────────────── │
│ │ ○ I cannot see the method in the list above.         │
│ │ ┌──────────────────────────────────┐  ┌────────┐    │
│ │ │                                  │  │ Report │    │
│ │ └──────────────────────────────────┘  └────────┘    │
│ │ ○ The method is in the list (select above!)          │
│ │ ┌──────────────────────────────────┐  ┌────────┐    │
│ │ │Using the toolbar                 │  │ but ...│    │
│ │ └──────────────────────────────────┘  └────────┘    │
└─────────────────────────────────────────────────────────┘
```

Fig. 101

```
┌─────────────────────────────────────────────────────────┐
│ Procedure Not Found - where?                            │
│ You reported that you could not find how to ...         │
│ ┌─────────────────────────────────────────────────────┐ │
│ │Changing a letter                                    │ │
│ └─────────────────────────────────────────────────────┘ │
│ ┌─Please specify where you looked for the ──────────── │
│ │ ┌─────────────────────────────────────────────┐ ▼   │
│ │ │Help/Topics                                  │     │
│ │ └─────────────────────────────────────────────┘     │
│ │                                                     │
│ │   ┌──────────┐                       ┌──────────┐   │
│ │   │  Inform  │                       │    OK    │   │
│ │   └──────────┘                       └──────────┘   │
└─────────────────────────────────────────────────────────┘
```

Fig. 102

| Possible reasons | |
|---|---|
| To execute the procedure step | Open the Find dialog box |
| you should have performed the operation: | Standard |

You could have used any of the following user interface

| Control | | Key | Ctrl+F |
|---|---|---|---|
| Menu bar | &Edit/&Find | Popup | |

However your last recorded action is

| Component | &Find... Ctrl+F | | |
|---|---|---|---|
| Class | Menu Bar | Type | Menu Bar |
| In the form whose title is: | Mockup of a Word Processor | | |
| Key | Ctrl+F | State | |

[ Inform product designers ] [ Review your last actions ] [ OK ]

Fig. 105

Sensitivity to user errors

Filter
- ○ Menu bar    ● Control
- ○ Popup Menu  ○ Shortcut

| Problems | Waste | Usage | Time |
|---|---|---|---|
| 1 | 52 | 82 | 502 |
| 3 | 32 | 14 | 61 |
| 2 | 33 | 14 | 61 |

| Field | Value |
|---|---|
| Main Task | Typing and Editing |
| Sub Task | Finding and Replacing |
| Goal | Finding text without |
| Method | Using the Find dialog |
| Step | Open the Find dialog bo |
| Form | Mockup of a Word Proc |
| Control | Ctrl+Shift+F |

Advice for re design
| Remove component |

Note for redesign
| Remove shortcut for Format Font |

Note for Help desk
| Careful with Ctrl+F and Ctrl+H |

[ Details of Selected ]                    [ OK ]

Fig. 109

Sensitivity to user errors

| Time | Waste |
|---|---|
| 17/05/97 20:41:37 | 4 |
| 17/05/97 21.:41:55 | 46 |
| 17/05/97 21:45:49 | 33 |
| 17/05/97 22:07:48 | 48 |
| 17/05/97 22:17:18 | 32 |
| 17/05/97 22:21:06 | 19 |
| 17/05/97 22:33:22 | 36 |
| 17/05/97 22:34:07 | 25 |
| 17/05/97 22:42:10 | 32 |
| 17/05/97 22:59:23 | 24 |

| Field | Value |
|---|---|
| Main Task | Typing and Editing |
| Sub Task | Finding and Replacing |
| Goal | Finding text without |
| Method | Using the Find dialog |
| Step | Open the Find dialog bo |
| Form | Mockup of a Word Proc |
| Control | Ctrl+Shift+F |
| Report | Wrong component |

[ Action Back Track ]

| Back Track the User Actions | | |
|---|---|---|
| Problem Data | | |
| Mockup of a Word Processor | | |
| 16/05/97 9:30:54 | Control | |
| | | |
| Time | Type | Caption |
| 17/05/97 21:40:56 | Control | |
| 17/05/97 21:41:44 | Control | |
| 17/05/97 21:41:47 | Menu B | &New ... Ctrl+N |
| 17/05/97 21:41:49 | Key | Ctrl+Shift+1 |
| | | OK |

Fig. 111

| Problems in the task breakdown | | | |
|---|---|---|---|
| Count | Waste | Main Task | File Management |
| 28 | 661 | Sub Task | Printing |
| 6 | 138 | Redesign | Add main task: Printing |
| 2 | 46 | Help desk | Menu File/Print |
| Details of Selected | | | OK |

Fig. 112

Global term change

| Time | User task in user terms |
|---|---|
| 6 | Can the computer draw graphs for me? |
| 40 | How can I print a letter? |
| 25 | I need to print a letter |

User term [letter]       [Modify]

Global term change

Change type [letter]
Change type [document]

Change type
○ Replace
● Add

Domain to change
● MainTask
○ SubTask
○ Goal

New term
[document/letter]

[◄◄] [◄] [►] [►►] [+] [−] [▲] [✓] [κ] [ϲ]    [0]

Current text
[Print a letter]

Buffer  [↓ To Buffer]                [↑ Change]
[Print a document/letter]

| Problems in knowing the operation procedure | | | |
|---|---|---|---|
| Count | Waste | \multicolumn{2}{l|}{User documentation source} |
| 1 | 19 | \multicolumn{2}{l|}{Tutorial ⇕   Refresh} |
| 1 | 20 | Main Task | Typing and Editing |
| | | Sub Task | Finding and Replacing |
| | | Goal | Finding text without |
| | | Redesign | Add toolbar button for Find |
| | | Help desk | Refer to Edit/Find |
| \multicolumn{2}{|l|}{Details of Selected} | | OK |

Fig. 115

| Problems in procedure knowledge | | | |
|---|---|---|---|
| Time | Waste | Main Task | |
| | | Sub Task | |
| | | Goal | |
| | | Method | |
| | | User Doc | |
| | | Report | |
| | | \multicolumn{2}{c|}{Action Back Track} |
| | | ⏮ ◀ ▶ ⏭ — | OK |

Fig. 116

| Summary of Mode Errors | |
|---|---|
| Errors Waste Usage<br>0　　0<br>1　　32　　1<br>4　　80　　23 | Main Task [Typing and Editing]<br>Sub Task [　　]<br>Goal [　　]<br>Method [　　]<br>Step [　　]<br>Form [Mockup of a Word]<br>Control [Read only]<br>Advice<br>　[Avoid automated mode set]<br>Note for re design<br>　[Remove default value setting]<br>Note for Help desk<br>　[Before editing, always uncheck] |
| [Details of Selected] | [OK] |

Fig. 117

| Mode errors | |
|---|---|
| Time　　　　　　　Waste<br>22/05/97 13:41:53　　28<br>22/05/97 12:47:11　　27<br>22/05/97 12:47:45　　20<br>22/05/97 12:48:08　　10 | Main Task [Typing and Editing]<br>Sub Task [　　]<br>Goal [　　]<br>Method [　　]<br>Step [　　]<br>Form [Mockup of a Word Proc]<br>Control [Read only]<br>Value is [Checked]<br>Should [Never]<br>Be [Checked] |
| [◀◀][◀][▶][▶▶][−] | [Action Back Track] [OK] |

Fig. 118

Technical Support

User reported Intention

Main Task [Typing and Editing ▼]
[Not found]

Sub Task [Finding and Replacing ▼]
[Not found]

Goals and Terminology

[                    ]

Degree [23]  [Previous problem reports]

[Goal identified]

Technical Support

User reported Intention

Main Task [Typing and Editing]
Sub Task [Finding and Replacing]
Goal     [Finding text without ▼]

Problems in procedure knowledge

[Refer to Edit/Find]

Defective information source [Tutorial]
[Previous problem reports]
[Procedure Identified]

| Technical Support | |
|---|---|
| User Reported Intention | |
| Main Task | Typing and Editing |
| Sub Task | Finding and Replacing |
| Goal | Finding text without |
| Method | Using the Find dialog box ▼ |
| Step | Open the Find dialog box ▼ |

[ Associated Components ]   [ OK ]

Fig. 121

| Associated Components |
|---|
| Procedure step |
| Open the Find dialog box |
| Associated operation |
| Standard |

| Associated | |
|---|---|
| Control | |
| Menu bar | &Edit/&Find ... |
| Key | Ctrl+F |
| Popup | |

| Help by user action | |
|---|---|
| Form | Mockup of a Word Processor ▾ |

Components used for operation
- ○ Menu bar
- ● Key    | Ctrl+Shift+F ▾ |
- ○ Control

| Associated reported problems | OK |

Fig. 123

APPARATUS AND METHODS FOR ANALYZING SOFTWARE SYSTEMS

CROSS-REFERENCE TO RELATED APPLICATIONS

This Application is a division of application Ser. No. 09/273,382, now U.S. Pat. No. 6,118,447, filed on Mar. 22, 1999, which is a continuation of application Ser. No. 08/870,810, now U.S. Pat. No. 6,064,381, filed on Jun. 6, 1997.

FIELD OF THE INVENTION

The present invention relates to apparatus and methods for analyzing software systems.

BACKGROUND OF THE INVENTION

Conventional sources of information for development and maintenance of computer system regarding its usability, include its end users, e.g. in beta sites, testing groups, and professional observers operating in usability labs. Collection of this usability information is typically performed manually and non-systematically and consequently suffers from defects such as disregarding a multiple of seemingly minor usability problems.

Prior art regarding the usability of computerized systems include those described in U.S. Pat. No. 4,500,964 to Nickle, U.S. Pat. No. 5,086,393 to Kerr et al, U.S. Pat. No. 5,220,658 to Kerr et al, U.S. Pat. No. 5,590,330 to Coskun and Tate, U.S. Pat. No. 5,600,789 to Parker et al., Published European Application 0 687 988 A2 (95303298.4) to AT&T, and Published PCT Application WO 95/16949 to Software Publishing Corporation.

Other prior art systems and technologies are described in the following U.S. Patents: U.S. Pat. No. 5,490,249 to Miller, U.S. Pat. No. 5,565,316 to Kershaw et al, U.S. Pat. No. 5,566,291 to Boulton et al, U.S. Pat. No. 5,321,611 to Clark and Bramlett, U.S. Pat. No. 5,513,994 to Kershaw and Romano, U.S. Pat. No. 5,433,615 to Clark, U.S. Pat. No. 5,437,544 to Clark et al, U.S. Pat. No. 5,590,057 to Fletcher and Ruuska, U.S. Pat. No. 5,581,684 to Dudzik et al, U.S. Pat. No. 5,627,958 to Potts and Vershel, U.S. Pat. No. 5,535,422 to Chiang et al, U.S. Pat. No. 5,481,667 to Bieniek et al, U.S. Pat. No. 5,465,358 to Blades and Kiel.

The disclosures of all publications mentioned in the specification and of the publications cited therein are hereby incorporated by reference.

SUMMARY OF THE INVENTION

The present invention seeks to provide improved apparatus and methods for analyzing usability problems in computerized systems.

There is thus provided, in accordance with a preferred embodiment of the present invention, computerized apparatus for identifying human difficulties in operating a computerized system, the apparatus including a human difficulty identifier operative to identify putative instances of an end user's experience of difficulty in operating the computerized system, an operation recorder operative to store a record of the end user's operations during each putative instance, an intention recorder operative to prompt an end user to indicate his intention during each the putative instance and to store the intention in association with the record of operations for the putative instance, and an output generator operative to generate an output indication of the record of operations and of the end user's intention for each of the putative instances of experiences of difficulty.

Further in accordance with a preferred embodiment of the present invention, the intention is time-stamped and the record of operations is time-stamped, thereby to provide the association between the intention and the record of operations.

Also provided, in accordance with another preferred embodiment of the present invention, is computerized apparatus for identifying usability problems occurring in the course of operating a computerized system, the apparatus including a candidate usability problem identifier operative to generate records of occurrences of putative usability problems by monitoring an end user who is using the computerized system, a candidate usability problem database operative to store the records of occurrences of putative usability problems, and a database accessing unit operative to access the database and to derive therefrom information useful for resolving the usability problems.

Further in accordance with a preferred embodiment of the present invention, the database accessing unit includes a helpdesk access unit operative to access the database and to derive therefrom, on-line, information useful for operating a helpdesk.

Still further in accordance with a preferred embodiment of the present invention, the database accessing unit includes a developer's access unit operative to access the database and to derive therefrom information useful for redesigning the computerized system.

Further in accordance with a preferred embodiment of the present invention, the intention recorder is operative to prompt the end user to explain his intention in his own words.

Also provided, in accordance with another preferred embodiment of the present invention, is a method for computerized identification of human difficulties in operating a computerized system, the method including identifying putative instances of an end user's experience of difficulty in operating the computerized system, storing a record of the end user's operations during each the putative instance, prompting the end user to indicate his intention during each the putative instance and to store the intention in association with the record of operations for the putative instance, and generating an output indication of the record of operations and of the end user's intention for each of the putative instances of experiences of difficulty.

Also provided, in accordance with still another preferred embodiment of the present invention, is computerized apparatus for identifying human difficulties in operating a computerized system, the apparatus including a human difficulty identifier operative to identify putative instances of an end user's experience of difficulty in operating the computerized system, an operation recorder operative to store a record of the end user's operations during each the putative instance, and an output generator operative to generate an output indication of the record of operations for each of the putative instances of experiences of difficulty.

Also provided, in accordance with yet another preferred embodiment of the present invention, is a mode error troubleshooting system including a software system structure generator operative to prompt a developer to define a first plurality of tasks performed by the software system, to define a second plurality of modes in which the software system operates and to define, for at least one task, at least one inappropriate mode from among the second plurality of modes in which the task cannot be performed, and a troubleshooter operative to prompt an end user to select an individual one of the first plurality of tasks as his target task, to search among modes in which the software system is currently operating for inappropriate modes in which the target task cannot be performed and to alert the end user of any inappropriate modes found.

Additionally provided, in accordance with another preferred embodiment of the present invention, is a method for monitoring an end user's terminology, the method including accepting a definition of a computer system's terminology including a multiplicity of terms, repeating the following steps:

prompting an end user to select one of the multiplicity of terms, and, if the end user indicates that a desired intention is not associated with any of the multiplicity of terms, prompting the end user to give a name to the desired intention, and displaying to a developer the incidence of each of the names given by the end user.

Additionally provided, in accordance with still another preferred embodiment of the present invention, is apparatus for identifying usability problems encountered when using developer-defined computerized systems each having a user interface, the apparatus including a user interface description elicitor operative to elicit from a developer of a developer-defined computerized system, and to record, a description of the user interface of the computerized system, a usability problem recorder operative to record usability problem data, and a usability problem occurrence analyzer using the description to analyze occurrences of usability problems recorded by the usability problem recorder.

Further in accordance with a preferred embodiment of the present invention, the usability problem recorder is operative to monitor an end user's interaction with the computerized system in order to identify automatically detectable usability problems.

Still further in accordance with a preferred embodiment of the present invention, the usability problem recorder is also operative to request the end user's confirmation of automatically detectable usability problems.

Additionally in accordance with a preferred embodiment of the present invention, the usability problem recorder is operative to accept a user-initiated report of a usability problem.

Still further in accordance with a preferred embodiment of the present invention, the user interface description elicitor is operative to store associations between components of a user interface of a computerized system and between functions of the computerized system.

Additionally in accordance with a preferred embodiment of the present invention, the user interface includes a plurality of input options, the apparatus also including an input option frequency recorder operative to accumulate input option frequency information including frequency of utilization for each of said plurality of input options.

Further in accordance with a preferred embodiment of the present invention, the apparatus also includes a user interface redeveloper operative to recommend a modification of at least a portion of the user interface based at least partly on the input option frequency information.

Still further in accordance with a preferred embodiment of the present invention, the apparatus also includes a user interface redeveloper operative to recommend a modification of at least a portion of the user interface based at least partly on the usability problem data.

Further in accordance with a preferred embodiment of the present invention, the usability problem data includes a record of each occurrence of a usability problem, expressed in terms of the description.

Still further in accordance with a preferred embodiment of the present invention, the usability problem recorder is operative, when recording the occurrence of a usability problem, to prompt the end user to indicate his intention when the usability problem occurred.

Additionally in accordance with a preferred embodiment of the present invention, the usability problem recorder is operative to accept from an end user an explanation of his intention phrased in his own words.

Further in accordance with a preferred embodiment of the present invention, the usability problem recorder is operative to prompt an end user to indicate his intention as a combination of at least one functions of a computerized system.

Further in accordance with a preferred embodiment of the present invention, the apparatus also includes a troubleshooter operative to troubleshoot by analyzing an end user's indicated intention.

Also provided, in accordance with another preferred embodiment of the present invention, is apparatus for developing a computerized system operative to perform a multiplicity of system functions responsive to a corresponding multiplicity of user interface components respectively, the multiplicity of user interface components forming a user interface, the apparatus including a computerized system usage statistics accumulator operative to accumulate computerized statistics regarding usage of the computerized system, and a user interface modification aid operative to propose a modification of the user interface based on the computerized statistics.

Further in accordance with a preferred embodiment of the present invention, the computerized system usage statistics accumulator includes a user difficulty accumulator operative to accumulate computerized statistics regarding difficulties encountered by end users of the computerized system.

Still further in accordance with a preferred embodiment of the present invention, the computerized system usage statistics accumulator includes a user interface component counter operative to count the number of times each user interface component is activated by at least one end user of the computerized system.

Still further in accordance with a preferred embodiment of the present invention, if the statistics indicate that an individual user interface component causes substantial difficulty, the user interface modification aid is operative to propose that the user interface be modified such that the system function is not performed responsive to the individual user interface component.

Further in accordance with a preferred embodiment of the present invention, the user difficulty accumulator is operative to identify mode errors based on the computerized statistics regarding difficulties.

Preferably, modification of at least a portion of the user interface also takes into account other factors such as mnemonics to aid end users in remembering the correspondence between input options and system functions and such as hierarchical structure to aid end users by assigning related or similar input options to related or similar system functions.

Modification of at least a portion of the user interface typically includes a recommendation of a new user interface to replace the existing user interface, the new user interface being different from the existing user interface in at least one respect. Preferably, the recommendation takes into account not only the negative cost of those portions of the existing user interface which are replaced but also the negative cost of the alternatives (in the new user interface) to the replaced portions of the existing user interface. For example, if a particular error shortcut key combination corresponding to a particular action according to the existing user interface is removed, then when the user wishes to perform that action, s/he should use an alternative input option such as menu selection or a push button. The alternative input option also may have a negative cost and preferably the system is operative to estimate this cost and take this cost into account in developing recommendations.

BRIEF DESCRIPTION OF THE DRAWINGS AND APPENDICES

The present invention will be understood and appreciated from the following detailed description, taken in conjunction with the drawings in which:

FIGS. 13–32 are pictorial illustrations of screen displays generated by unit 30 of FIG. 1 according to a first embodiment of the present invention;

FIGS. 33–36 are pictorial illustrations of screen displays generated by unit 32 of FIG. 1 according to a first embodiment of the present invention;

FIGS. 37–56 are pictorial illustrations of screen displays generated by unit 35 of FIG. 1 according to a first embodiment of the present invention;

FIGS. 57–68 are pictorial illustrations of screen displays generated by unit 90 of FIG. 1 according to a first embodiment of the present invention;

FIGS. 69–76 are pictorial illustrations of screen displays generated by unit 20 of FIG. 1 according to a second embodiment of the present invention;

FIGS. 77–84 are pictorial illustrations of screen displays generated by unit 30 of FIG. 1 according to a second embodiment of the present invention;

FIGS. 87–106 are pictorial illustrations of screen displays generated by unit 35 of FIG. 1 according to a second embodiment of the present invention;

FIGS. 107–123 are pictorial illustrations of screen displays generated by unit 80 of FIG. 1 according to a second embodiment of the present invention;

Figure 1:
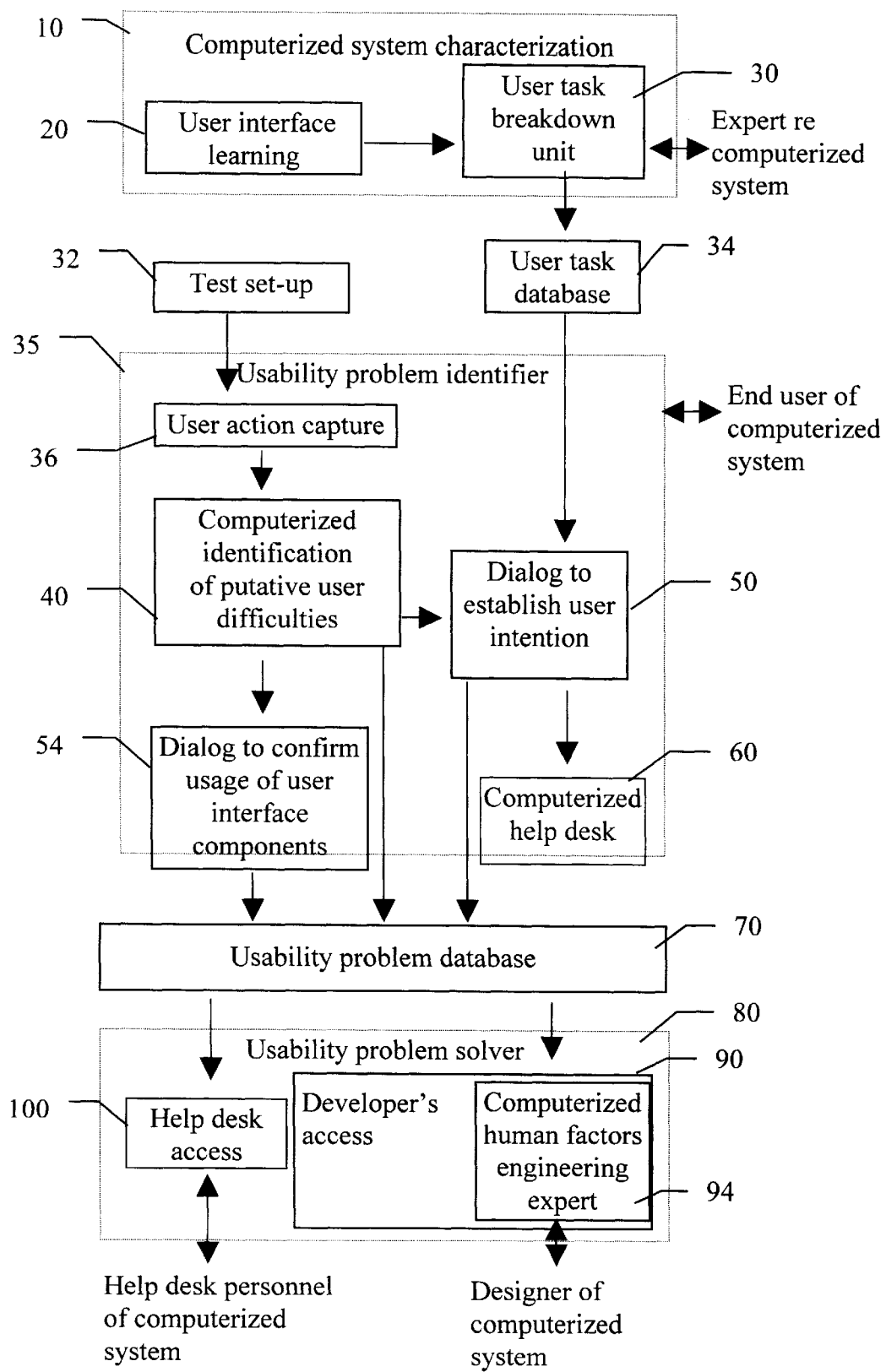
FIG. 1 is a simplified block diagram of computerized apparatus for identifying difficulties encountered by a human operator when operating a given computerized system.
Figure 124:
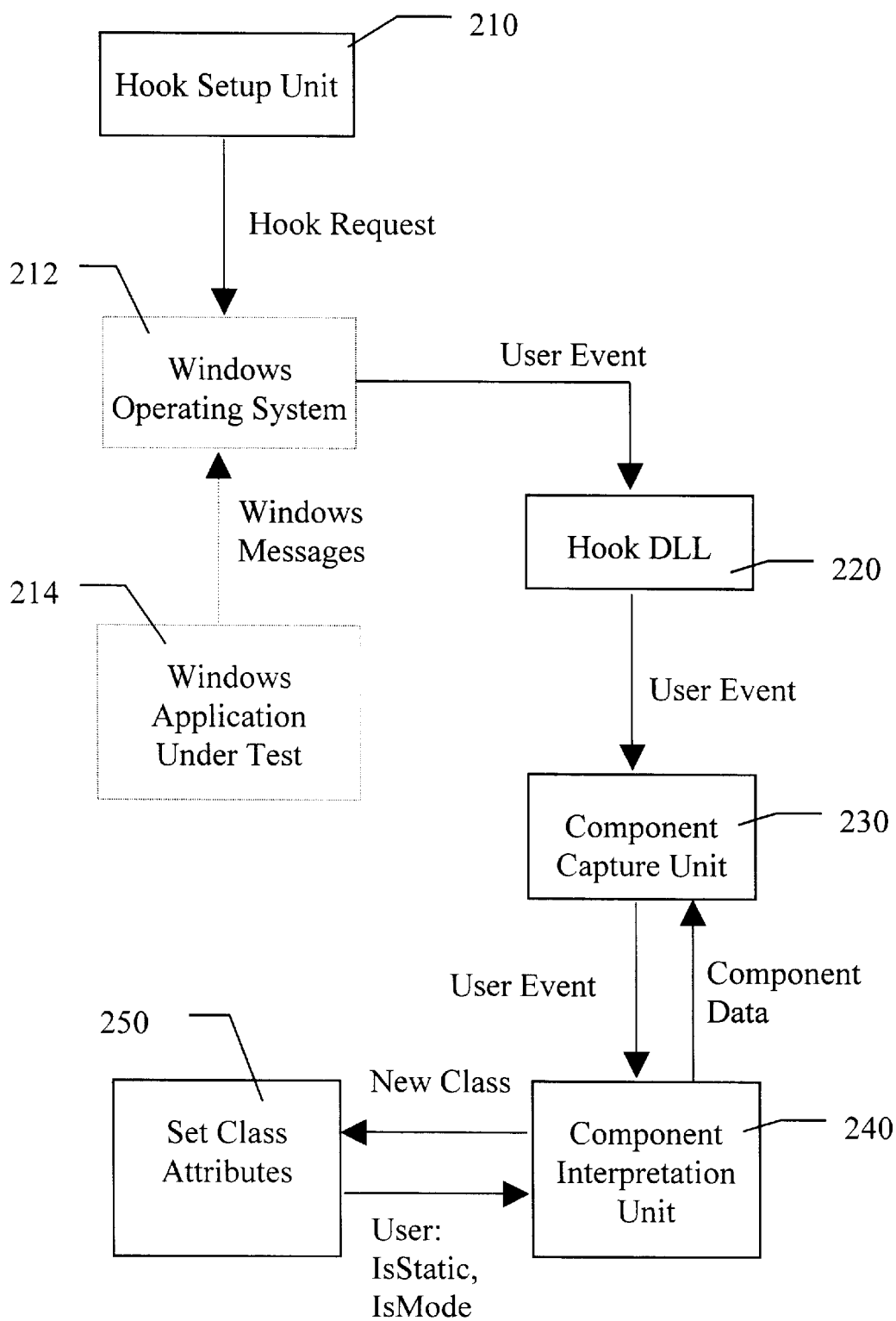
Figure 125:
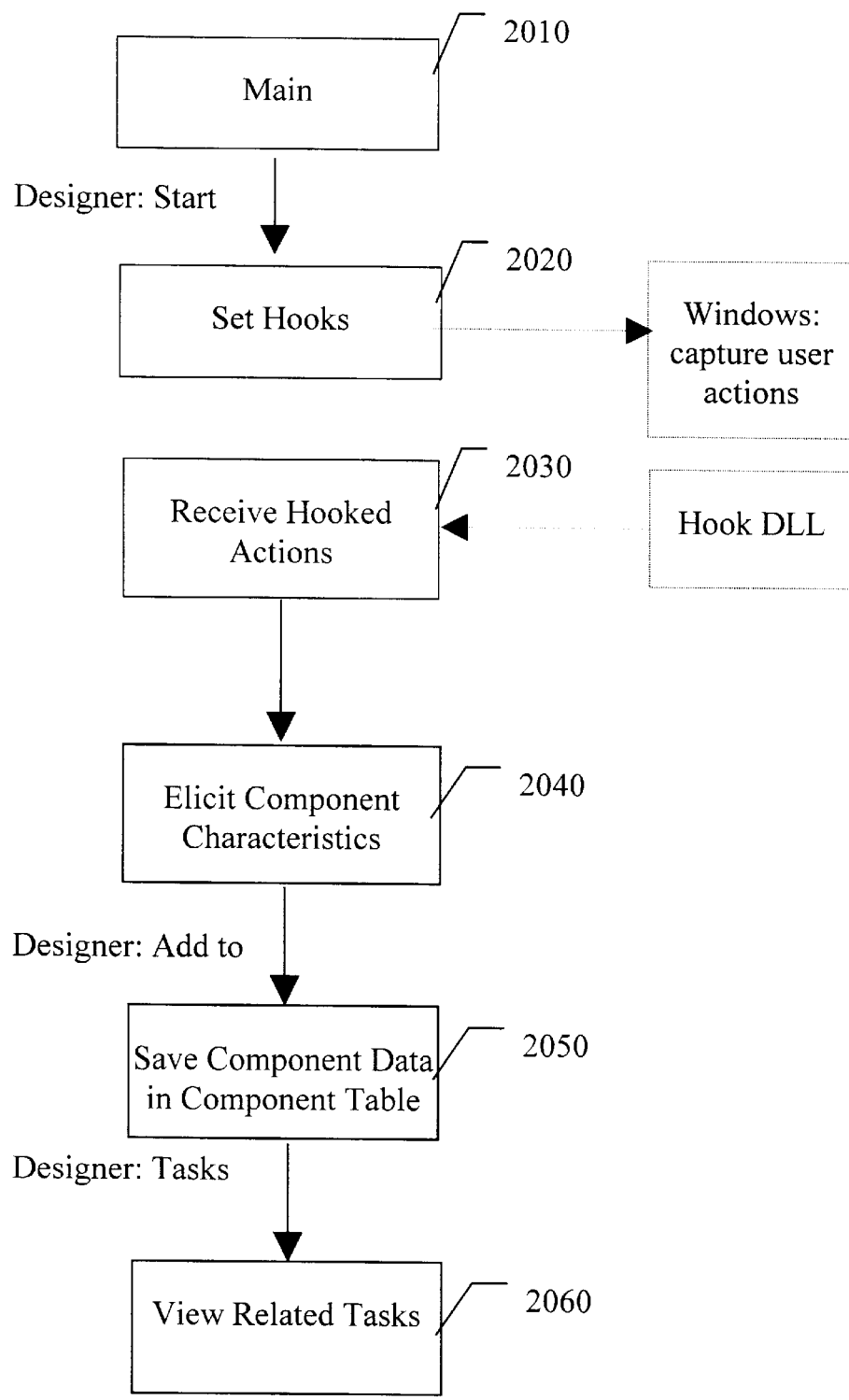
Figure 126:
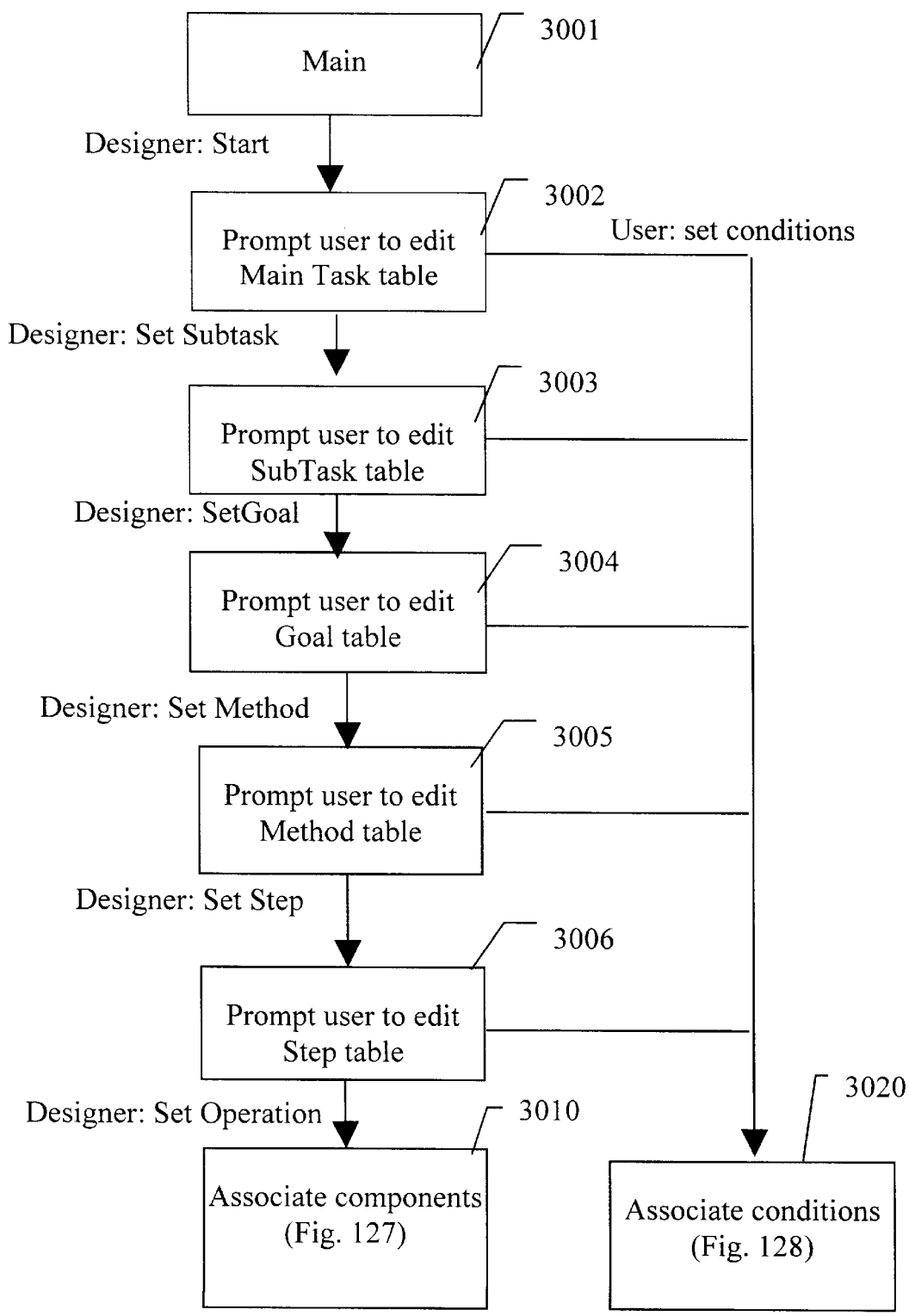
Figure 127:
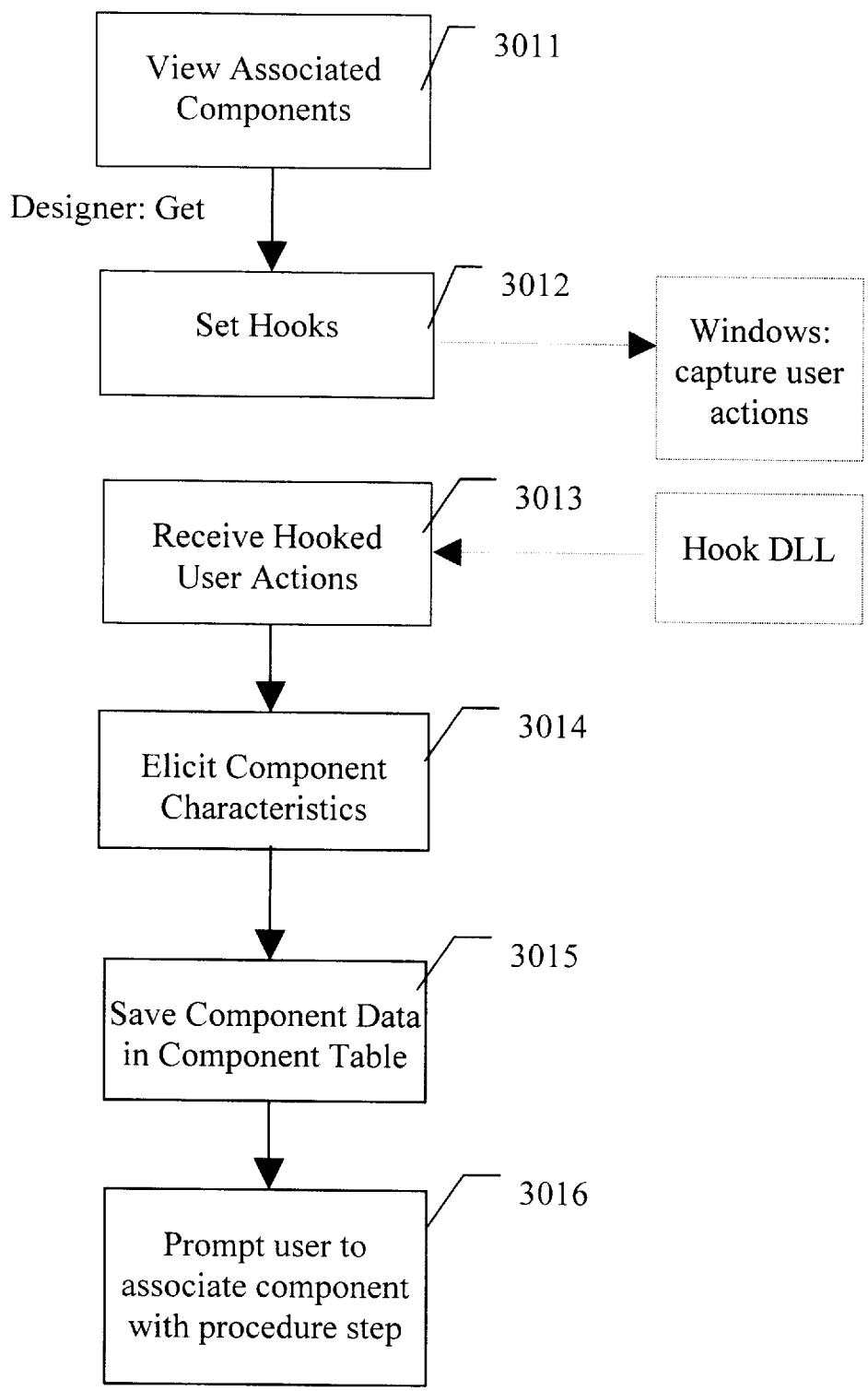
Figure 128:
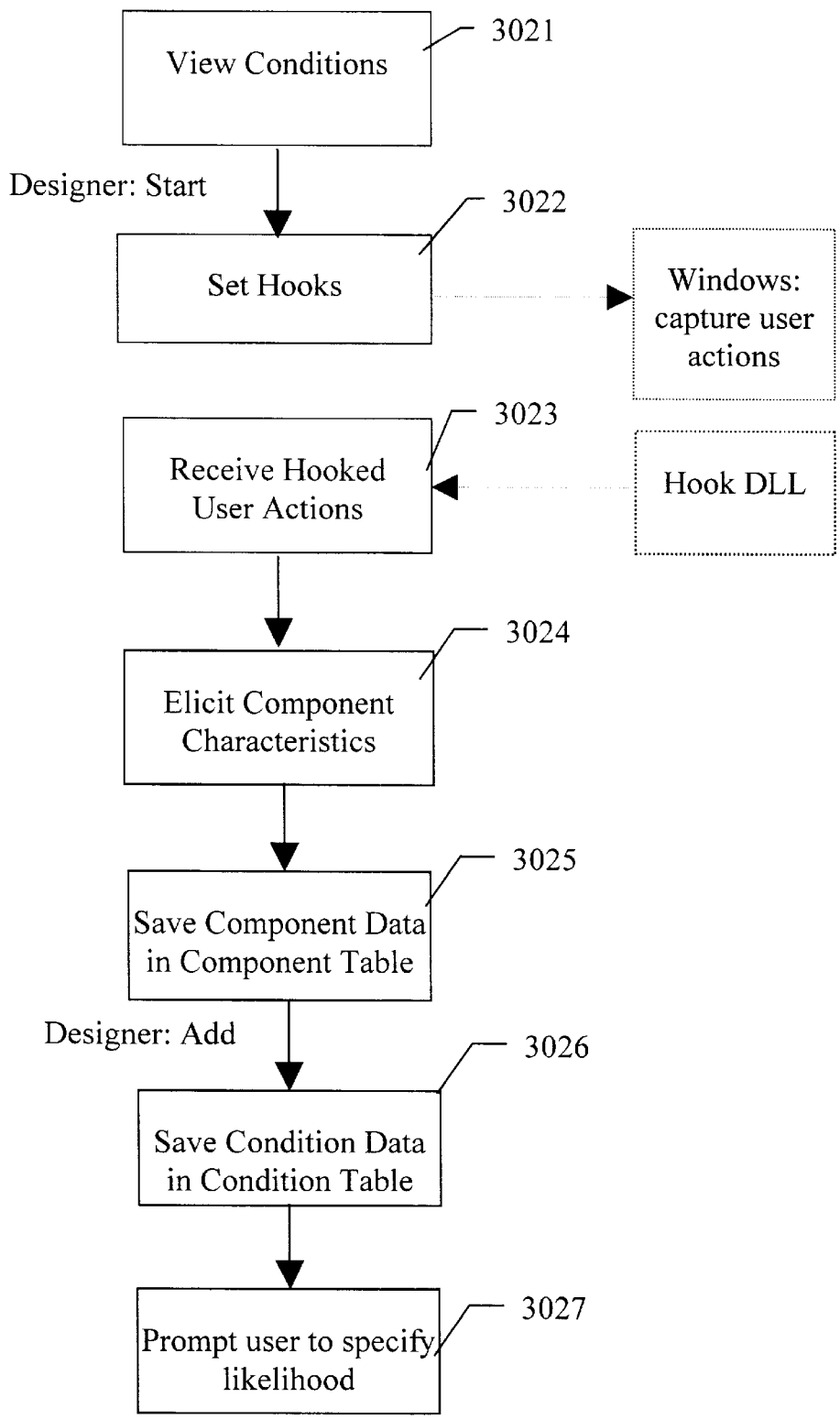
Figure 129:
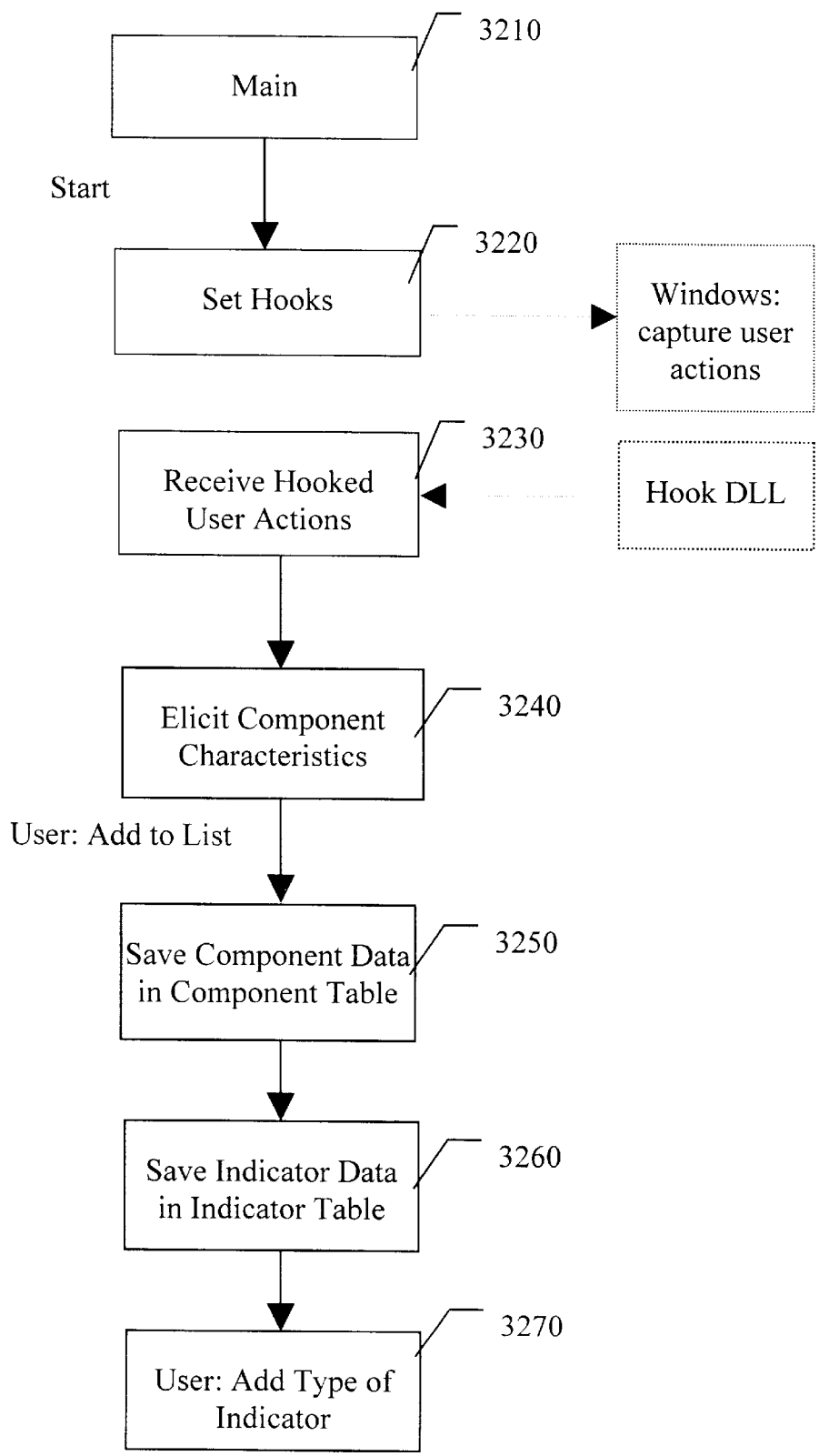
Figure 130:
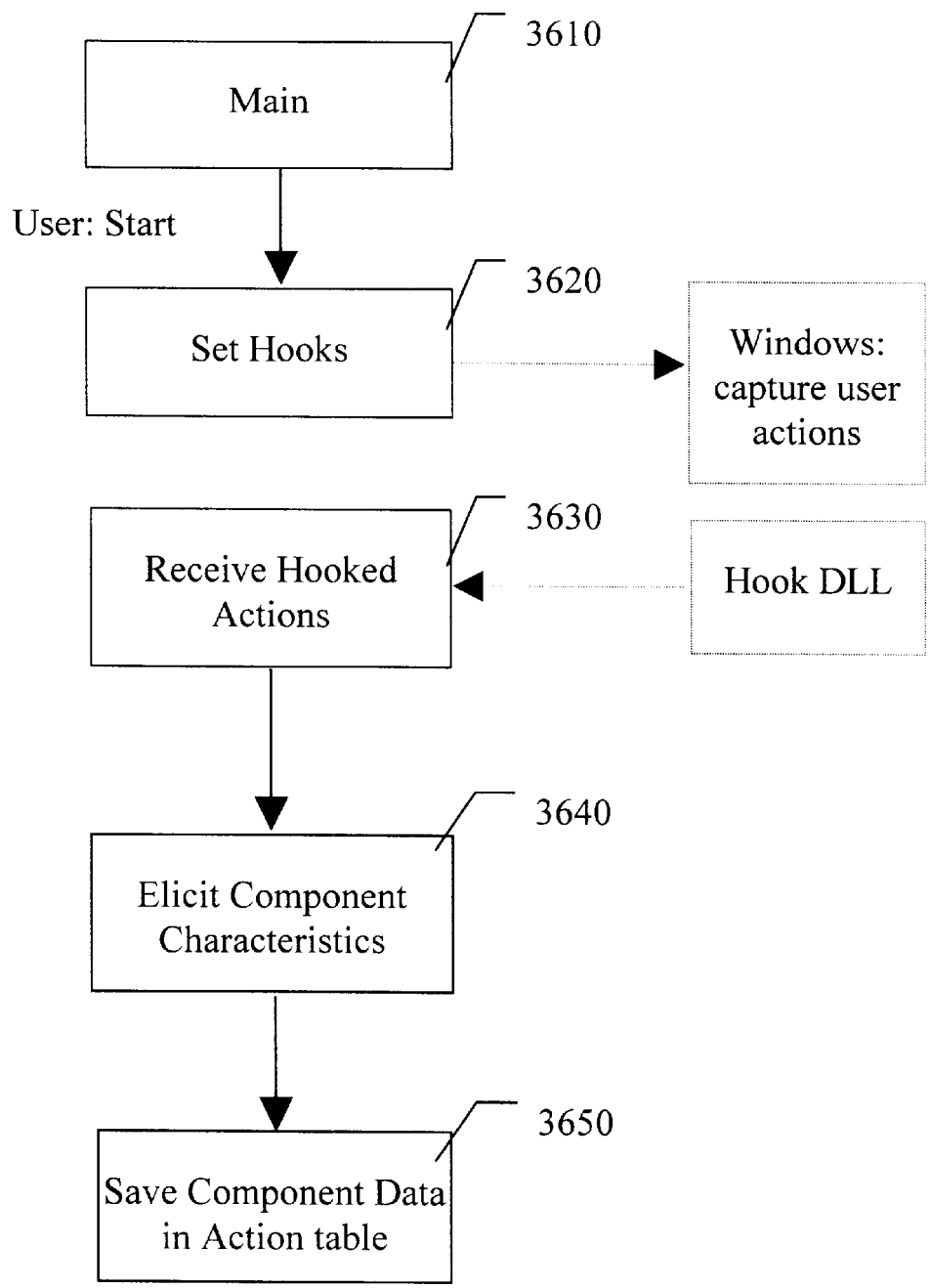
Figure 131:
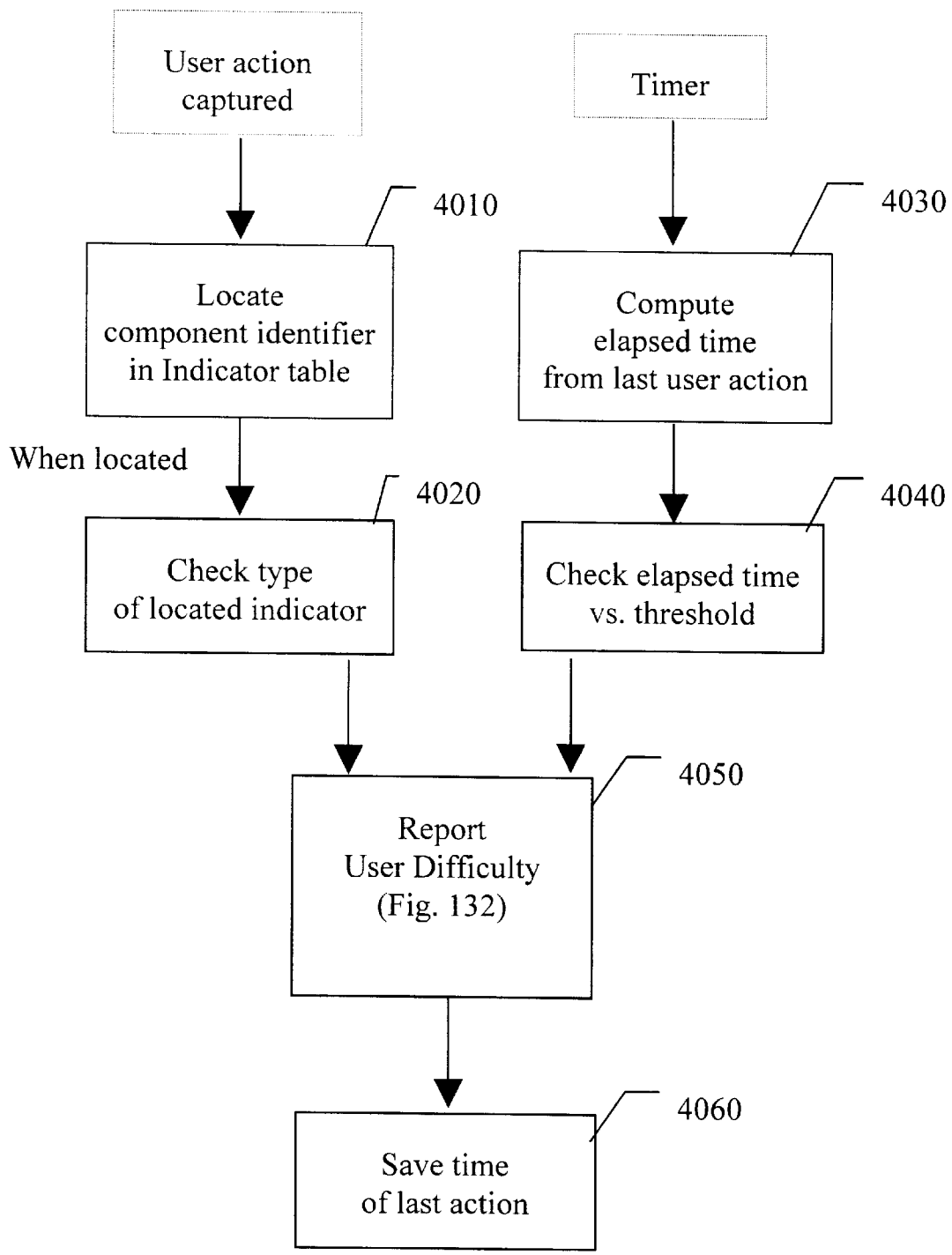
Figure 132:
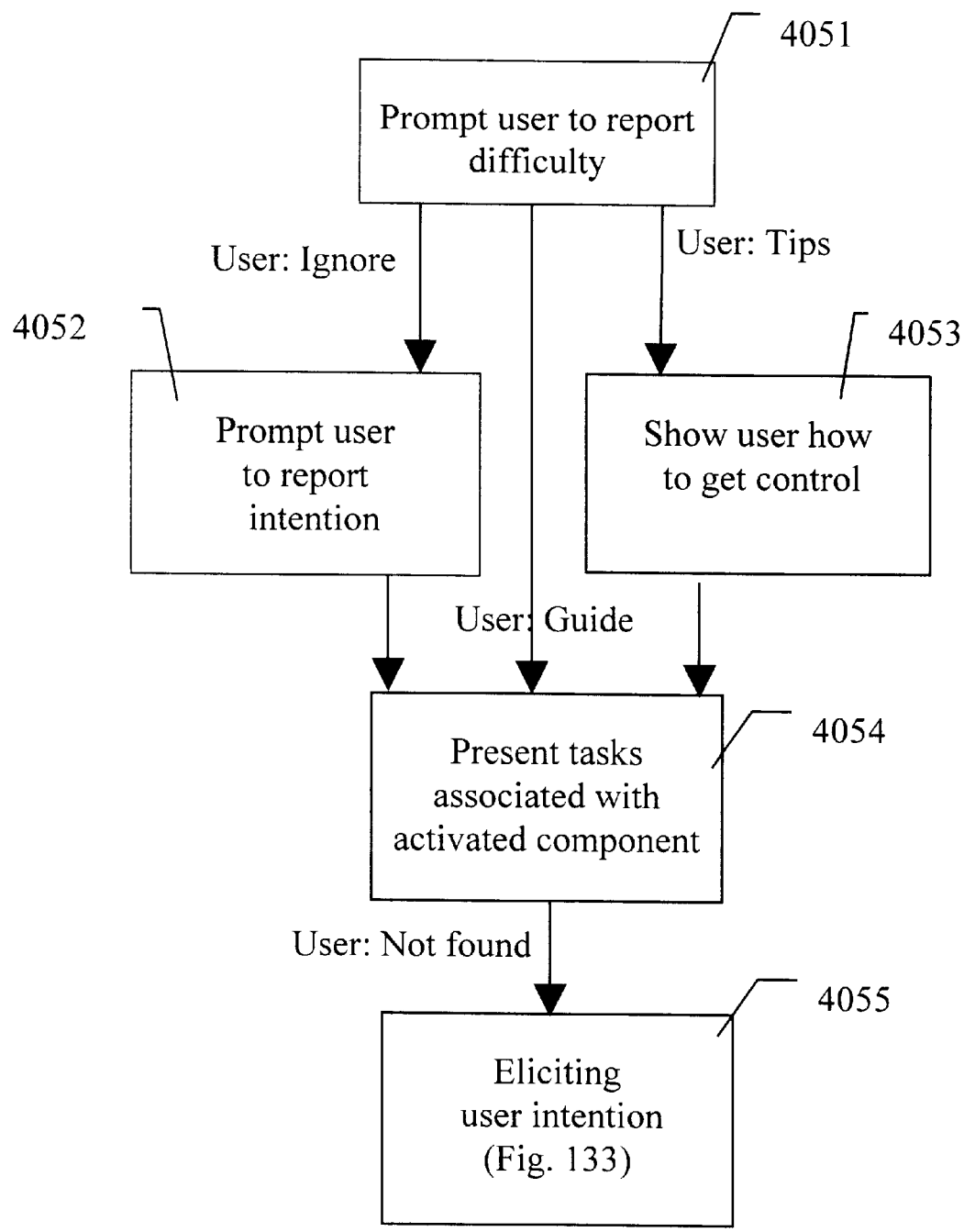
Figure 133:
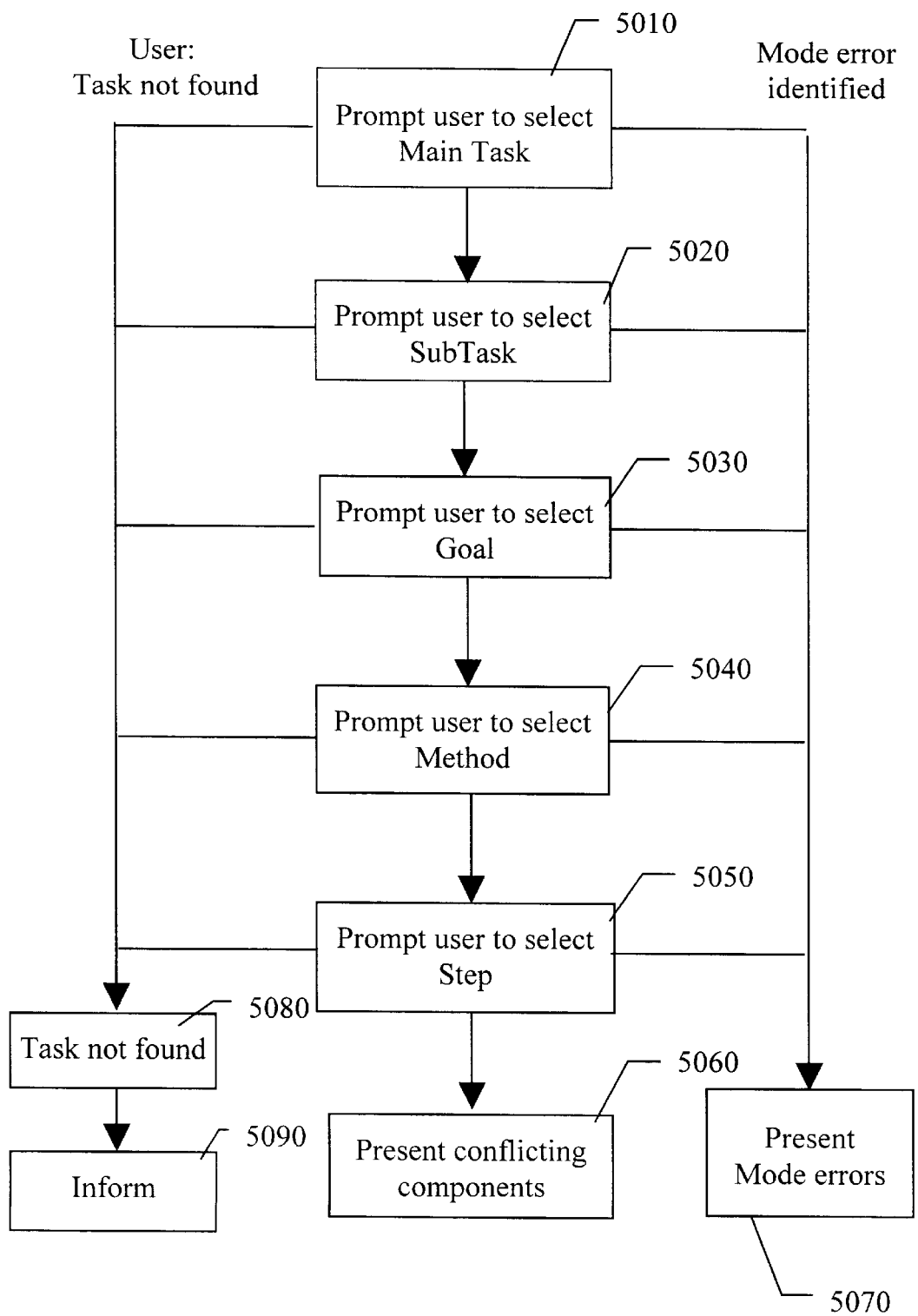
Figure 134:
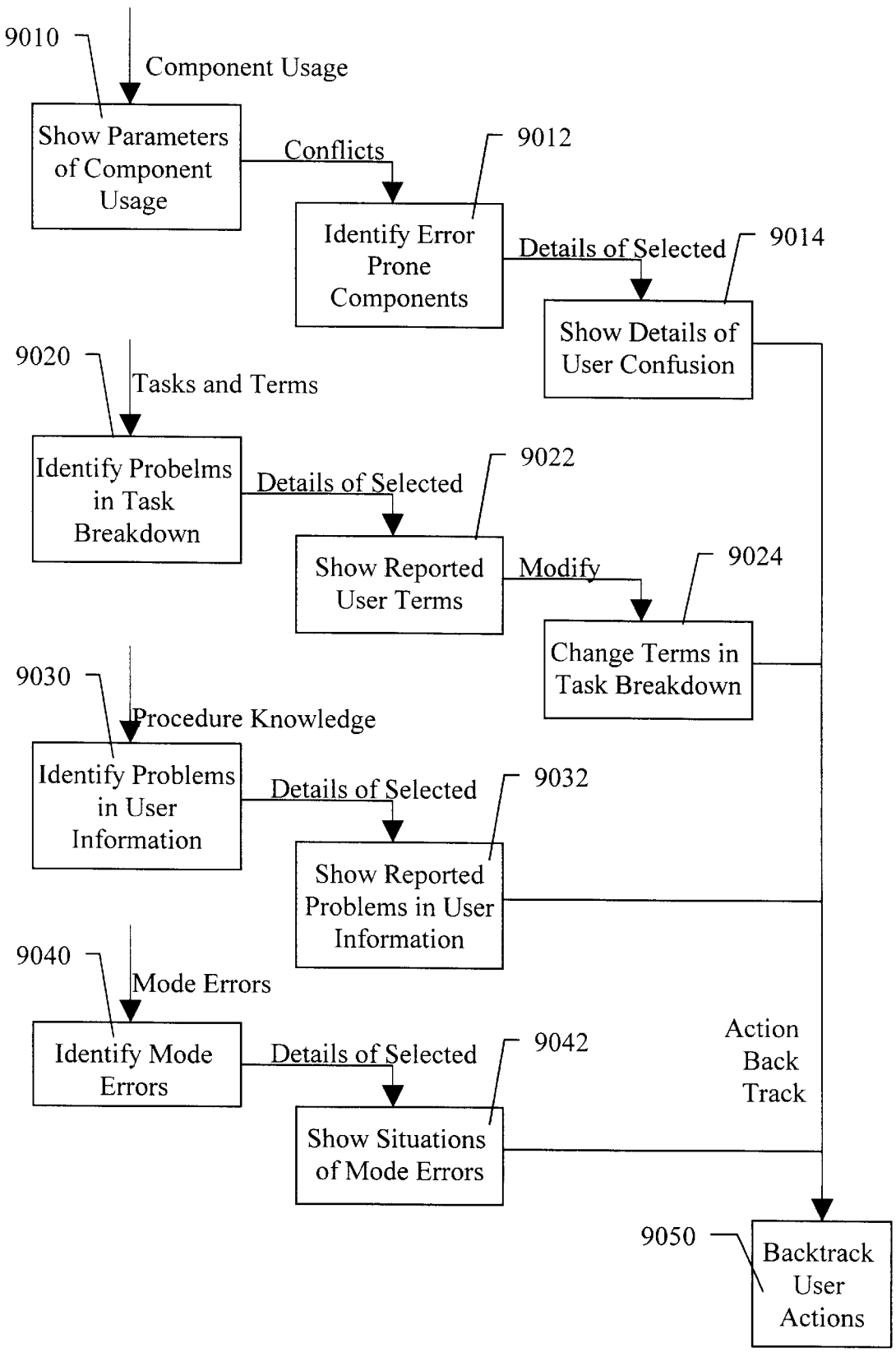
Figure 135:
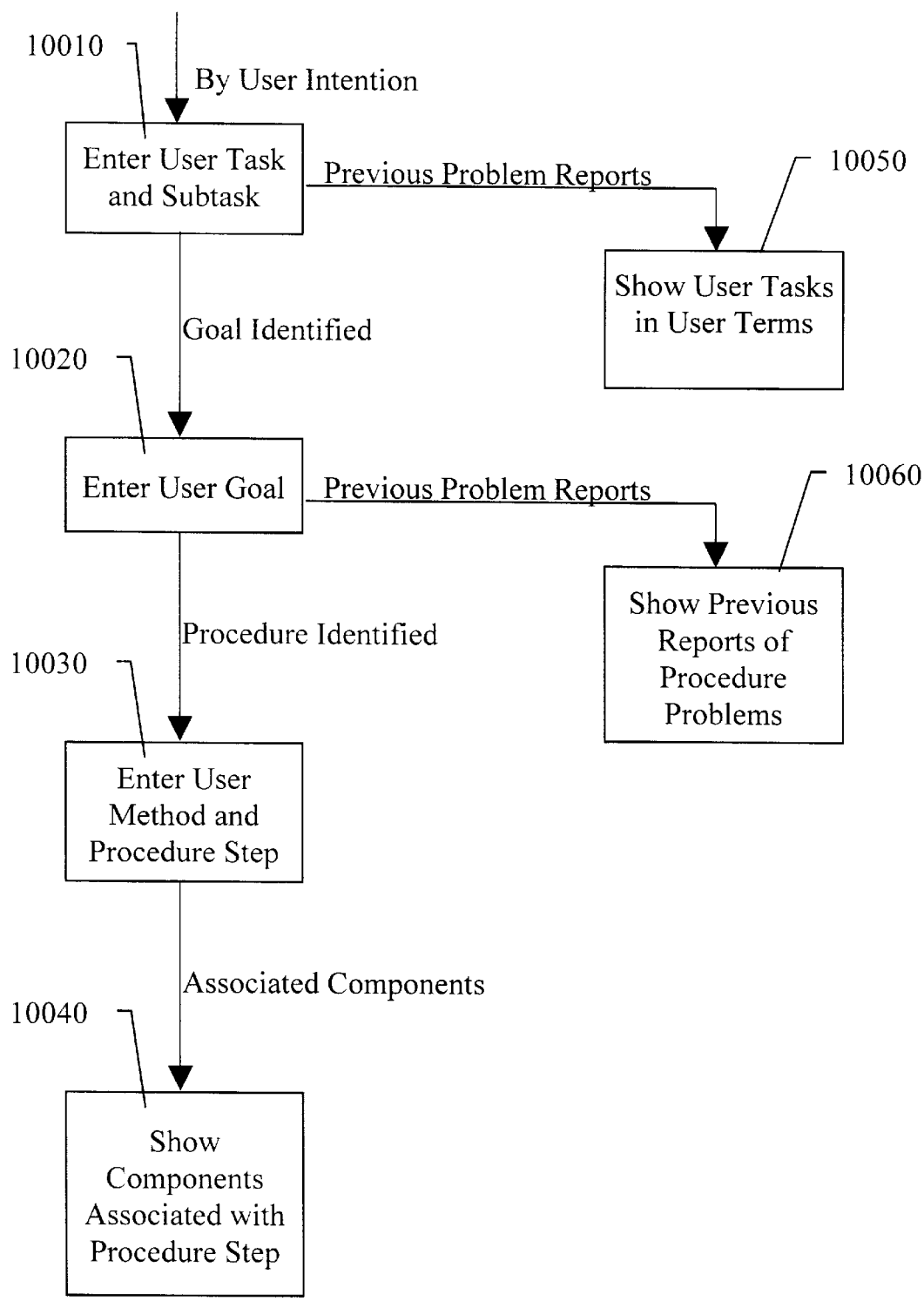
Figure 136:
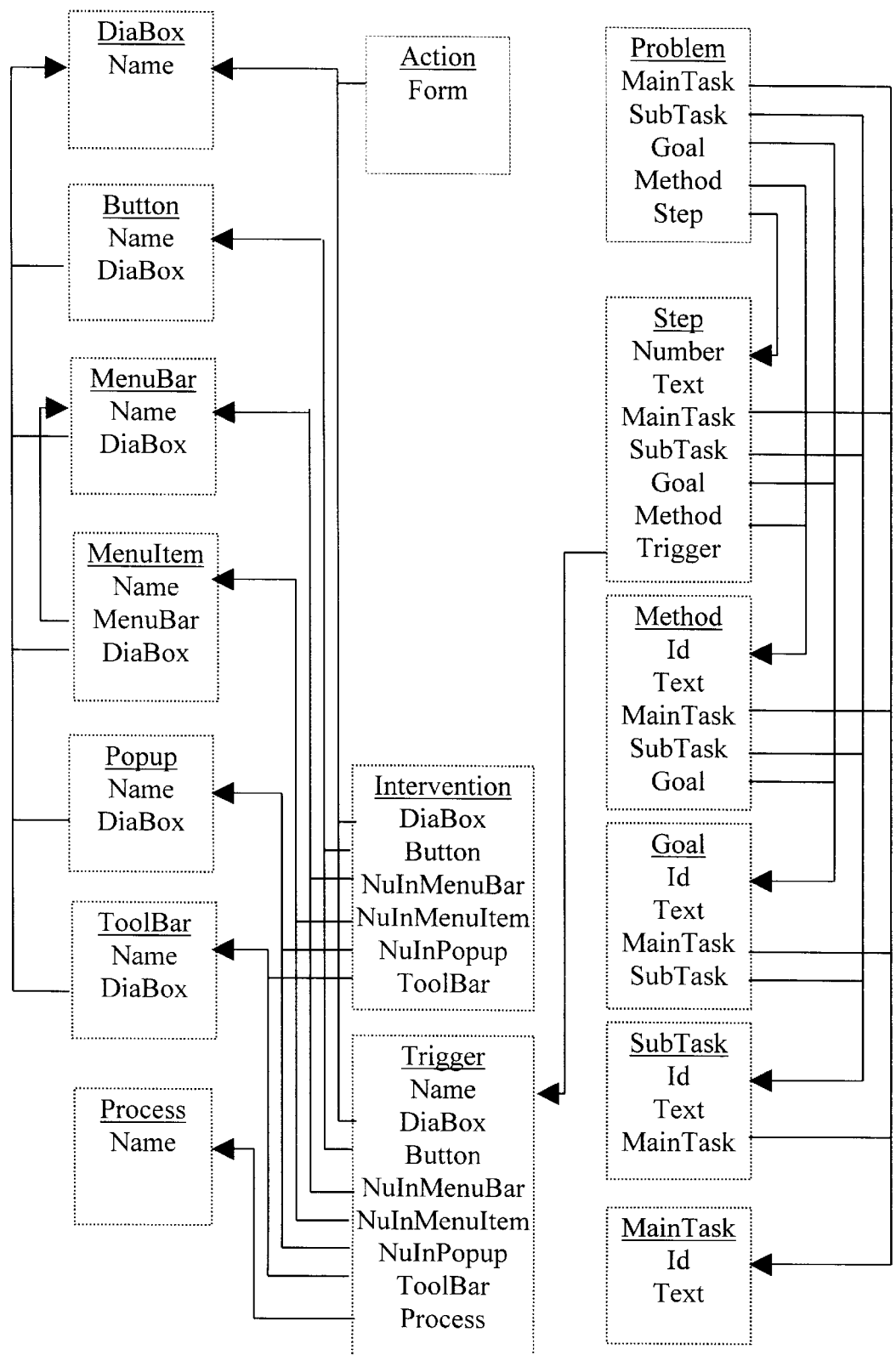
Figure 137:
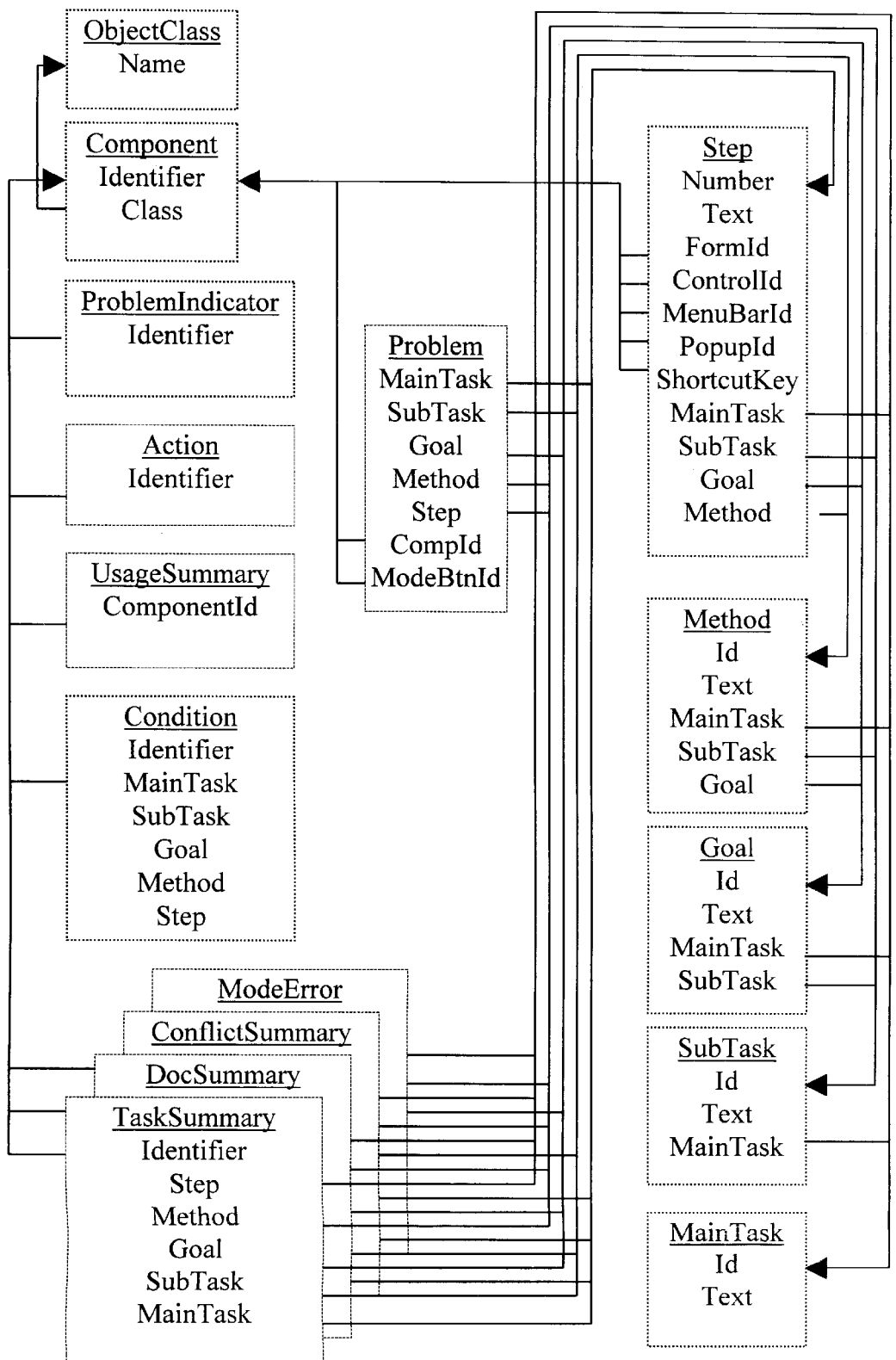

FIG. 124 is a simplified functional block diagram of a preferred embodiment of the user action capture block 36 of FIG. 1, which is particularly suited for applications in which the computerized system is a Windows system, the embodiment of FIG. 124 also being useful in implementing units 20, 30 and 32 of FIG. 1;

FIG. 125 is a simplified flowchart illustration of a preferred mode of operation for unit 20 of FIG. 1;

FIG. 126 is a simplified flowchart illustration of a preferred mode of operation for unit 30 of FIG. 1;

FIG. 127 is a simplified flowchart illustration of a preferred implementation of the "Associate components" process of FIG. 119;

FIG. 128 is a simplified flowchart illustration of a preferred implementation of the "Associate conditions" process of FIG. 119;

FIG. 129 is a simplified flowchart illustration of a preferred mode of operation for unit 32 of FIG. 1;

FIG. 130 is a simplified flowchart illustration of a preferred mode of operation for unit 36 of FIG. 1;

FIG. 131 is a simplified flowchart illustration of a preferred mode of operation for unit 40 of FIG. 1;

FIG. 132 is a simplified flowchart illustration of a preferred implementation of the "Prompt user to report difficulty" process of FIG. 124;

FIG. 133 is a simplified flowchart illustration of a preferred implementation of the "Eliciting user intention" process of FIG. 125;

FIG. 134 is a simplified flowchart illustration of a preferred mode of operation for unit 90 of FIG. 1;

FIG. 135 is a simplified flowchart illustration of a preferred mode of operation for unit 100 of FIG. 1;

FIG. 136 is a simplified diagram of relationships between tables within databases 34 and 70 of FIG. 1, according to a first implementation of the present invention, in which tables within database 34 are indicated in dotted lines and tables within database 70 are indicated in dashed lines; and FIG. 137 is a simplified diagram of relationships between tables within databases 34 and 70 of FIG. 1, according to a second preferred implementation of the present invention, in which tables within database 34 are indicated in dotted lines and tables within database 70 are indicated in dashed lines.

Figure 85:
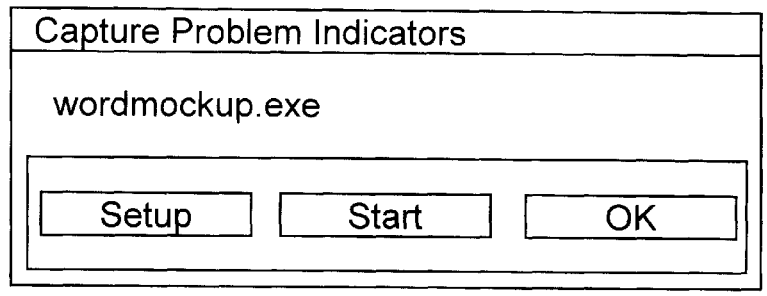
FIGS. 85–86 are pictorial illustrations of screen displays generated by unit 32 of FIG. 1 according to a second embodiment of the present invention.
Figure 86:
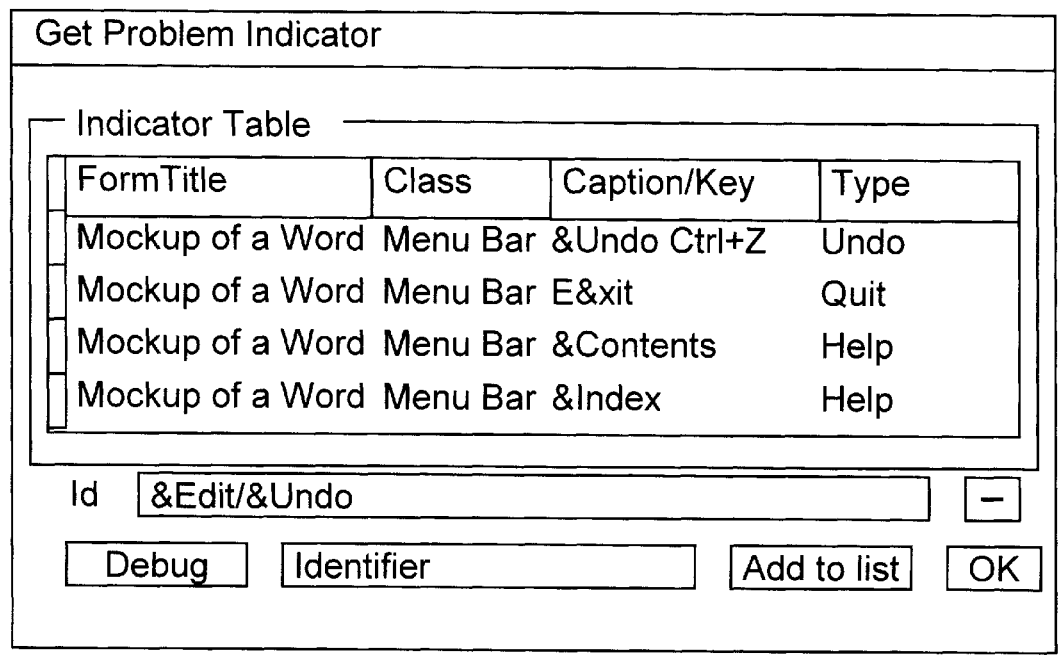

Attached herewith are the following appendices which aid in the understanding and appreciation of one preferred embodiment of the invention shown and described herein:

Appendix 1 is a software listing of utilities written in Pascal, which are useful for implementing a first embodiment of the present invention;

Appendix 2 contains software listings for the project file and for Pascal units of each of the forms of FIGS. 2–11, corresponding to unit 20 of FIG. 1;

Appendix 3 contains software listings for the project file and for Pascal units of each of the forms of FIGS. 12–32, corresponding to unit 30 of FIG. 1;

Appendix 4 contains software listings for the project file and for Pascal units of each of the forms of FIGS. 33–36, corresponding to unit 32 of FIG. 1;

Appendix 5 contains software listings for the project file and for Pascal units of each of the forms of FIGS. 37–56, corresponding to unit 35 of FIG. 1;

Appendix 6 contains software listings for the project file and for Pascal units of each of the forms of FIGS. 57–68, corresponding to unit 80 of FIG. 1;

Appendix 7 is a software listing of utilities written in Pascal, which are useful for implementing a second preferred embodiment of the present invention;

Appendix 8 contains software listings for the project file and for Pascal units of each of the forms of FIGS. 69–76, corresponding to unit 20 of FIG. 1 according to a second preferred embodiment of the present invention;

Appendix 9 contains software listings for the project file and for Pascal units of each of the forms of FIGS. 77–84, corresponding to unit 30 of FIG. 1 according to a second preferred embodiment of the present invention;

Appendix 10 contains software listings for the project file and for Pascal units of each of the forms of FIGS. 85–86, corresponding to unit 32 of FIG. 1 according to a second preferred embodiment of the present invention;

Appendix 11 contains software listings for the project file and for Pascal units of each of the forms of FIGS. 87–106, corresponding to unit 35 of FIG. 1 according to a second preferred embodiment of the present invention; and Appendix 12 contains software listings for the project file and for Pascal units of each of the forms of FIGS. 107–123, corresponding to unit 80 of FIG. 1 according to a second preferred embodiment of the present invention.

DETAILED DESCRIPTION OF PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Reference is now made to FIG. 1 which is a simplified block diagram of computerized apparatus for identifying difficulties encountered by a human operator when operating a given computerized system such as but not limited to a MS-Windows application.

The apparatus of FIG. 1 preferably comprises a computerized system characterization unit 10 operative to learn the system, preferably by holding a dialog with an expert regarding the computerized system. Preferably, the learning unit includes the following two subunits:

a. User interface learning unit 20—Performs a breakdown of the computerized system's user interface into components, in any suitable format such as a list or hierarchy of components. For example, if the computerized system is Motif, this step preferably includes characterization of the "widgets". If the computerized system is MS-Windows, this step preferably includes characterization of "controls" (such as menu items, edit fields, buttons and list boxes).

b. User task breakdown unit 30—Performs a breakdown of user tasks in terms of the user interface components characterized in step (a). Preferably, the user task breakdown unit 30 prompts the expert to specify all known user tasks and break down these user tasks into a hierarchy of sub-tasks down to procedures, until the user interface component level is reached. For example, a common user task in word processors is "move text". This task, in MS-Windows, comprises the following sub-tasks: "Select block to move", "Cut to clipboard", "Mark new location", and "Paste from clipboard". At the component level, the menu items "Edit/Cut" and "Edit/Paste" are specified together with the shortcut keys combination Ctrl+X and Ctrl+V.

A hierarchy of all known user tasks is typically stored in a user tasks database 34.

A test set-up unit 32 initializes the apparatus system and allows set-up parameters to be defined preferably for each user group, and/or for each individual user.

The apparatus of FIG. 1 also includes a usability problem identifier 35. The usability problem identifier 35 includes a user action capture unit 36 and a computerized unit 40 for identifying putative user difficulties by analyzing user actions captured by the user action capture unit 36. The user action capture unit 36 is preferably operative to capture and time-stamp various types of user input such as key-strokes and mouse-events. Putative user difficulties may be identified by any suitable criteria, as described in detail below.

Each time a putative user difficulty is identified, a dialog conducting unit 50 is actuated which conducts a dialog with the end-user in order to confirm that the putative user difficulty is in fact an instance of difficulty and in order to prompt the end-user to characterize the difficulty s/he is experiencing. The dialog unit 50 updates a usability problem database 70 to include the information collected regarding putative user difficulties.

Preferably, the characterization of difficulty which the dialog unit 50 solicits comprises an identification of the user's intention or goal which was entered by systems' experts to the user task database 34. Preferably, the characterization of difficulty comprises characterization of the information that the user examined in order to learn the operational procedure required to accomplish the task.

A preferred method for eliciting from the user a statement of his intention or goal is to display to the user, level by level beginning at the top level, the hierarchy of known user tasks and sub-tasks down to operational procedures stored in the user task database 34. Preferably, if the user cannot find an operational procedure in the task stored in database 34, the user can characterize the intended task explicitly.

A user interface usage confirmation unit 54 is preferably provided which is operative to prompt the user to indicate the user interface components s/he believes herself to have employed when attempting to perform the desired task. Preferably, this information is compared to captured information regarding the actual user interface components employed and a suitable message is provided the user if there is a discrepancy between the user interface components s/he actually used and those she thought she used. Preferably, the user interface usage confirmation unit 54 collects statistics regarding these discrepancies. These statistics are useful in indicating a users' tendency to accidentally misuse or confuse certain input options. For example, it may be the case that users tend to accidentally depress the CAPS LOCK key.

The system typically includes a usability problem solver 80 which typically includes at least one units operative to access the usability problem database 70 in order to derive various types of information from the database, such as problems in understanding the operational procedures and problems in the system response to accidental misuse of input options. In the illustrated embodiment, the usability problem solver 80 includes:

a. A developer's access unit 90 operative to derive from the database, preferably off-line, information useful for evaluating and further re-designing the computerized system. The information derived by the developer's access unit 90 preferably includes statistics regarding the costs, e.g. in terms of wasted time, associated with various categories of user difficulties. Preferably, the developer's access unit 90 includes a computerized human factors engineering expert unit 94 which is operative to generate a recommended solution for usability problems stored in database 70.

b. A helpdesk access unit 100 operative to derive from the database, preferably on-line, information useful for operating a helpdesk which may be computerized and form part of the system or alternatively may be external to the system and may comprise a human-operated help-desk.

Preferably, the apparatus of FIG. 1 also includes a computerized helpdesk 60 receiving input from the dialog unit 50 which is operative to provide conventional helpdesk services regarding known user difficulties identified by the dialog unit 50.

A particular advantage of the system shown and described herein is that, preferably, statistics are collected regarding all identified usability problems including usability problems which are not costly in terms of time. This is important because a prevalent usability problem may cause significant deterioration in performance not because each single occurrence wastes a significant amount of time but because of the problem's prevalence.

For example, it is believed that the "minor" mode error which occurs when a user unintentionally presses the Alt key, the Caps Lock key or the Insert key would have been rectified if statistics had been available regarding the high rate of recurrence of this error.

A particular advantage of the computerized collection of usability problems provided by the present invention, relative to conventional manual collection of usability problems is that, severe usability problems may be detected even when they are very rare. This is not always the case for manual collection of usability problems. For example, Version 6.0 of Word for Windows includes a severe usability problem in that if the Ctrl+Shift+H shortcut key combination is pressed erroneously, instead of Ctrl+H, in an attempt to Search And Replace a string within a selected text, the result is that the selected text is Hidden and no Search or Replace is performed. It is believed that this problem was not detected during manual collection of usability problems, otherwise it would have been fixed in Word version 7.0.

Figure 2:
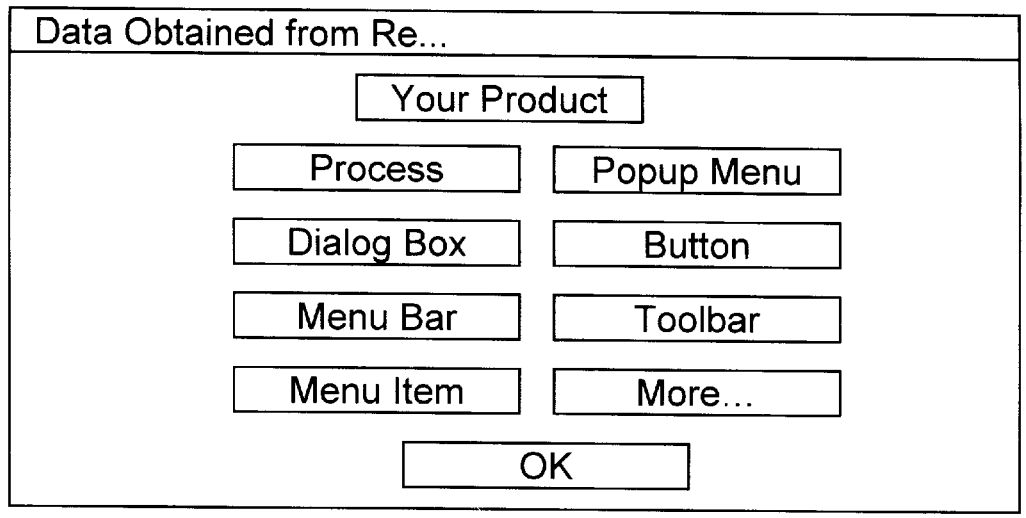
FIGS. 2–12 are pictorial illustrations of screen displays generated by unit 20 of FIG. 1 according to a first embodiment of the present invention.

A first implementation of the apparatus of FIG. 1 is described herein with reference to FIGS. 2–68 and to appendices 1–6. A second preferred implementation of the apparatus of FIG. 1 is described herein with reference to FIGS. 69–123 and to appendices 7–12.

The first implementation of the apparatus of FIG. 1 is now described.

FIGS. 2–12 are pictorial illustrations of screen displays generated by unit 20 of FIG. 1 according to a first embodiment of the present invention. FIG. 2 is an initial screen display. The relationship between the screen displays of FIGS. 2–12 is described below including the relationships between the Delphi forms of the various screen displays, the Pascal units corresponding thereto, and an indication of the form component within a first screen display which, when selected, causes a particular second screen to be displayed.

Figure 13:
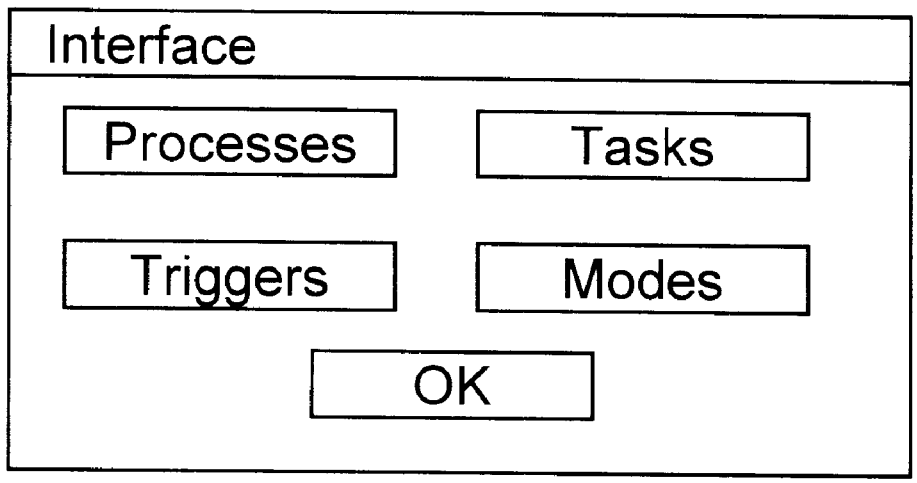
Figure 14:
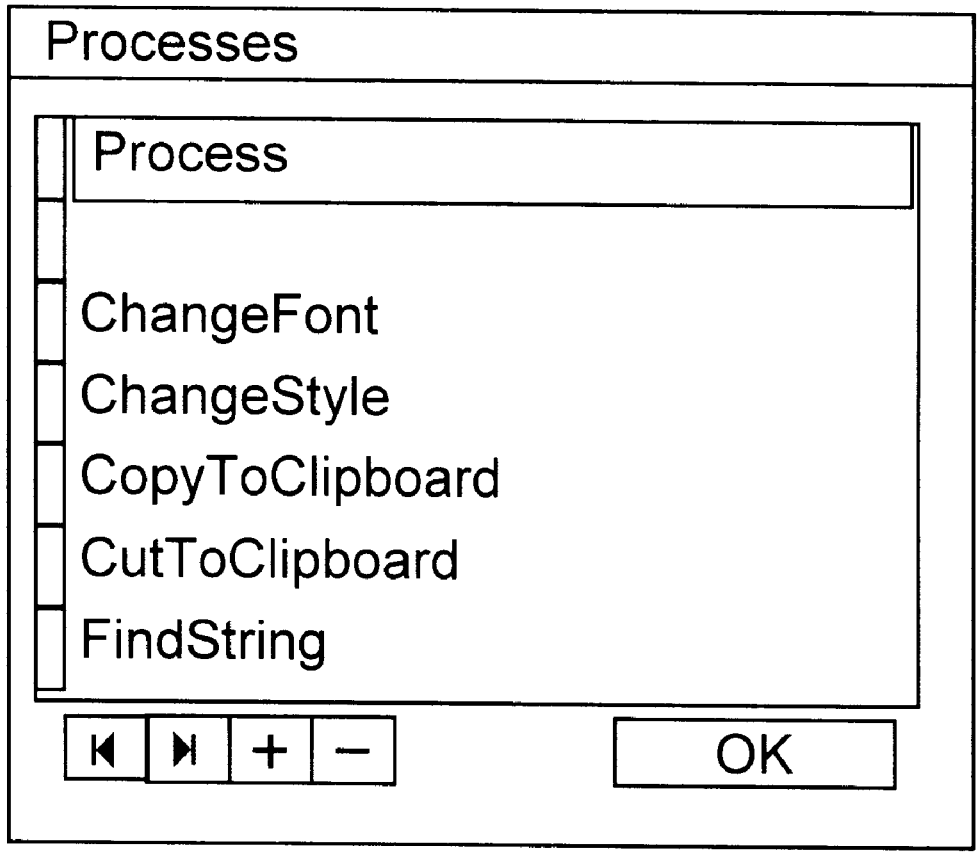

FIGS. 13–32 are pictorial illustrations of screen displays generated by unit 30 of FIG. 1 according to a first embodiment of the present invention. FIG. 13 is the initial screen display. The relationship between the screen displays of FIGS. 13–32 is described below including the relationships between the Delphi forms of the various screen displays, the Pascal units corresponding thereto, and an indication of the form component within a first screen display which, when selected, causes a particular second screen to be displayed.

Figure 33:
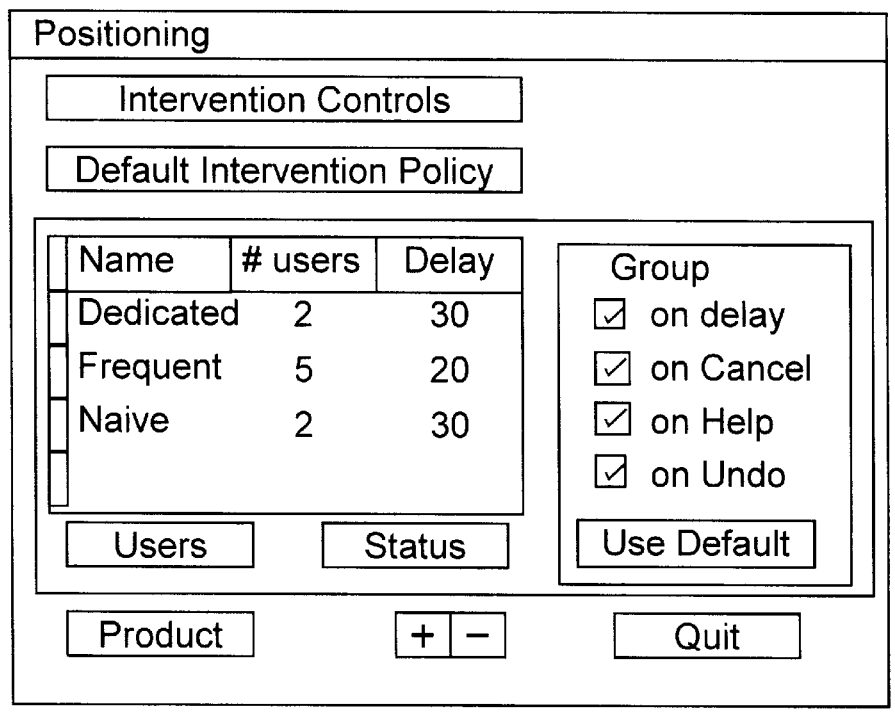

FIGS. 33–36 are pictorial illustrations of screen displays generated by unit 32 of FIG. 1 according to a first embodiment of the present invention. FIG. 33 is the initial screen display. The relationship between the screen displays of FIGS. 33–36 is described below including the relationships between the Delphi forms of the various screen displays, the Pascal units corresponding thereto, and an indication of the form component within a first screen display which, when selected, causes a particular second screen to be displayed.

FIGS. 37–56 are pictorial illustrations of screen displays generated by unit 35 of FIG. 1 according to a first embodiment of the present invention. FIG. 37 is the initial screen display. The relationship between the screen displays of FIGS. 37–56 is described below including the relationships between the Delphi forms of the various screen displays, the Pascal units corresponding thereto, and an indication of the form component within a first screen display which, when selected, causes a particular second screen to be displayed.

FIGS. 57–68 are pictorial illustrations of screen displays generated by unit 90 of FIG. 1 according to a first embodiment of the present invention. FIG. 57 is the initial screen display. The relationship between the screen displays of FIGS. 57–68 is described below including the relationships between the Delphi forms of the various screen displays, the Pascal units corresponding thereto, and an indication of the form component within a first screen display which, when selected, causes a particular second screen to be displayed.

Enclosed herewith are Appendices 1–6 including computer listings useful in generating the first embodiment of the present invention, shown and described above with reference to FIGS. 2–68.

Delphi form transitions within each of units 20, 30, 32, 35 and 90 according to a first embodiment of the present invention are now described. It is emphasized that the particular form transition structure described herein is merely an example and is provided for illustrative purposes only.

Figure 3:
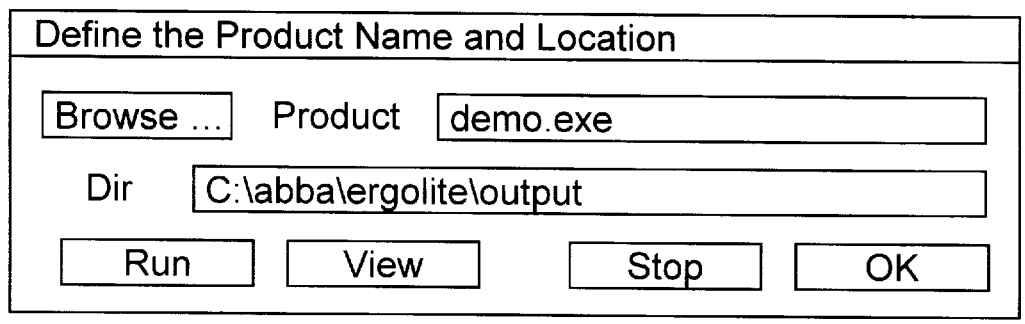
Figure 4:
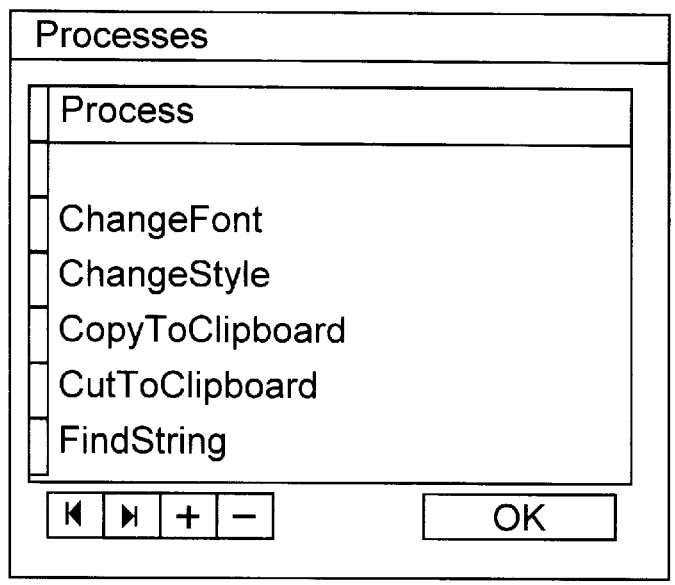
Figure 5:
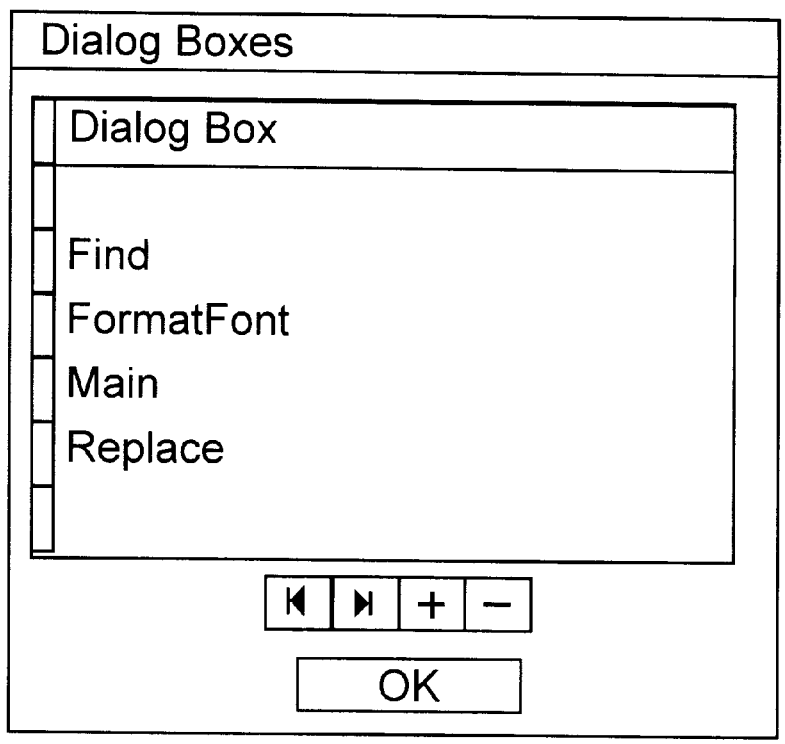
Figure 6:
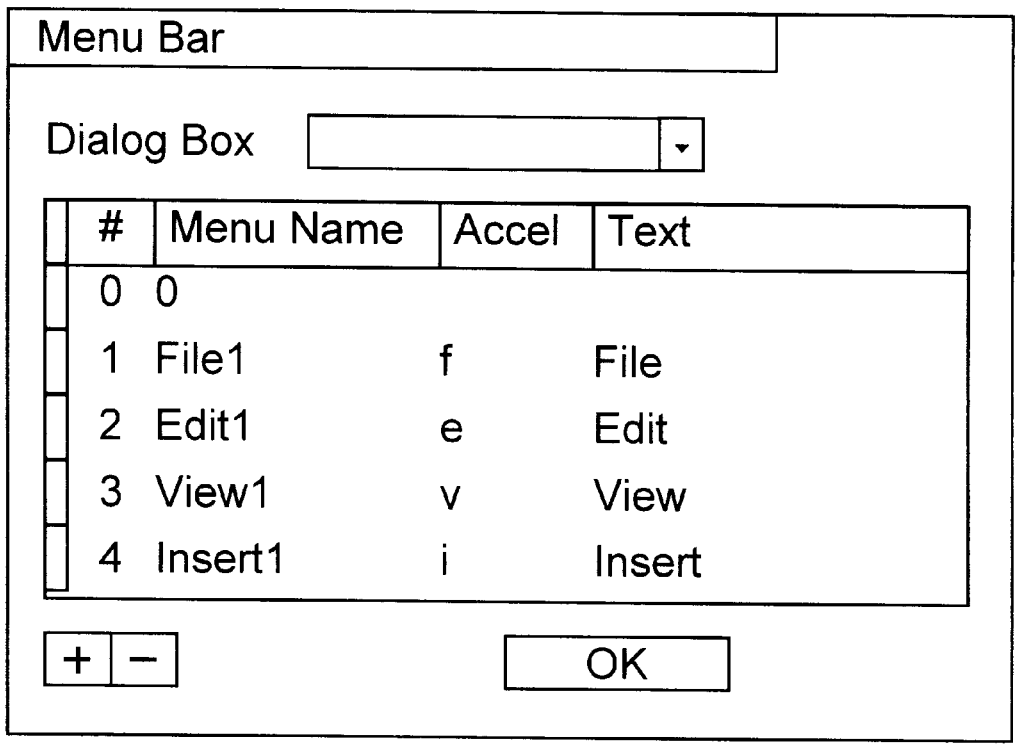
Figure 7:
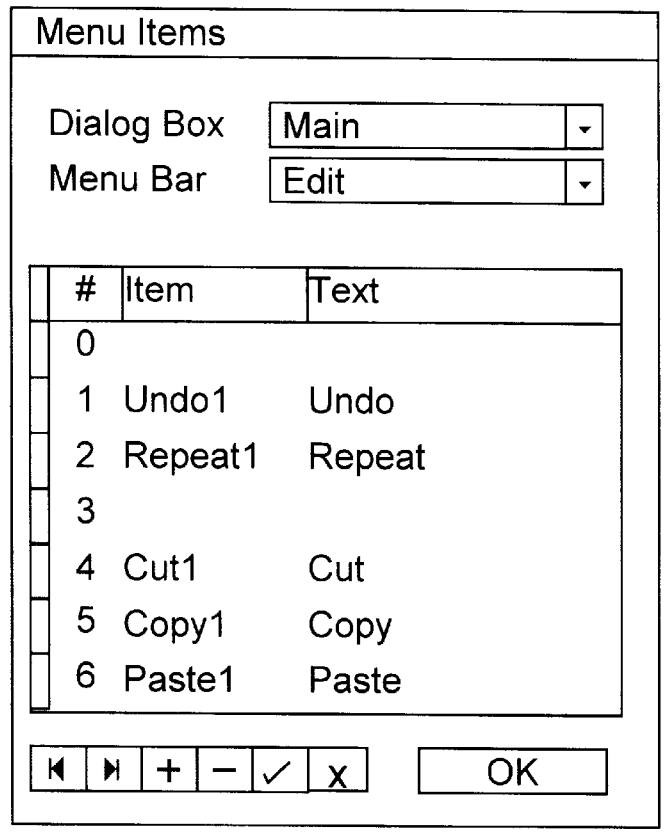
Figure 8:
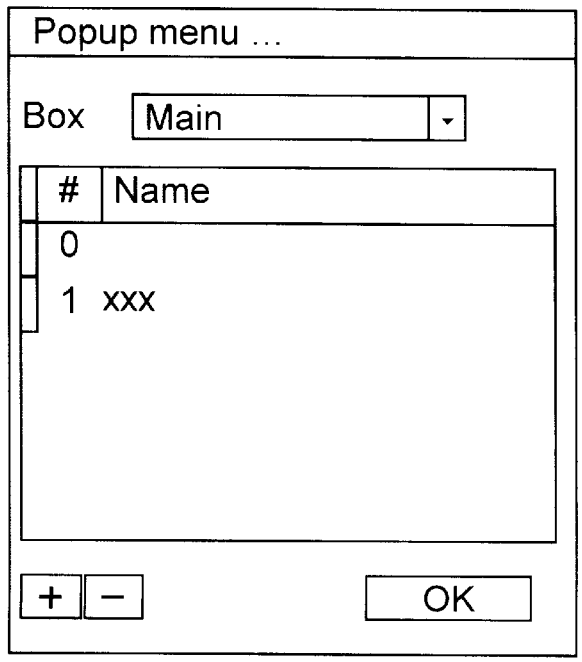
Figure 9:
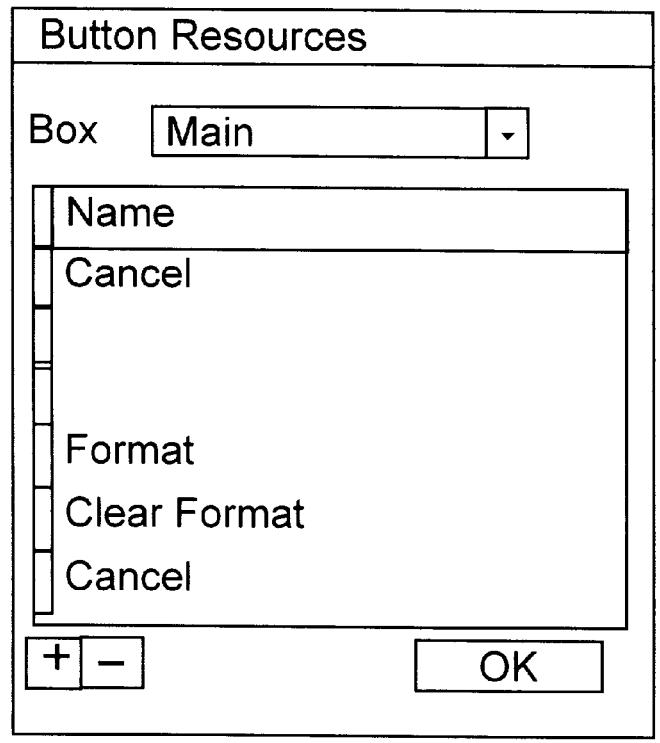
Figure 10:
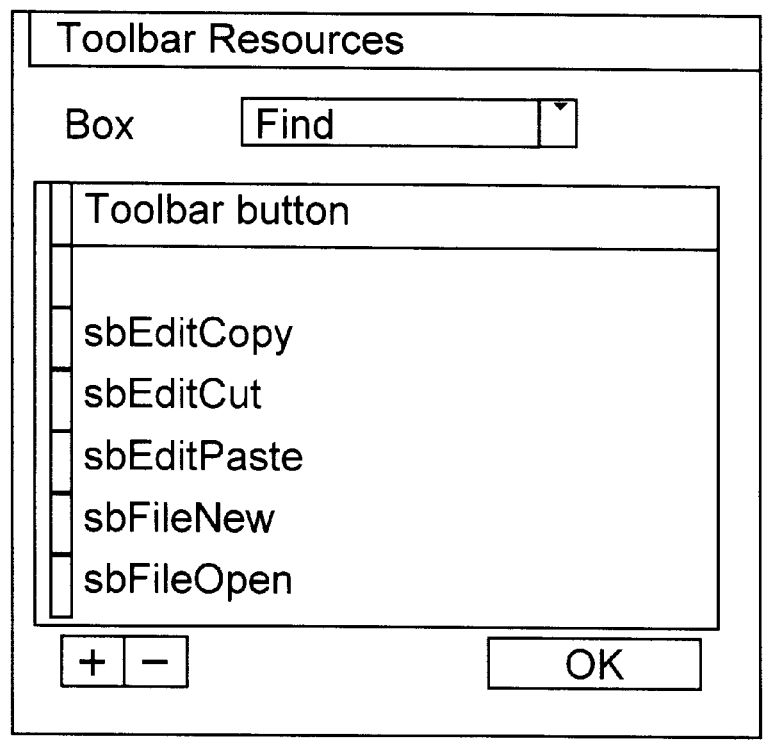
Figure 11:
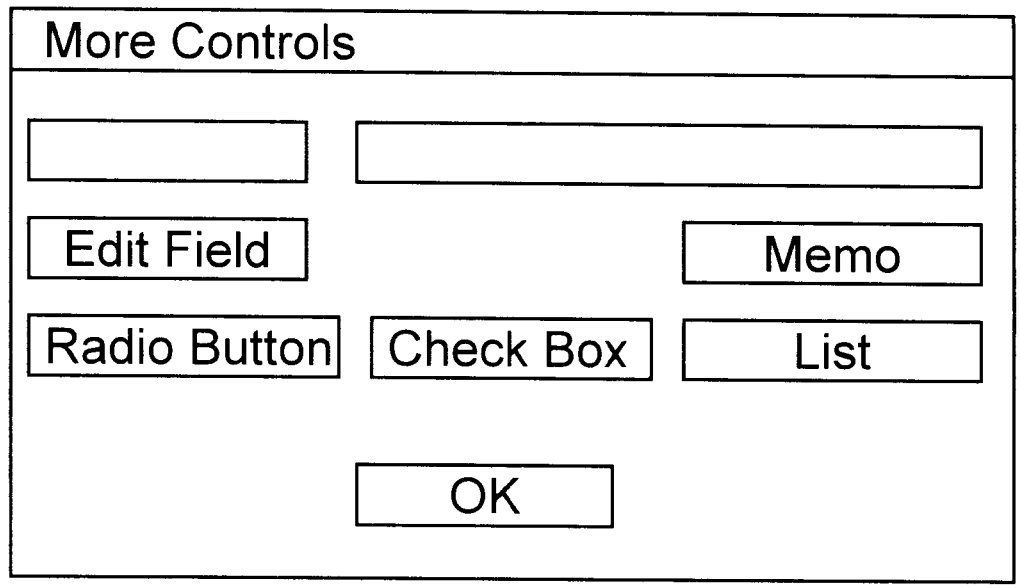

The Delphi form transitions, in the present example, within unit 20 are now described:

| From form | To form | Component Id | Component Text |
|---|---|---|---|
| FIG. 2 | FIG. 3 | button: bbYourProduct | label: Your Product |
| FIG. 2 | FIG. 4 | button: bbProcess | label: Process |
| FIG. 2 | FIG. 5 | button: bbDiaBox | label: Dialog Box |
| FIG. 2 | FIG. 6 | button: bbMenuBar | label: Menu Bar |
| FIG. 2 | FIG. 7 | button: bbMenuItem | label: Menu Item |
| FIG. 2 | FIG. 8 | button: bbPopup | label: Popup Menu |
| FIG. 2 | FIG. 9 | button: bbButton | label: Button |
| FIG. 2 | FIG. 10 | button: bbSpeed | label: Toolbar |
| FIG. 2 | FIG. 11 | button: bbMoreControls | label: More... |
| FIG. 2 | Quit | button: bbOK | label: OK | wherein FIGS. 2–11 describe the following Pascal unit files and Delphi forms:

| FIG. | Pascal Unit file (*.pas) | Delphi Form |
|---|---|---|
| 2 | Resource | ResourceForm |
| 3 | SelectProduct | SelectProductForm |
| 4 | Process | ProcessForm |
| 5 | Diabox | DiaboxForm |
| 6 | MenuBar | MenuBarForm |
| 7 | MenuItem | MenuItemForm |
| 8 | Popup | PopupForm |
| 9 | Button | ButtonForm |
| 10 | Toolbar | ToolbarForm |
| 11 | MoreControls | MoreControlsForm |

Figure 12:
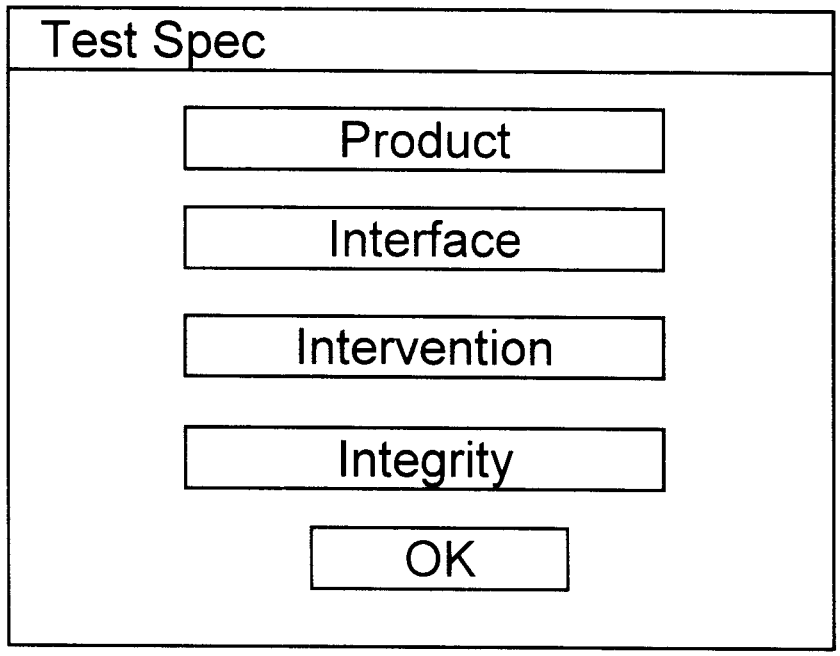

The Delphi form transitions, in the present example, within unit 30 are now described:

| From form | To form | Component Id | Component Text |
|---|---|---|---|
| FIG. 12 | FIG. 3 | button: BitBtn1 | label: Product |
| FIG. 12 | FIG. 13 | button: bbSpecify | label: Interface |
| FIG. 13 | FIG. 14 | button: bbProcesses | label: Processes |
| FIG. 13 | FIG. 15 | button: bbTriggers | label: Triggers |
| FIG. 13 | FIG. 16 | button: bbTask | label: Tasks |
| FIG. 16 | FIG. 17 | button: bbSetSubTasks | label: Specify Subtasks |
| FIG. 17 | FIG. 18 | button: bbSetGoals | label: Specify Goals |
| FIG. 18 | FIG. 19 | button: bbSetMethods | label: Specify Methods |
| FIG. 19 | FIG. 20 | button: bbSetSteps | label: Specify Procedure |
| FIG. 20 | FIG. 21 | button: bbSetNewTrigger | location: next to Standard option |
| FIG. 20 | FIG. 22 | button: bbGetOldTrigger | location: below Operation group |
| FIG. 22 | FIG. 15 | button: bbChange | label: Change |
| FIG. 12 | FIG. 23 | button: BitBtn2 | label: Intervention |
| FIG. 23 | FIG. 32 | field: DBEdit1 | label: Hot Key |
| FIG. 23 | FIG. 32 | field: DBEdit2 | label: Bypass |

-continued

| From form | To form | Component Id | Component Text |
|---|---|---|---|
| FIG. 12 | FIG. 24 | button: bbEvaluate | label: Integrity |
| FIG. 24 | FIG. 25 | button: bbSubTasks | label: Subtasks with no Goals |
| FIG. 24 | FIG. 26 | button: bbGoals | label: Goals with no Methods |
| FIG. 24 | FIG. 27 | button: bbMethods | label: Methods with no Steps |
| FIG. 24 | FIG. 28 | button: bbSteps | label: Steps without Operations |
| FIG. 24 | FIG. 29 | button: bbOperations | label: Missing Triggers |
| FIG. 24 | FIG. 30 | button: bbFeatures | label: Redundant Triggers |
| FIG. 24 | FIG. 31 | button: bbStandards | label: From Trigger to Task |
| FIG. 12 | Quit | button; bbOK | label: OK | wherein FIGS. 12–32 describe the following Pascal unit files and Delphi forms:

| FIG. | Pascal Unit file (*.pas) | Delphi Form |
|---|---|---|
| 12 | BetaSpecMain | BetaSpecMainForm |
| 13 | Interface | InterfaceForm |
| 14 | Process | ProcessForm |
| 15 | FindTrigger | FindTriggerForm |
| 16 | MainTask | MainTaskForm |
| 23 | InterventionControl | InterventionForm |
| 32 | GetShortcutKey | GetShortcutKeyForm |
| 24 | Integrity | IntegrityForm |
| 25 | NulSubT | NulSubTaskForm |
| 26 | NulGoal | NulGoalForm |
| 27 | NulMethod | NulMethodForm |
| 28 | NulStep | NulStepForm |
| 29 | NulOperation | NulOperationForm |
| 30 | MissingTask | MissingTaskForm |
| 31 | TriggerToTask | TriggerToTaskForm |
| 32 | GetShortcutKey | GetShortcutKeyForm |

Figures 39, 40:
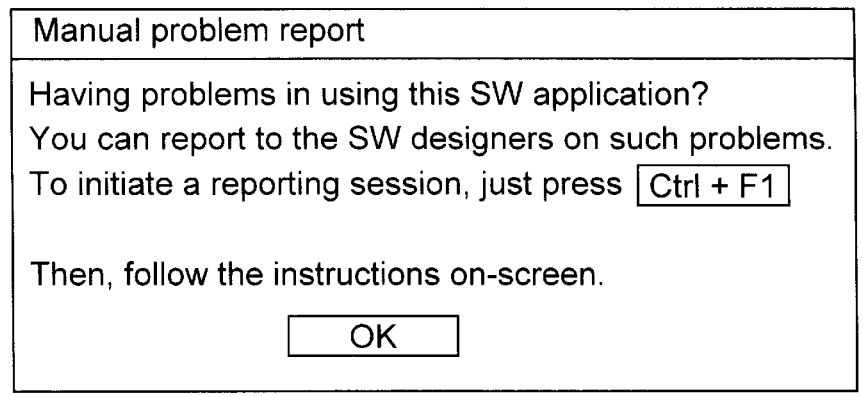

The Delphi form transitions, in the present example, within unit 32 are now described:

| From form | To form | Component Id | Component Text |
|---|---|---|---|
| FIG. 33 | FIG. 3 | button: bbSelectProduct | label: Product |
| FIG. 33 | FIG. 23 | button: bbControls | label: Intervention Controls |
| FIG. 33 | FIG. 34 | button: bbIntervention | label: Default Intervention Policy |
| FIG. 34 | FIG. 32 | field: BypassKey | label: Bypass |
| FIG. 33 | FIG. 35 | button: bbDetails | label: Users |
| FIG. 33 | FIG. 36 | button: bbStatus | label: Status |
| FIG. 33 | Quit | button: bbOK | label: OK | wherein FIGS. 33–36 describe the following Pascal unit files and Delphi forms:

| FIG. | Pascal Unit file (*.pas) | Delphi Form |
|---|---|---|
| 33 | MainSetup | MainSetupForm |
| 23 | InterventionControl | InterventionControlForm |
| 34 | DefaultIntervention | DefaultInterventionForm |
| 32 | GetShortcutKey | GetShortcutKeyForm |
| 35 | UserProfile | UserProfileForm |
| 36 | Status | StatusForm | the Delphi form transitions, in the present example, within unit 35 are now described:

| From form | To form | Component Id | Component Text |
|---|---|---|---|
| FIG. 37 | FIG. 3 | button: bbselectProduct | location: upper left corner |
| FIG. 37 | FIG. 38 | button: bbUserId | image: person |
| FIG. 38 | FIG. 39 | button: bbOK | label: OK |
| FIG. 37 | FIG. 40 | button: bbActions | label: Actions |
| FIG. 37 | FIG. 41 | button: bbProblems | label: Problems |
| FIG. 42 | FIG. 43 | button: bbIgnore | label: Ignore |
| FIG. 43 | FIG. 49 | button: bbIntention | label: I intended to do... |
| FIG. 42 | FIG. 49 | button: bbHelp | label: Guide |
| FIG. 44,45,46 | FIG. 47 | button: bbIgnore | label: Ignore |
| FIG. 47 | FIG. 49 | button: bbIntention | label: I intended to do... |
| FIG. 44,45,46 | FIG. 48 | button: bbMore | label: Tips |
| FIG. 44,45,46 | FIG. 49 | button: bbHelp | label: Guide |
| FIG. 49 | FIG. 50 | button: bbNotFound | label: Report |
| FIG. 50 | FIG. 51 | button: bbInform | label: Inform |
| FIG. 49 | FIG. 52 | button: bbFound | label: but... |
| FIG. 52 | FIG. 50 | button: bbNotFound | label: Report |
| FIG. 52 | FIG. 53 | button: bbFound | label: but... |
| FIG. 53 | FIG. 50 | button: bbNotFound | label: Report |
| FIG. 53 | FIG. 54 | button: bbFound | label: but... |
| FIG. 54 | FIG. 50 | button: bbNotFound | label: Report |
| FIG. 54 | FIG. 55 | button: bbFound | label: but... |
| FIG. 55 | FIG. 50 | button: bbNotFound | label: Report |
| FIG. 55 | FIG. 56 | button: bbFound | label: but... |
| FIG. 56 | FIG. 51 | button: bbInform | label: Inform |
| FIG. 56 | FIG. 40 | button: bbOK | label: OK | wherein FIGS. 37–56 describe the following Pascal unit files and Delphi forms:

| FIG. | Pascal Unit file (*.pas) | Delphi Form |
|---|---|---|
| 37 | BetaSpy | BetaSpyForm |
| 38 | UserDetails | UserIdForm |
| 39 | CtrlF1 | CtrlF1Form |
| 40 | Actions | ActionForm |
| 41 | ProblemReport | ProblemForm |
| 42 | OnDelay | OnDelayForm |
| 43 | OnIgnoreDelay | OnIgnoreDelayForm |
| 44 | OnCancelForm | OnCancelForm |
| 45 | OnHelp | OnHelpForm |
| 46 | OnUndo | OnUndoForm |
| 47 | OnIgnoreCancel | OnIgnoreEscapeForm |
| 48 | OnBypass | BypassForm |
| 49 | InquireMainTask | InquireTaskForm |
| 50 | TaskNotFound | TaskNotFoundForm |
| 51 | Promise | PromiseForm |
| 52 | InquireSubTask | InquireSubTaskForm |
| 53 | InquireGoal | InquireGoalForm |
| 54 | InquireMethod | InquireMethodForm |
| 55 | InquireStep | InquireStepForm |
| 56 | InquireStandard | InquireStandardForm | the Delphi form transitions, in the present example, within unit 90 are now described:

| From form | To form | Component Id | Component Text |
|---|---|---|---|
| FIG. 57 | FIG. 58 | button: bbUsage | label: Component Usage |
| FIG. 58 | FIG. 3 | button: bbYourProduct | label: YourProduct |
| FIG. 58 | FIG. 59 | button: bbProcess | label: Process |
| FIG. 58 | FIG. 60 | button: bbDiabox | label: Dialog Box |
| FIG. 58 | FIG. 61 | button: bbMenuBar | label: Menu Bar |
| FIG. 58 | FIG. 62 | button: bbMenuItem | label: Menu Item |
| FIG. 58 | FIG. 63 | button: bbPopup | label: Popup Menu |
| FIG. 58 | FIG. 64 | button: bbButton | label: Button |
| FIG. 58 | FIG. 65 | button: bbSpeed | label: Toolbar |

-continued

Figures 66, 67:
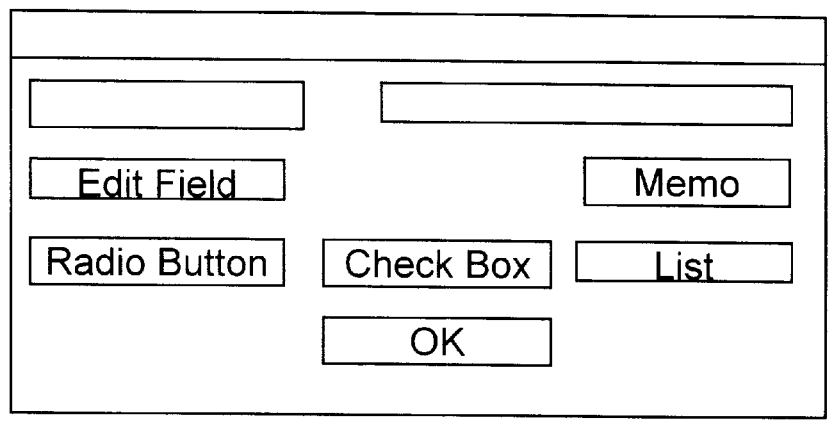

| From form | To form | Component Id | Component Text |
|---|---|---|---|
| FIG. 58 | FIG. 66 | button: bbMoreControls | label: More... |
| FIG. 57 | FIG. 67 | button: bbAccess | label: Access Difficulties |
| FIG. 57 | FIG. 68 | button: bbConflict | label: Conflicting Components | wherein FIGS. 57–68 describe the following Pascal unit files and Delphi forms:

| FIG. | Pascal Unit file (*.pas) | Delphi Form |
|---|---|---|
| 57 | ProblemSolver | SolverForm |
| 58 | ComponentUsage | ComponentUsageForm |
| 59 | ProcessUsage | ProcessForm |
| 60 | DiaboxUsage | DiaboxForm |
| 61 | MenuBarUsage | MenuBarForm |
| 62 | MenuItemUsage | MenuItemForm |
| 63 | PopupUsage | PopupForm |
| 64 | ButtomUsage | ButtonForm |
| 65 | ToolbarUsage | ToolbarForm |
| 66 | MoreControls | MoreControlsForm |
| 67 | AccessProblem | AccessProblemForm |
| 68 | ConflictSummary | ConflictForm |

Advantages of the first embodiment based on FIGS. 2–68 and on Appendices 1–6, including problems existing in the prior art which are overcome by the first embodiment, preferably include at least some and preferably all of the following:

To the End User
  The end user will able to compare his actual action with the intended one. This will facilitate the acquisition of the required psycho motoric skills
  End user, such as in beta sites, are often required to report on usability problems. Typically, the reporting procedure is a burden, and end users try to avoid it. Computer guided reporting may be much easier to follow. As a result, the number of reported problems may dramatically increase.

To the Help Desk
  Making the help desk more efficient, by:
  Automatic problem reporting. User problems are recorded at the user site. The help desk personnel may get these reports automatically, rather than by manual recording of user complains on the phone
  The database of usability errors will be much larger, because the users will report on many problems they do not report using conventional means
  The help desk may apply statistics to evaluate the frequency and severity of user problems, in terms of time waste.

To System Design
  Making the system more user friendly, by:
  Adding wizards: for example, to facilitate the procedure of moving text, the designers can add a wizard that prompts the user to first select the text to be moved, then confirm selection in order to cut it to the clipboard, then mark the new location and finally confirm the new location, in order to paste the text from the clipboard
  Disable certain keys: for example, disabling the Insert key may prevent the mode error of Overwrite, which is not very useful in Windows style text editing
  Changing the control of mode transition: for example by changing the toggle control between upper case and lower case from Caps Lock to, say, Ctrl+Caps Lock, the number of unintentional mode changing may dramatically decrease
  Removing excessive shortcut key combinations: for example, by removing the shortcut key combination Ctrl+Alt+F and Ctrl+Alt+H, which are error prone, the user can avoid confusing situations of getting the wrong dialog box or hiding of the selected text.

Definition of a Usability Problem
  2 types of usability problems are concerned:
  Procedural problems: when the user cannot find the sequence of operation required to accomplish a task: for example (Text editing), if the user wishes to move a text block. S/he may fail to know the sequence: Select, Cut to clipboard, Mark new location, Paste from clipboard
  System response to erroneous operation: for example (Text editing), if the user erroneously pressed the Caps Lock key, the computerized system starts inserting upper case letters instead of lower case letters.

The Need for the Invention
  Currently, only a small portion of the total amount of problems is detected.
  Currently, the main source of information on usability problems is user reports.
  Usually, reports based on in-house testing are not reliable, because testers cannot represent the end user properly. To get reliable information on usability problems, the computerized system should be tested by the end users, at the place where they use it.
  However, reports of end users are not comprehensive, because:
  Users are not aware of many of the problems: for example, many users are not aware of erroneous depression of the Alt key, since they do not notice the corresponding screen change
  Even when they are aware of a problem, they are not willing to report on it: Sometimes, for example, if they do not know how to move a text block, they try to solve it themselves, by referring to the user documentation or by asking for help of their colleagues. Some other times, for example, if they hit the Caps Lock key accidentally, they consider it to be their own fault, rather than the design's fault.
  Partially, Usability labs can help to solve these problems. However:
  They are very expensive. As a result, those systems that are tested, are only partially tested. The majority of "minor" problems is neglected
  Some usability problems are very hard to detect manually. For example, in MS Word 6.0, there are several situations of conflicting shortcut key combination. For example, Ctrl+H is used to activate the "Replace" dialog box and the Ctrl+Shift+H is (rarely) used to hide text. When pressing the Ctrl+Shift+H key combination instead of Ctrl+H, the selected text becomes hidden, when the user expects the dialog box "Replace" to appear on screen. Although Microsoft tested Word 7.0 extensively in usability labs and in many beta sites, they did not detect this problem, and did not remove the problematic key combination.
  The way to overcome these shortcomings is by automation. The conventional means for automation is by the technology of Record/Playback, used in many utilities of software testing, such as WinRunner of Mercury Interactive, Vermont NighTest 2.0 of Vermont Creative Software Inc., QA Partner 2.0.1 of Segue Software Inc., PureVision of Pure Software, Inc., AutoTester 3.1 of AutoTester Inc., CA-Verify of Computer Associates International Inc.

However, these utilities do not detect usability problems as those described above: they are intended mainly for regression testing typically, they do not look for indications of user problems, such as delay in the user response, the user request for Help or the cases when the user regrets his recent action.

Also, they do not record the user intention. Thus, if the user has a problem, they do not have the data for analyzing the reason for the user delay. For example, if the user invoked the Help facility to find out how to move text, they have not means to realize that s/he does not know how to move text.

The Invention

1. Automatic recording of the user actions, as conventionally implemented for regression testing.
2. Detection of events typical to cases of user problems
3. Inquiring the user for his intention, and recording the user response
4. In case that the user succeeded in following the operational procedure, but was surprised by the system response, inquiring the intended action, and recording it as well.

Using this procedure, the invention allows to automatically detect many of the user problems, to help him to solve certain problems and to prompt him to record the data required for the problem analysis.

A description of preferred modes of operation of the embodiment based on Appendices 1–6 is now provided:

HOW IT WORKS

Detecting and Reporting on a Procedural Problem
Detection

Suppose the user fails to follow a procedure (such as moving text). In this case the user may do any of the following:

Pause the interaction, looking for help from outside, (colleagues, user documentation)

Invoke the on-line Help facility

Try the components on screen (trial and error)

Invoke the apparatus in hope to get useful instructions

The apparatus will intervene as follows:

In the first case, a screen display as in FIG. 42 will pop up

Figure 45:
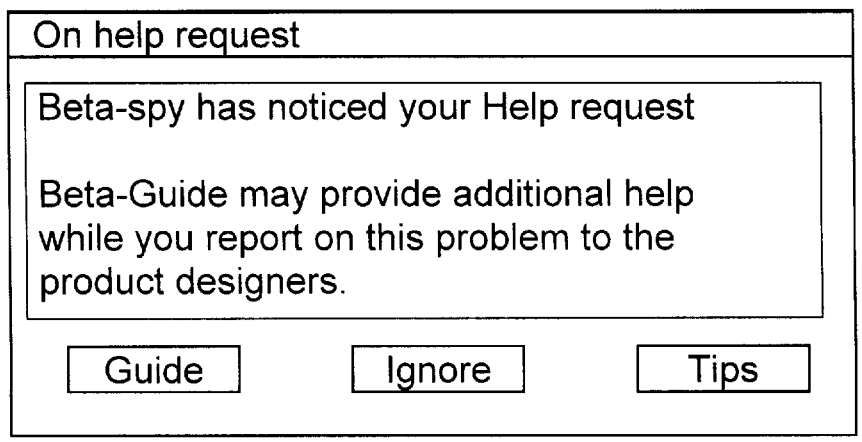

In the second case, a screen display as in FIG. 45 will pop up

Figure 44:
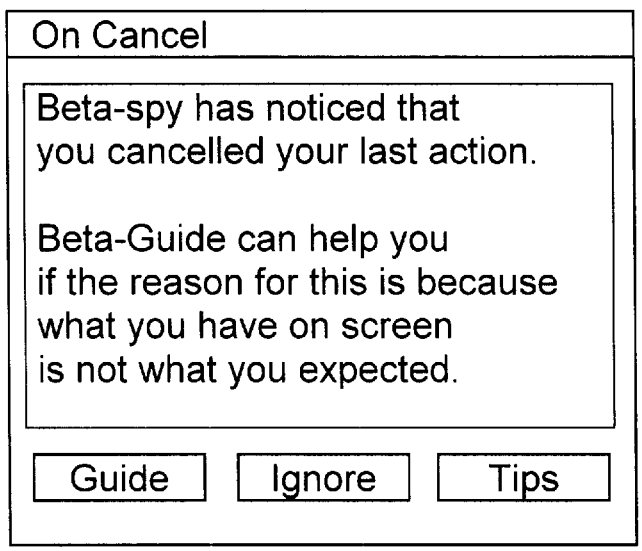
Figure 46:
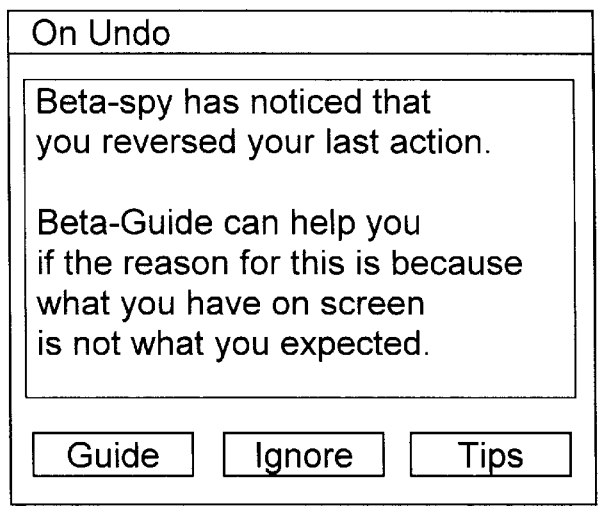

In the third case, if the trial ended up in error, a screen display as in FIG. 46 will show up, if the user chose to Undo his last action, or a screen display as in FIG. 44 will show up, if the user has chosen to Cancel his last action In the fourth case, the user initiates the interaction with the apparatus, for example, by pressing the Ctrl+F1 key combination.

Starting a Reporting Session

In the first three cases, different screen displays will show up, allowing the user to get instructions, aimed for reporting but also to help the user to resume normal operation.

The user may normally choose to click the Guide button from the screen display that pops up. In this case, he will get a screen display such as that of FIG. 49, prompting him to specify his intention.

If the user wishes to skip the reporting procedure, s/he may click the Ignore button. In this case, a screen display as in FIG. 43 will show up. There, s/he will get a second chance to report the problem, if s/he clicks the second option and then the "I intended to do . . . " button that shows up. In this case, he will get a screen display such as that of FIG. 49, prompting him to specify his intention. If s/he chooses to click any of the other options, no reporting will take place, and the user will resume normal operation of the computerized system. In the fourth case, the user will get the screen display as in FIG. 49 immediately

Reporting the User Intention

Task Reporting

Reporting the intention starts with the screen display as in FIG. 49. The user is prompted to specify his intention by selection from the task list. On selection, the second option is activated, and the "but . . . " button shows up. On pressing the "but . . . " button, a screen display as that of FIG. 52 is activated, for specifying the subtask.

If the user cannot find the intention in the task list, s/he will normally click the first option. In this case, s/he will be prompted to specify the intended task.

Subtask Reporting

Figures 51, 52:
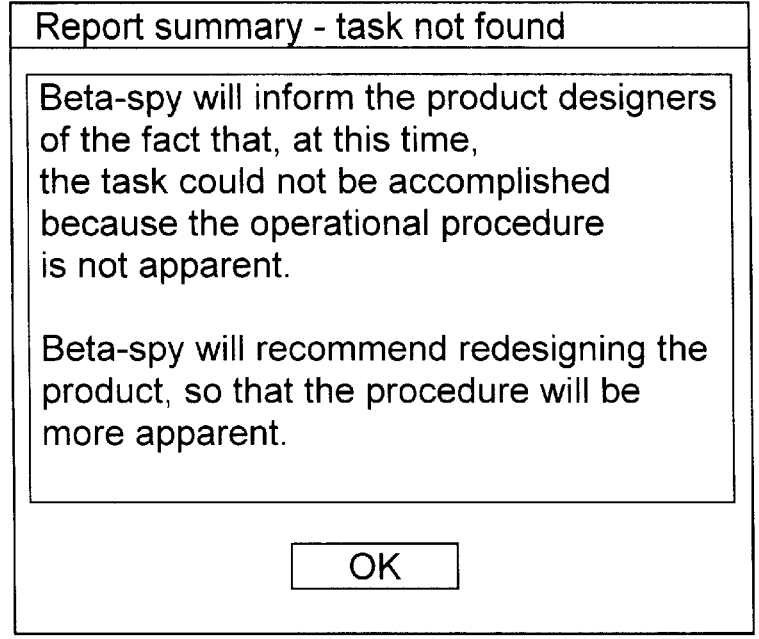

Reporting the subtask starts with the screen display as in FIG. 52. The user is prompted to specify his subtask by selection from the list. On selection, the second option is activated and the "but . . . " button shows up. On pressing the "but . . . " button, a screen display as that of FIG. 53 is activated, for specifying the user goal.

If the user cannot find the subtask in the list, s/he will normally click the first option. In this case, s/he will be prompted to specify the intended subtask. On pressing the Report button, a screen display such as in FIG. 50 will pop up, to specify the information source that should be fixed. On pressing the OK button, the reporting session terminates.

Goal Reporting

Reporting the goal starts with the screen display as in FIG. 53. The user is prompted to specify his goal by selection from the list. On selection, the second option is activated and the "but . . . " button shows up. On pressing the "but . . . " button, a screen display as that of FIG. 54 is activated, for specifying the intended method.

If the user cannot find the goal in the list, s/he will normally click the first option. In this case, s/he will be prompted to specify the intended goal. On pressing the Report button, a screen display such as in FIG. 50 will pop up, to specify the information source that should be fixed. On pressing the OK button, the reporting session terminates.

Method Reporting

Reporting the method starts with the screen display as in FIG. 54. The user is prompted to specify his intended method by selection from the list. On selection, the second option is activated and the "but . . . " button shows up. On pressing the "but . . . " button, a screen display as that of FIG. 55 is activated, for specifying the desired method.

If the user cannot find the method in the list, s/he will normally click the first option. In this case, s/he will be prompted to specify the intended method. On pressing the Report button, as screen display such as in FIG. 50 will pop up, to specify the information source that should be fixed. On pressing the OK button, the reporting session terminates, Step Reporting Reporting the step starts with the screen display as in FIG. 55. The user is prompted specify the step in the operational procedure by selection from the step list. On selection, the second option is activated and the "but . . . " button shows up. On pressing the "but . . . " button, a screen display as that of FIG. 56 is activated, for specifying the intended action.

If the user cannot find the step in the list, s/he will normally click the first option. In this case, s/he will be prompted to specify the intended step. On pressing the Report button, a screen display such as in FIG. 50 will pop up, to specify the information source that should be fixed. On pressing the OK button, the reporting session terminates.

Detecting and Reporting a Problem of Incompatible System Response to a User Error Detection Suppose the user took the wrong action. If the system is properly designed, it will provide an error message. However, sometimes the erroneous action is legal in terms of the system.

Examples:

Wrong menu selection

Unintentional depression of the Caps Lock, Insert or Alt key (mode errors)

Unintentional usage of the wrong key combination, such as Ctrl+Shift+F instead of Ctrl+F or Ctrl+Shift+H instead of Ctrl+H In these cases, the user often thinks that the system response is not compatible to his action.

In this case the user may do any of the following:

Undo or cancel the last action

Pause the interaction, looking for help from outside (colleagues, user documentation)

Invoke the on-line Help facility.

Using conventional reporting means, most likely, the user will not report on these problems.

Using the apparatus, report will be initiated by the apparatus, as follows:

In the first case, a screen display as in FIG. 46 will show up, if the user chose to Undo his last action, or a screen display as in FIG. 44 will show up, if the user has chosen to Cancel his last action.

In the second case, a screen display as in FIG. 42 will pop up

In the third case, a screen display as in FIG. 45 will pop up.

Starting a Reporting Session

As above

Reporting the User Intention

As above

Facilitating the User Recovery Procedure

The apparatus optionally informs the user of his actual action.

A system, constructed and operative in accordance with a first embodiment of the present invention, for monitoring the usability of a Windows application is now described. The system is termed "ErgoLight" for simplicity.

Overview

ErgoLight is a family of solutions, that helps the developers of a Windows application to make it efficient and easy to use. Efficiency and ease of use are obtained by providing detailed and statistical information about the usability of the application:

How do the users get the features they need

When and how do they fail to use the features

ErgoLight provides this information, that is not available otherwise, using a knowledge base of human factors. Based on this information, application engineers can monitor usability issues through the whole project life cycle, starting from the demo phase, continuing with the testing and deployment phases, up to the stage of intensive operation.

Using ErgoLight, the organization can benefit from:

Increase in the user satisfaction

Saving much of the expenses due to calls to technical support.

The technologies integrated in ErgoLight include:

A knowledge base of human factors

A knowledge base of style guides and design rules

Rule based analysis of error prone procedures

Journalling and playback of the user actions

On-line analysis of usability problems

Statistical computation of the cost-effectiveness of design features

On the job learning (knowledge acquisition) and training (skill acquisition)

The Usability Issue

The usability issue is mainly that of making the proper design decisions. The shortest and easiest way for decision making is to let the programmers to decide, according to their "common sense". When budget and time are short, this might be the best way.

It is commonly agreed in the community of Usability engineers that applications designed this way might suffer from many usability problems. The main reason for this is that SW designers and system analysts do not represent the end user properly. While the end users are task oriented, system analysts are feature oriented and SW designers are control oriented. The transition from tasks to features and controls is problematic. Often, SW designers do not anticipate the situations when end users will fail to find a feature they need to accomplish their task. This problem turn to be critical for applications aimed for non-technical users.

A convenient "solution" to this problem relies on style guides. Style guides define various aspects of the appearance of controls that are common to many applications. Obviously, style guides are not applicable to application specific features.

A common approach to designing application specific features is by asking the end user for their preferences. Occasionally, users can provide valuable information concerning the functionality of the application. In testing, they can complain about tasks that they could not accomplish.

The main problem with this approach is that end users are not aware of their actual needs. Eventually, their preferences are adequate for the deployment phase, but not for the phase of intensive usage. Typically, end users are not aware of the change expected in their preferences as they become more skilled in intensive operation. As a result, new applications defined with the help of the end users tend to become a burden when the operation is intensive.

Another problem with this approach is that end users are not aware of a multitude of failure modes during their interaction with the application. Users errors reduce operational performance by more than 50%, slow down the learning rate and raise the user's frustration and stress level. For example, end users often do not notice psycho motoric errors, such as pressing the wrong key, neither do they follow the sequence of events leading to the failure to accomplish a task. End users are not accustomed to analyze the sensitivity of the application to such errors.

Usability Testing

During the testing phase, designers look also for usability problems, not detected at the design phase. Traditionally, usability testing is performed by testing teams at the development site. Eventually, the operational skills of a tester in the development site are quite different from those of the end user. The observations of such a tester may often lead to wrong conclusions. In addition, typical testing teams are not aware of usability design rules, and do not have the means to evaluate usability features. Neither can they compare reliably alternative implementations.

Alpha-testing (at the development site) may contribute only when the application is for use by persons with technical background. Otherwise, the conclusion from these testing might be wrong. Beta-testing (at the customer site) contribute to finding critical usability problems, such as failure to follow a procedure after a lengthy (several hours) research, or to errors that result in data destruction (only if they can repeat the sequence of events that lead to the data destruction). Typically, end users do not bother to report about the multitude of minor problems, the cumulative effect of which is enormous. The main reason for this is that end users are not aware of most of the errors they make. In many other situations, the user is aware of the failure, but not to the action or the sequence of events that lead to the failure. In case that they are faced with an operational error, they tend to attribute the reason for the mal operation to themselves, rather than to the design.

The way large SW companies examine usability issues is through Usability Labs. In those labs, typical users are being observed while they perform their tasks. Eventually, small SW houses may use external usability lab services (e.g. OrCAD Systems; Cadence Design Systems).

The problems with this approach are:

Observations provide partial data. Data collection in Usability Labs is manual, ending up with having a small portion of the huge bulk of user problems +Observations do not provide quantitative measurements of cost-effectiveness The validity of the conclusions depends on the ability to simulate the real operational environment The validity of the interpretations depends on the skills of the observers (typically, usability engineers)

Observations are time consuming.

Observations are expensive.

ErgoLight is the only tool available today, that measures usability data in a real operational environment and that automatically provides valuable and meaningful information on usability issues.

Who May Benefit from ErgoLight

As a tool for finding bugs, ErgoLight might be considered as an automated testing tool. Actually, ErgoLight appeals to the same market as do the Automated Testing tools, namely, SW houses, system houses, technical consulting companies and corporate IS organizations. However, the information obtained by ErgoLight is totally different; while the "traditional" testing tools are aimed to find implementation deviation from the design, ErgoLight is aimed to find problems in the design itself.

ErgoLight can be used as:

A testbed in beta sites

A means for effective data collection in Usability labs

An add-on to Windows applications, to examine problems in setup parameters

A system for life cycle examination, from the demo phase to the phase of intensive usage.

ErgoLight Technologies

ErgoSpec Detection and identification of problems in the specification of the user interface, such as:
Insufficient guidance to the application features
Redundant complexity, caused by useless features and by multiple accessibility Incompatibility with style guides
Conflicting access, resulting in low user performance and in steep learning curve.

ErgoSpy Capturing usability problems "on the fly":
Capture all keyboard and mouse user actions
Support of all Windows controls defined in resource files
Capture situations of user confusion
Capture situations of wrong operation ErgoTest Journalling and on-line analysis of the users errors:
Filter real mistakes from intentional "Trial and Error" procedures
Detect failure modes in compound procedures
Find out gaps in the Help system, User's manual and Tutorial
Detect conflicting shortcut key combinations
Detect confusing terminology
Reveal the operational sequence resulting in data destruction ErgoGuide Extending the capability of "on the job" learning of the operational procedures, by providing help in one or more of the following ways:
Guidance, by presenting material prepared by the application engineer, such as a Help window
Awareness, by showing controls available to invoke a task
Reassurance, by confirming that a problem is of wrong design, rather than of wrong usage.

ErgoTrain On the job acquisition of operational skills, by providing:
Tracking, by showing the sequence of events leading to a problematic situation
Awareness, by showing the deviation from the procedure ErgoStat Playback and statistical measurement of Time To Recover (TTR) from a user error, classified by failure modes:
Problems of incompatibility to style guides
Problems typical to naive users
Problems in learning the operational procedures
Problems in learning the features by trial and error
Spontaneous user errors, typical to experienced users ErgoWiz GUI optimization, by quantitative evaluation and comparison of alternative design solutions:
User options
Operation modes
Setup parameters.

ErgoLight Solutions

BetaLight—The Usability Test Bed for the Beta Site

BetaLight is effective for capturing usability problems of the real end users in their real operational environment. BetaLight reduces development time and save testing costs by automation, much the same as do other automated testing tools.

BetaLight is the most effective means to capture user confusion and erroneous operation. It is the only means available today that captures the multitude on "minor" usability problems.

Data BetaLight uses the BetaSpy technology, that runs in the background to the

Collection application, "listening" to the computer-user interaction and recording it in a file. While recording, BetaSpy analyses the user reaction and detects situations when the user is either confused or responds erroneously. In such situations, BetaLight invokes the BetaGuide technology, that intervenes and offers on-line help.

Evaluation BetaLight uses the BetaStat technology, that performs statistical operations on the data, to obtain information about the effectiveness of the usability features, in terms of time waste.

ErgoLab—The Meter for Usability Engineering

ErgoLab can be integrated in Usability labs for initial testing of the application. There, much of the tedious work done by recording, playback and manual inspection, will be automated. Later, BetaLight can be integrated in the real application, for use in the real environment.

ErgoPlus—On The Job Usability Enhancement

ErgoPlus is the only means to evaluate usability problems attributed to the customization of Windows application. The evaluation, based on usability measures, directs the users in optimizing the options and setup parameters.

InfoLight—Life Cycle Examination of UI Effectiveness

Corporate IS organization do the usability testing with the actual end users, in the real environment. InfoLight can be used instead of the expensive Computer-Human-Interaction consultation, based on observations. It provides a mass of usability data, used for rapid, objective conclusions. Info-Light is used for testing through the complete life cycle, from the demo phase to the phase of intensive usage.

At the Demo Phase

InfoLight uses BetaSpec to capture problems in the product definition

At the Testing Phase

InfoLight uses BetaSpy to collect usability data, BetaGuide for providing extra help to the user and BetaStat for evaluation, much the same as BetaLight does.

At the Deployment Phase

InfoLight uses three technologies:

ErgoGuide—used mainly at the initial stage of the deployment phase, when user learn how to use the application.

ErgoTrain—used mainly after the user had acquired the basic skills, for performance improvement.

ErgoWiz—used to optimize the setup parameters to eliminate usability problems at both the personal and the team levels.

Following is a description of the data structures of tables used in a first embodiment of the present invention:

The following Paradox database tables are preferably stored in the [none1]user task database 34 of FIG. 1 according to a first embodiment of the present invention:

Button
Diabox
Goal
Intervention
Maintask
Menubar
MenuItem
Method
Popup
Process
Product
Step
Subtask
Toolbar
Trigger
UserClass
UserProfile The following Paradox database tables are preferably stored in the [none2]usability problem database 70 of FIG. 1 according to a first embodiment of the present invention:

Action
Problem

Following is a description of the data structures of the tables listed above:

| Field name | Type | Size |
|---|---|---|
| Actions.DB | | |
| | | |
| TheTime | @ | |
| ControlType | A | 12 |
| ControlIndex | S | |
| ControlName | A | 20 |
| Event | A | 12 |
| ActiveForm | A | 16 |
| ActiveControl | A | 16 |
| MouseX | A | 4 |
| MouseY | A | 4 |
| KeyChar | A | 1 |
| Button.DB | | |
| | | |
| Diabox | A | 20 |
| Name | A | 20 |
| Usage | S | |
| Diabox.DB | | |
| | | |
| Name | A | 20 |
| Usage | S | |
| Goal.DB | | |
| | | |
| Id | A | 2 |
| SubTask | A | 2 |
| MainTask | A | 2 |
| Text | A | 60 |
| Children | S | |
| Usage | S | |
| Intervention.DB | | |
| | | |
| Diabox | A | 20 |
| Name | A | 20 |
| Type | A | 10 |
| NuInMenuBar | S | |
| NuInMenuItem | S | |
| NuInPopup | S | |
| Button | A | 20 |
| ShortKey | A | 20 |
| BypassKey | A | 20 |
| MainTask.DB | | |
| | | |
| Id | A | 2 |
| Text | A | 40 |
| Children | S | |
| Usage | S | |
| MenuBar.DB | | |
| | | |
| DiaBox | A | 20 |
| Order | S | |
| Text | A | 20 |
| Name | A | 20 |
| Accel | A | 1 |
| Usage | S | |
| MenuItem.DB | | |
| | | |
| Diabox | A | 20 |
| NuInBar | S | |
| Order | S | |
| Name | A | 20 |
| Text | A | 20 |
| Usage | S | |
| Method.DB | | |
| | | |
| Id | A | 2 |
| Goal | A | 2 |

-continued

| Field name | Type | Size |
|---|---|---|
| SubTask | A | 2 |
| MainTask | A | 2 |
| Text | A | 60 |
| Children | S | |
| Usage | S | |
| Popup.DB | | |
| Diabox | A | 20 |
| Order | S | |
| Name | A | 20 |
| Usage | S | |
| Problem.DB | | |
| Time | @ | |
| UserName | A | 10 |
| SessionNumber | S | |
| What | A | 60 |
| MainTask | A | 2 |
| SubTask | A | 2 |
| Goal | A | 2 |
| Method | A | 2 |
| Step | A | 2 |
| Operation | A | 20 |
| HelpContents | L | |
| HelpSearch | L | |
| Tutorial | L | |
| UserGuide | L | |
| Process.DB | | |
| Name | A | 20 |
| Usage | S | |
| Product.DB | | |
| FileName | A | 30 |
| Path | A | 60 |
| OnCancel | L | |
| OnDelay | L | |
| OnHelp | L | |
| OnUndo | L | |
| TimeToIntervention | I | |
| DelayBypass | A | 20 |
| CurrentUser | A | 10 |
| CurrentUserClass | A | 12 |
| WelcomeCount | S | |
| Step.DB | | |
| Number | A | 2 |
| Method | A | 2 |
| Goal | A | 2 |
| SubTask | A | 2 |
| MainTask | A | 2 |
| Text | A | 60 |
| Operation | A | 20 |
| Trigger | A | 20 |
| Usage | S | |
| SubTask.DB | | |
| Id | A | 2 |
| MainTask | A | 2 |
| Text | A | 60 |
| Children | S | |
| Usage | S | |
| ToolBar.DB | | |
| Diabox | A | 20 |
| Name | A | 20 |
| Usage | S | |
| Trigger.DB | | |
| SrcBox | A | 20 |
| Name | A | 20 |
| TgtBox | A | 20 |
| Process | A | 20 |
| NuInBar | S | |
| NuInMenu | S | |
| NuInPopup | S | |
| Button | A | 20 |

-continued

| Field name | Type | Size |
|---|---|---|
| Toolbar | A | 20 |
| Shortkey | A | 20 |
| Usage | S | |
| UserClass.DB | | |
| Name | A | 12 |
| Percent | S | |
| Criterion | S | |
| NuOfUsers | S | |
| OnDelay | L | |
| OnCancel | L | |
| OnHelp | L | |
| OnUndo | L | |
| DelayTime | S | |
| UserProfile.DB | | |
| UserName | A | 10 |
| UserGroup | A | 12 |
| NuSessions | S | |
| OnDelay | L | |
| OnCancel | L | |
| OnHelp | L | |
| OnUndo | L | |
| DelayTime | S | |
| SessionNu | S | |
| NuProblems | S | |
| NuManual | S | |

There follows a description of a preferred method for employing the Appendices 1–6 to generate a software implementation of a system for identifying usability problems, the system being constructed and operative in accordance with a first embodiment of the present invention.

Enclosed herewith are Appendices 1–6 including computer listings useful in generating a first embodiment of the present invention.

A preferred method for employing Appendices 1–6 to generate an example of a software implemented system for identifying usability problems include the following steps:

1. Install Microsoft Windows/95 on a PC
2. Install Borland Developer version of Delphi 2.0 for Windows/95
3. Create the following directories:

| Usage | Example in Appendices 1–6 |
|---|---|
| Pascal Utilities | \ABBA\UTILS |
| Common Pascal units | \ABBA\ERGOLITE |
| Paradox Database tables | \ABBA\ERGOLITE\DB |
| Files of unit 20 | \ABBA\ERGOLITE\RESOURCE |
| Files of unit 30 | \ABBA\ERGOLITE\SPEC |
| Files of unit 35 | \ABBA\ERGOLITE\BETASPY |
| Files of unit 32 | \ABBA\ERGOLITE\TESTPLAN |
| Files of unit 80 | \ABBA\ERGOLITE\USAGE |

4. Define an alias name "BetaLite" for the Paradox Database tables directory (e.g. \ABBA\ERGOLITE\DB) and set it as the Working directory.
5. In the Working directory, use Delphi's Desktop to define the Paradox tables as depicted above:
6. Create utility Pascal units as listed in Appendix 1
7. Construct unit 20 (User interface learning) as follows:
   Create a Delphi project and save it as ResourceProject.dpr in directory of unit 20 (e.g. \ABBA\ERGOLITE\RESOURCE)

Create the data modules ResourceModule.pas and ProductModule.pas as in the pages listed in Appendix 2

Create the forms for the ResourceProject.dpr Delphi project according to FIGS. 2–11

Arrange the forms in the Delphi project in the order they appear in the listing of the ResourceProject.dpr Delphi project listed in Appendix 2

For each form, add events and code as in the Pascal units listed in Appendix 2. Use the form transition charts described above to name the components that do the transitions Build the EXE file (compile and link) and then run 8. Construct unit 30: User task breakdown, as follows:

Create a Delphi project and save it as Bspec.dpr in directory of unit 30 (e.g. \ABBA\ERGOLITE\SPEC)

Create the data modules InterventionModule.pas and TriggerFilterModule.pas as in the pages listed in Appendix 3

Create the forms for the Bspec.dpr Delphi project according to FIGS. 12–32

Arrange the forms in the Delphi project in the order they appear in the listing of the Bspec.dpr Project pages listed in Appendix 3

For each form, add events and code as in the Pascal units listed in Appendix 3. Use the form transition charts described above to name the components that do the transitions Build the EXE file (compile and link) and then run Construct unit 32: Test setup, as follows:

9. Create a Delphi project and save it as TestPlan.dpr in directory of unit 32 (e.g. \ABBA\ERGOLITE\TESTPLAN)

Create the data module UserModule.pas as in the pages listed in Appendix 4

Create the forms for the TestPlan.dpr Delphi project according to FIGS. 33–37

Arrange the forms in the Delphi project in the order they appear in the listing of the TestPlan.dpr Project pages listed in Appendix 4

For each form, add events and code as in the Pascal units listed in Appendix 4. Use the form transition charts described above to name the components that do the transitions Build the EXE file (compile and link) and then run 10. Construct unit 35: Usability problem identifier, as follows:

Create a Delphi project and save it as Bspy.dpr in directory of unit 35 (e.g. \ABBA\ERGOLITE\BETASPY)

Create the data module TestingModule.pas as in the pages listed in Appendix 5

Create the forms for the Bspy.dpr Delphi project according to FIGS. 38–56

Arrange the forms in the Delphi project in the order they appear in the listing of the Bspy.dpr Project pages listed in Appendix 5

For each form, add events and code as in the Pascal units listed in Appendix 5. Use the form transition charts described above to name the components that do the transitions Build the EXE file (compile and link) and then run 11. Construct unit 80: Usability problem solver, as follows:

Create a Delphi project and save it as Solver.dpr in directory of unit 80 (e.g. \ABBA\ERGOLITE\USAGE)

Create the forms for the Solver.dpr Delphi project according to FIGS. 57–68

Arrange the forms in order according to the Project pages listed in Appendix 6

Arrange the forms in the Delphi project in the order they appear in the listing of the Solver.dpr Project pages listed in Appendix 6

For each form, add events and code as in the Pascal units listed in Appendix 6. Use the form transition charts described above to name the components that do the transitions Build the EXE file (compile and link) and then run 12. To test a computerized system, use the hooks as in file JournalHooks.pas listed in Appendix 1.

The second implementation of the apparatus of FIG. 1 is now described with reference to FIGS. 69–123 and to Appendices 7–12.

Figure 69:
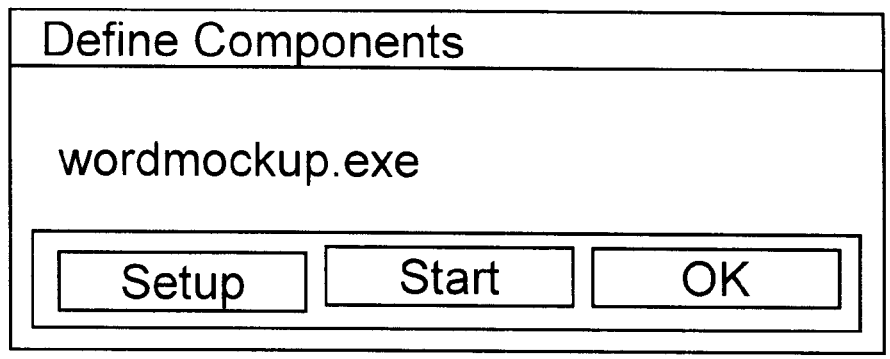

FIGS. 69–76 are pictorial illustrations of screen displays generated by unit 20 of FIG. 1 according to a second embodiment of the present invention. FIG. 69 is an initial screen display. The relationship between the screen displays of FIGS. 69–76 is described below including the relationships between the Delphi forms of the various screen displays, the Pascal units corresponding thereto, and an indication of the form component within a first screen display which, when selected, causes a particular second screen to be displayed.

Figures 77, 78:
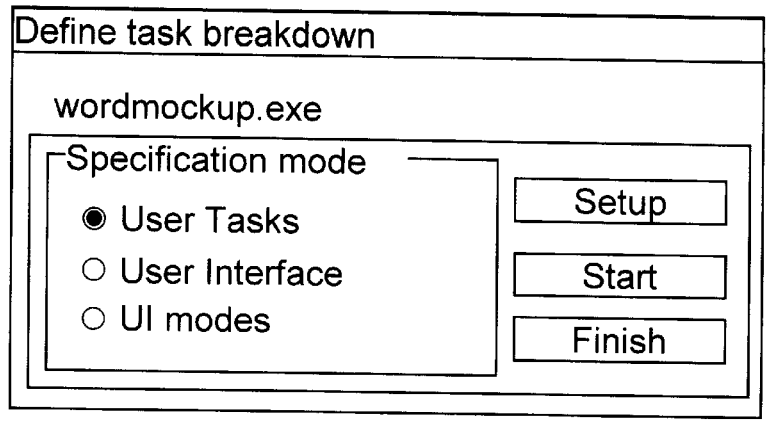

FIGS. 77–84 are pictorial illustrations of screen displays generated by unit 30 of FIG. 1 according to a second embodiment of the present invention. FIG. 77 is the initial screen display. The relationship between the screen displays of FIGS. 77–84 is described below including the relationships between the Delphi forms of the various screen displays, the Pascal units corresponding thereto, and an indication of the form component within a first screen display which, when selected, causes a particular second screen to be displayed.

FIGS. 85–86 are pictorial illustrations of screen displays generated by unit 32 of FIG. 1 according to a second embodiment of the present invention. FIG. 85 is the initial screen display. The relationship between the screen displays of FIGS. 85–86 is described below including the relationships between the Delphi forms of the various screen displays, the Pascal units corresponding thereto, and an indication of the form component within a first screen display which, when selected, causes a particular second screen to be displayed.

Figure 87:
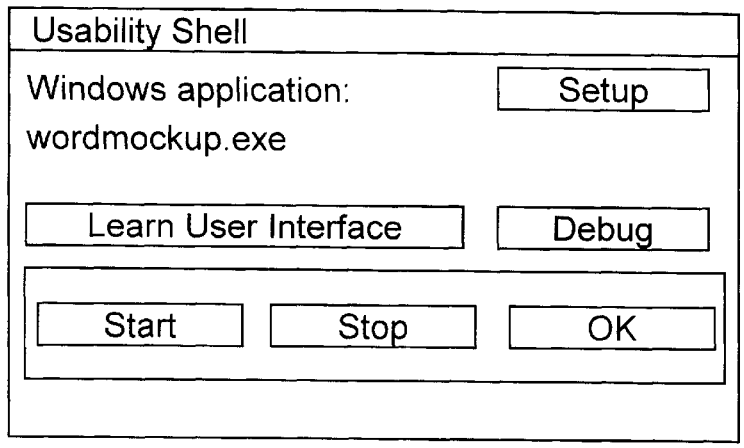

FIGS. 87–106 are pictorial illustrations of screen displays generated by unit 35 of FIG. 1 according to a second embodiment of the present invention. FIG. 87 is the initial screen display. The relationship between the screen displays of FIGS. 87–106 is described below including the relationships between the Delphi forms of the various screen displays, the Pascal units corresponding thereto, and an indication of the form component within a first screen display which, when selected, causes a particular second screen to be displayed.

Figures 107, 108:
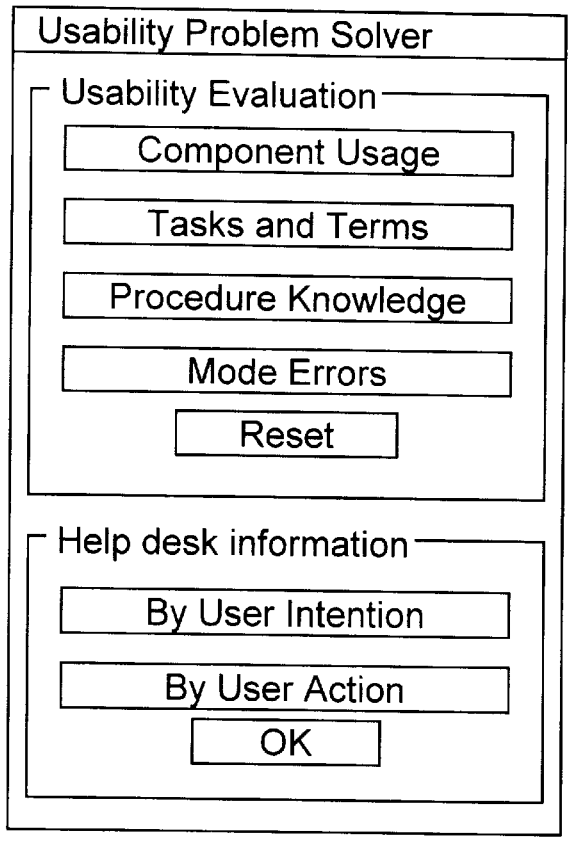

FIGS. 107–123 are pictorial illustrations of screen displays generated by unit 80 of FIG. 1 according to a second embodiment of the present invention. FIG. 107 is the initial screen display. The relationship between the screen displays of FIGS. 107–123 is described below including the relationships between the Delphi forms of the various screen displays, the Pascal units corresponding thereto, and an indication of the form component within a first screen display which, when selected, causes a particular second screen to be displayed.

Delphi form transitions within each of units 20, 30, 32, 35 and 80 according to a second embodiment of the present invention are now described. It is emphasized that the particular form transition structure described herein is merely an example and is provided for illustrative purposes only.

Figure 70:
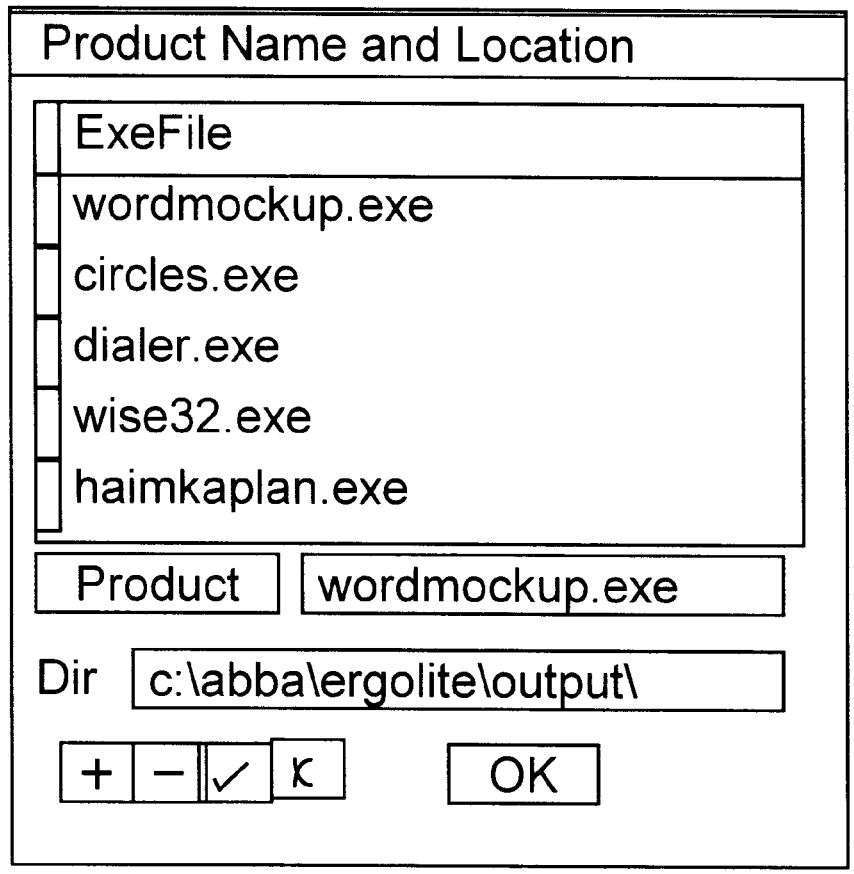

The Delphi form transitions, in the present example, within unit 20 are now described:

| From form | To form | Component Id | Component Text |
|---|---|---|---|
| FIG. 69 | FIG. 70 | button: bbSetup | label: Setup |
| FIG. 69 | FIG. 71 | button: bbStart | label: Start |
| FIG. 71 | FIG. 72 | button: bbTasks | label: Tasks |
| FIG. 71 | FIG. 73 | button: bbViewSpy | label: Debug |
| FIG. 73 | FIG. 74 | button: bbSpy | label: Spy |
| FIG. 74 | FIG. 75 | button: bbViewMenu | label: View |
| FIG. 73 | FIG. 76 | button: bbViewClas | label: Class | wherein FIGS. 69–76 describe the following Pascal unit files and Delphi forms:

| FIG. | Pascal Unit file (*.pas) | Delphi Form |
|---|---|---|
| 69 | GetComponentMain | MainForm |
| 70 | MainSetup | MainSetupForm |
| 71 | GetComponent | GetComponentForm |
| 72 | ComponentTasks | ComponentTasksForm |
| 73 | HyperSpy | HyperSpyForm |
| 74 | Spy | SpyForm |
| 75 | ViewMenu | MenuForm |
| 76 | ViewClass | ClassForm |

The Delphi form transitions, in the present example, within unit 30 are now described:

| From form | To form | Component Id | Component Text |
|---|---|---|---|
| FIG. 77 | FIG. 70 | button: bbSetup | label: Setup |
| FIG. 77 | FIG. 78 | button: bbStart | label: Start |
| FIG. 78 | FIG. 79 | button: bbSetSubTasks | label: Specify Subtasks |
| FIG. 79 | FIG. 80 | button: bbSetGoals | label: Specify Goals |
| FIG. 80 | FIG. 81 | button: bbSetMethod | label: Specify Methods |
| FIG. 81 | FIG. 82 | button: bbSetSteps | label: Specify Procedure |
| FIG. 82 | FIG. 83 | button: bbSetOperation | label: Specify Operation |
| FIGS. 78, 79, 80, 81, 82 | FIG. 84 | button: bbSetModes | label: SetModes |
| FIGS. 83, 84 | FIG. 73 | button: bbViewSpy | label: Debug | wherein FIGS. 77–84 describe the following Pascal unit files and Delphi forms:

| FIG. | Pascal Unit file (*.pas) | Delphi Form |
|---|---|---|
| 77 | DefTaskMain | MainForm |
| 78 | MainTask | MainTaskForm |
| 79 | SubTask | SubTaskForm |
| 80 | Goal | GoalForm |
| 81 | Method | MethodForm |
| 82 | Steps | StepsForm |
| 83 | Activation | ActivaitonForm |
| 84 | SetCondition | SetConditionForm |

The Delphi form transitions, in the present example, within unit 32 are now described:

| From form | To form | Component Id | Component Text |
|---|---|---|---|
| FIG. 85 | FIG. 86 | button: bbStart | label: Start |
| FIG. 86 | FIG. 73 | button: bbViewSpy | label: Debug | wherein FIGS. 85–86 describe the following Pascal unit files and Delphi forms:

| FIG. | Pascal Unit file (*.pas) | Delphi Form |
|---|---|---|
| FIG. 85 | GetIndicatorMain | MainForm |
| FIG. 86 | GetIndicators | GetIndicatorsForm |

The Delphi form transitions, in the present example, within unit 35 are now described:

| From form | To form | Event | Component Text |
|---|---|---|---|
| FIG. 87 | FIG. 70 | button: bbSetup | label: Setup |
| FIG. 87 | FIG. 88 | button: bbLearnUI | label: Learn UI |
| FIG. 88 | FIG. 73 | button: bbViewSpy | label: Debug |
| FIG. 88 | FIG. 89 | event: user delay | |
| FIG. 88 | FIG. 91 | event: Cancel, Esc request | |
| FIG. 88 | FIG. 92 | event: Help request | |
| FIG. 88 | FIG. 93 | event: Undo request | |
| FIG. 91, 92, 93 | FIG. 94 | button: bbIgnore | label: Ignore |
| FIG. 90, 94 | FIG. 96 | button: bbIntention | label: I intended to do . . . |
| FIG. 89, 91, 92, 93 | FIG. 96 | button: bbGuide | label: Guide |
| FIG. 89, 91, 92, 93 | FIG. 95 | button: bbTips | label: Tips |
| FIG. 96 | FIG. 97 | button: bbNotFound | label: Task not found |
| FIG. 97 | FIG. 98 | button: bbFound | label: but . . . |
| FIG. 98 | FIG. 99 | button: bbFound | label: but . . . |
| FIG. 99 | FIG. 100 | button: bbFound | label: but . . . |
| FIG. 100 | FIG. 101 | button: bbFound | label: but . . . |
| FIG. 101 | FIG. 105 | button: bbFound | label: but . . . |
| FIG. 97, 98, 99, 100, 101 | FIG. 102 | button: bbNotFound | label: Report |
| FIG. 87 | FIG. 104 | button: bbViewActions | label: View |
| FIG. 97, 98, 99, 100, 101 | FIG. 106 | event: Mode error detected | |
| FIG. 105, 102 | FIG. 103 | button: bbInform | label: Inform product designers | wherein FIGS. 87–106 describe the following Pascal unit files and Delphi forms:

| FIG. | Pascal Unit file (*.pas) | Delphi Form |
|---|---|---|
| 87 | RTmonitor | MainForm |
| 88 | LearnUI | LearnUIForm |
| 89 | OnDelay | OnDelayForm |
| 90 | OnIgnoreDelay | OnIgnoreDelayForm |
| 91 | OnCancelForm | OnCancelForm |
| 92 | OnHelp | OnHelpForm |
| 93 | OnUndo | OnUndoForm |
| 94 | OnIgnoreCancel | OnIgnoreEscapeForm |
| 95 | OnBypass | BypassForm |
| 96 | InquireComponent | InquireComponentForm |
| 97 | InquireMainTask | InquireTaskForm |
| 98 | InquireSubTask | InquireSubTaskForm |
| 99 | InquireGoal | InquireGoalForm |

-continued

| FIG. | Pascal Unit file (*.pas) | Delphi Form |
|---|---|---|
| 100 | InquireMethod | InquireMethodForm |
| 101 | InquireStep | InquireStepForm |
| 102 | TaskNotFound | TaskNotFoundForm |
| 103 | Promise | PromiseForm |
| 104 | GetUserAction | GetUserActionForm |
| 105 | ShowReasons | ShowReasonsForm |
| 106 | ModeErrors | ModeErrorForm |

The Delphi form transitions, in the present example, within unit 80 are now described:

| From form | To form | Component Id | Component Text |
|---|---|---|---|
| FIG. 107 | FIG. 108 | bbComponentUsage | Component Usage |
| FIG. 108 | FIG. 109 | bbConflicts | Conflicts |
| FIG. 109 | FIG. 110 | bbViewDetails | Details of Selected |
| FIG. 110 | FIG. 111 | bbViewDetails | Analysis of Selected |
| FIG. 107 | FIG. 112 | bbTasksAndTerms | Tasks and Terms |
| FIG. 112 | FIG. 113 | bbSolve | Solve |
| FIG. 113 | FIG. 114 | bbModify | Modify |
| FIG. 107 | FIG. 115 | bbProcedureKnowledge | Procedure Knowledge |
| FIG. 115 | FIG. 116 | bbViewDetails | Details of Selected |
| FIG. 107 | FIG. 117 | bbModeErrors | Mode Errors |
| FIG. 117 | FIG. 118 | bbViewDetails | Details of Selected |
| FIG. 107 | FIG. 119 | bbByUserIntention | By User Intention |
| FIG. 119 | FIG. 113 | bbPreviousProblems | Previous Problem Reports |
| FIG. 119 | FIG. 120 | bbGoalIdentified | Goal Identified |
| FIG. 120 | FIG. 116 | bbPreviousProblems | Previous Problem Reports |
| FIG. 120 | FIG. 121 | bbProcedureIdentified | Procedure Identified |
| FIG. 121 | FIG. 122 | bbAssociatedComponents | Associated Components |
| FIG. 107 | FIG. 123 | bbByUserAction | By User Action |
| FIG. 123 | FIG. 110 | bbAssociatedReports | Associated Reported Problems | wherein FIGS. 107–123 describe the following Pascal unit files and Delphi forms:

| FIG. | Pascal Unit file (*.pas) | Delphi Form |
|---|---|---|
| 107 | ProblemSolver | SolverForm |
| 108 | ComponentUsage | ComponentUsageForm |
| 109 | ConflictSummary | ConflictSummaryForm |
| 110 | ConflictReport | ConflictReportForm |
| 111 | BackTrack | BackTrackForm |
| 112 | GoalSummary | GoalSummaryForm |
| 113 | UserTerm | UserTermForm |
| 114 | SolveTerm | SolveTermForm |
| 115 | ProcedureSummary | ProcedureSummaryForm |
| 116 | ProcedureKnowledgeReport | ProcedureKnowledgeReportForm |
| 117 | ModeErrorSummary | ModeErrorSummaryForm |
| 118 | ModeReport | ModeReportForm |
| 119 | HelpByUserIntention | HelpByUserIntentionForm |
| 120 | HelpGoal | HelpGoalForm |
| 121 | HelpProcedure | HelpProcedureForm |
| 122 | AssociatedComponents | AssociatedComponentsForm |
| 123 | HelpByUserAction | HelpByUserActionForm |

Following is a description of the data structures of tables used in a second preferred embodiment of the present invention:

The following Paradox database tables are preferably stored in the user task database 34 of FIG. 1 according to a second preferred embodiment of the present invention:

Component.DB
Condition.DB
DocSource.DB
File.DB
Goal.DB
Maintask.DB
Method.DB
ObjectClass.DB
ProblemIndicator.DB
Product.DB
Step.DB
Subtask.DB The following Paradox database tables are preferably stored in the usability problem database 70 of FIG. 1 according to a second preferred embodiment of the present invention:

Action.DB
ConflictSummary.DB
DocSummary.DB
ModeError.DB
Problem.DB
TaskSummary.DB
UsageSummary.DB Following is a description of the data structures of tables listed above:

| Field name | Type | Size |
|---|---|---|
| Actions.DB | | |
| TheTime | @ | |
| Indicator | L | |
| Type | A | 10 |
| Identifier | A | 60 |
| Class | A | 20 |
| Static | L | |
| Caption | A | 30 |
| Location | A | 30 |
| ShortcutKey | A | 20 |
| State | A | 10 |
| FormTitle | A | 60 |
| Component.DB | | |
| Identifier | A | 60 |
| Description | A | 60 |
| Class | A | 20 |
| IsStatic | L | |
| IsMode | L | |
| Caption | A | 30 |
| Location | A | 30 |
| ShortcutKey | A | 20 |
| FormTitle | A | 60 |
| Condition.DB | | |
| MainTask | A | 2 |
| SubTask | A | 2 |
| Goal | A | 2 |
| Method | A | 2 |
| Step | A | 2 |
| Identifier | A | 60 |
| Class | A | 20 |
| Caption | A | 30 |
| FormTitle | A | 60 |
| Value | A | 10 |
| Likelihood | A | 10 |
| CurrentValue | A | 10 |
| ConflictSummary.DB | | |
| TimeWaste | S | |
| ProblemCount | S | |

-continued

| Field name | Type | Size |
|---|---|---|
| MainTask | A | 2 |
| SubTask | A | 2 |
| Goal | A | 2 |
| Method | A | 2 |
| Step | A | 2 |
| CompType | A | 10 |
| CompId | A | 10 |
| CompClass | A | 20 |
| CompCaption | A | 30 |
| ShortcutKey | A | 20 |
| FormTitle | A | 60 |
| Advice | A | 60 |
| ToDesigner | A | 100 |
| ToHelpDesk | A | 100 |
| DocSource.DB | | |
| Name | A | 20 |
| DocSummary.DB | | |
| TimeWaste | S | |
| ProblemCount | S | |
| MainTask | A | 2 |
| SubTask | A | 2 |
| Goal | A | 2 |
| DocSource | A | 20 |
| Advice | A | 60 |
| ToDesigner | A | 100 |
| ToHelpDesk | A | 100 |
| File.DB | | |
| ExePath | A | 60 |
| ExeFile | A | 30 |
| DBPath | A | 60 |
| Goal.DB | | |
| Id | A | 2 |
| SubTask | A | 2 |
| MainTask | A | 2 |
| Text | A | 60 |
| Children | S | |
| Usage | S | |
| MainTask.DB | | |
| Id | A | 2 |
| Text | A | 40 |
| Children | S | |
| Usage | S | |
| Method.DB | | |
| Id | A | 2 |
| Goal | A | 2 |
| SubTask | A | 2 |
| MainTask | A | 2 |
| Text | A | 60 |
| Children | S | |
| Usage | S | |
| ModeError.DB | | |
| TimeWaste | S | |
| Count | S | |
| MainTask | A | 2 |
| SubTask | A | 2 |
| Goal | A | 2 |
| Method | A | 2 |
| Step | A | 2 |
| CompId | A | 60 |
| ModeBtnId | A | 60 |
| ModeForm | A | 60 |
| ModeBtnCaption | A | 30 |
| ModeBtnValue | A | 10 |
| Advice | A | 60 |
| UsageCount | S | |
| UserSet | A | 10 |
| SWset | A | 10 |

-continued

| Field name | Type | Size |
|---|---|---|
| ToDesigner | A | 100 |
| ToHelpDesk | A | 100 |
| ObjectClass.DB | | |
| Name | A | 20 |
| IsStatic | L | |
| IsMode | L | |
| Problem.DB | | |
| Time | @ | |
| TimeWaste | S | |
| What | A | 60 |
| MainTask | A | 2 |
| SubTask | A | 2 |
| Goal | A | 2 |
| Method | A | 2 |
| Step | A | 2 |
| CompType | A | 10 |
| CompId | A | 10 |
| CompClass | A | 20 |
| CompCaption | A | 30 |
| ShortcutKey | A | 20 |
| FormTitle | A | 60 |
| ModeBtnCaption | A | 30 |
| ModeBtnId | A | 60 |
| ModeBtnValue | A | 10 |
| DocSource | A | 20 |
| ToDesigner | A | 100 |
| ToHelpDesk | A | 100 |
| ProblemIndicator.DB | | |
| Identifier | A | 60 |
| Type | A | 20 |
| Product.DB | | |
| FileName | A | 30 |
| Path | A | 60 |
| TimeToIntervention | I | |
| Step.DB | | |
| Number | A | 2 |
| Method | A | 2 |
| Goal | A | 2 |
| SubTask | A | 2 |
| MainTask | A | 2 |
| Text | A | 60 |
| Operation | A | 20 |
| FormId | A | 60 |
| ControlId | A | 60 |
| MenuBarId | A | 60 |
| PopupId | A | 60 |
| ShortcutKey | A | 60 |
| State | A | 60 |
| Usage | S | |
| SubTask.DB | | |
| Id | A | 2 |
| MainTask | A | 2 |
| Text | A | 60 |
| Children | S | |
| Usage | S | |
| TaskSummary.DB | | |
| TimeWaste | S | |
| ProblemCount | S | |
| MainTask | A | 2 |
| SubTask | A | 2 |
| ToDesigner | A | 100 |
| ToHelpDesk | A | 100 |
| UsageSummary.DB | | |
| ComponentId | A | 60 |
| Class | A | 20 |
| IsStatic | L | |
| IsMode | L | |
| FormTitle | A | 60 |
| Time | S | |

-continued

| Field name | Type | Size |
|---|---|---|
| UserSet | A | 10 |
| Swset | A | 10 |
| Count | S | |
| Supported | L | |
| AssignedTasks | S | |
| CurrentValue | A | 10 |

Enclosed herewith are Appendices 7–12 including computer listings useful in generating a second preferred embodiment of the present invention.

A preferred method for employing Appendices 7–12 to generate an example of a software implemented system for identifying usability problems include the following steps:

1. Install Microsoft Windows/95 on a PC
2. Install Borland Developer version of Delphi 2.0 for Windows/95
3. Create directories as follows:

| Usage | Example: directory used in Appendices 7–12 |
|---|---|
| Common Pascal units | \ergolite\common |
| Paradox Database tables | \ergolite\DB |
| Files of unit 20 | \ergolite\CaptureComponents |
| Files of unit 30 | \ergolite\DefineTaskBreakdown |
| Files of unit 32 | \ergolite\DefineProblemIndicators |
| Files of unit 35 | \ergolite\CaptureUserInteraction |
| Files of unit 80 | \ergolite\ViewUserDifficulties |

4. Define an alias name "BetaLite" for the Paradox Database tables directory (e.g. \ergolite\db) and set it as the Working directory.
5. In the Working directory, use Delphi's Database Desktop to define the Paradox tables listed above.
6. Create utility Pascal units as listed in Appendix 7
7. Construct SharedData.dll as follows:
   Create a Delphi project and save it as SharedData.dpr in the common directory (e.g. \ergolite\common)
   Add the units to the project file, according to the listings of the project file SharedData.dpr in Appendix 7
   Build the EXE file (compile and link)
8. Construct HookDLL.dll as follows:
   Create a Delphi project and save it as Hook:DLL.dpr in the common directory (e.g. \ergolite\common)
   Add the units to the project file, according to the listings of the project file HookDLL.dpr in Appendix 7
   Build the EXE file (compile and link)
9. Construct unit 20 (User interface teaming) as follows:
   Create a Delphi project and save it as CaptureComponents.dpr in directory of unit 20 (e.g. \ergolite\CaptureComponents)
   Create the forms for the CaptureComponents.dpr Delphi project according to FIGS. 69–75
   Arrange the forms in the Delphi project in the order they appear in the listing of the CaptureComponents.dpr Delphi project listed in Appendix 8
   For each form, add events and code as in the Pascal units listed in Appendix 8. Use the form transition charts described above to name the components that do the transitions
   Build the EXE file (compile and link) and then run
10. Construct unit 30: User task breakdown, as follows:
    Create a Delphi project and save it as DefineTaskBreakdown.dpr in directory of unit 30 (e.g. \ergolite\DefineTaskBreakdown)
    Create the forms for the DefineTaskBreakdown.dpr Delphi project according to FIGS. 76–83
    Arrange the forms in the Delphi project in the order they appear in the listing of the DefineTaskBreakdown.dpr Project pages listed in Appendix 9
    For each form, add events and code as in the Pascal units listed in Appendix 9. Use the form transition charts described above to name the components that do the transitions
    Build the EXE file (compile and link) and then run
11. Construct unit 32: Test setup, as follows:
    Create a Delphi project and save it as TestPlan.dpr in directory of unit 32 (e.g. \ergolite\DefineProblemIndicators)
    Create the forms for the DefineProblemIndicators.dpr Delphi project according to FIGS. 84–85
    Arrange the forms in the Delphi project in the order they appear in the listing of the DefineProblemIndicators.dpr Project pages listed in Appendix 10
    For each form, add events and code as in the Pascal units listed in Appendix 10. Use the form transition charts described above to name the components that do the transitions
    Build the EXE file (compile and link) and then run
12. Construct unit 35: Usability problem identifier, as follows:
    Create a Delphi project and save it as Bspy.dpr in directory of unit 35 (e.g. \ergolite\CaptureUserInteraction)
    Create the forms for the CaptureUserInteraction.dpr Delphi project according to FIGS. 86–106
    Arrange the forms in the Delphi project in the order they appear in the listing of the CaptureUserInteraction.dpr Project pages listed in Appendix 11
    For each form, add events and code as in the Pascal units listed in Appendix 11. Use the form transition charts described above to name the components that do the transitions
    Build the EXE file (compile and link) and then run
13. Construct unit 80: Usability problem solver, as follows:
    Create a Delphi project and save it as Solver.dpr in directory of unit 80 (e.g. \ergolite\ViewUserDifficulties)
    Create the forms for the ViewUserDifficulties.dpr Delphi project according to FIGS. 107–123
    Arrange the forms in order according to the Project pages listed in Appendix 12
    Arrange the forms in the Delphi project in the order they appear in the listing of the ViewUserDifficulties.dpr Project pages listed in Appendix 12
    For each form, add events and code as in the Pascal units listed in Appendix 12. Use the form transition charts described above to name the components that do the transitions
    Build the EXE file (compile and link) and then run Advantages of the second preferred embodiment described in FIGS. 69–123 and in Appendices 7–12, as well as problems existing in the prior art which are overcome by the second preferred embodiment, are now described:

The system shown and described herein provides information on possible reasons for user difficulties. This information is obtained by interrupting the operation of the computerized system, and by prompting the user to specify her intention. In conventional capture/playback tools, the user's normal operation is not interrupted for reporting on the difficulty of the end user.

An advantage of the system shown and described herein is that the system preferably provides hints for the system designers on possible ways to resolve identified usability problems, as in the following examples which apply to Word for MS-Windows:

Adding wizards. For example, to facilitate the procedure of moving text, the designers can add a wizard that prompts the end user to first select the text to be moved, then confirm selection in order to cut it to the clipboard, then mark the new location and finally confirm the new location, in order to paste the text from the clipboard Disable certain keys. For example, disabling the Insert key may prevent the mode error of Overwrite, which is not very useful in Windows style text editing Changing the control of mode transition. For example by changing the toggle control between upper case and lower case from Caps Lock to, say, Ctrl+Caps Lock, the frequency of unintentional mode changing may dramatically decrease Removing excessive shortcut key combinations. For example, by removing the shortcut key combination Ctrl+Alt+H, which experienced typists unintentionally often use instead of the Ctrl+H key combination, the end user avoids confusing situations such as hiding of the selected text.

The system described herein is preferably "general purpose", whereas prior art systems are specific to and built onto particular software applications and require changes in the software code of the combined system/application, so that they cannot be extended to other software applications. The present invention preferably does not require any information on the software code of the computerized system. Therefore, it is applicable to various applications. This feature is useful for software solution providers and SI's (System Integrators) who wish to test applications purchased from a third party, for integration with other software applications and procedures.

A particular advantage of the invention for system integrators is that the usability problem identifier unit 35 can be extended so that certain user input options, that a system integrator consider as error prone, can be either disabled or re-mapped to alternative input options that are less error prone. For example:

The Insert key can be disabled, to avoid unintentional change to Overwrite mode

Excessive, error prone, shortcut key combinations, such as Ctrl+Shift+H, can be disabled, to avoid unintentional hiding of selected text A function actuated by a menu item can be re-directed to a different component, such as a key combination The toggling Caps Lock feature can be re-mapped to two distinctive key combinations, such as Ctrl+Caps Lock for upper case typing and Esc to resume lower case typing.

The system of the present invention may somewhat hamper the use of the computerized system by an end user. However, the system of the present invention, apart from its main function of aiding system developers, also preferably aids the end user in the following ways:

The end user of the computerized system can learn how to avoid psychomotor errors, by comparing his actual action with his intended one.

Another advantage for the end user of the computerized system is that mode errors are automatically detected and that the end user obtains information regarding the system mode that caused her difficulty in operating the computerized system.

Another advantage for the end user of the computerized system is that problem reporting is integrated with regular operation of the computerized system. End users, such as in beta sites, are often required to report, typically manually, on usability problems. Typically, the reporting procedure is cumbersome and distracting, and end users try to avoid it. Computer guided reporting is easier to carry out. As a result, the proportion of problems reported may dramatically increase.

Advantages for the help desk personnel, in providing technical support to the end users of the computerized system, are now described:

A particular advantage of the computerized collection of usability problems provided by the present invention, relative to conventional manual collection of usability problems, for the help desk personnel, is that difficulties of the end user are recorded at the user site, thus eliminating the extra work required to enter the problem report manually.

Another advantage of the computerized collection of usability problems provided by the present invention, relative to conventional manual collection of usability problems, for the help desk personnel, is that the database of usability errors grows, because, using the preferred embodiment of the apparatus of the present invention, the users may report on many problems they would not have reported using conventional means.

A particular advantage of automated statistics collection for the help desk personnel is that the statistical data allow the technical supporter to evaluate the frequency and severity of user difficulties, preferably, in terms of time wasted as a result thereof.

Another advantage for the end user is for 'On the job training', by allowing an end user unfamiliar with the user interface components of the computerized system to view a list of tasks associated with a particular user interface component, which s/he has just activated.

The first embodiment of FIGS. 2–68 and Appendices 1–6 is now compared to the second embodiment of FIGS. 69–123 and Appendices 7–12. It is appreciated that the first and second embodiments are only exemplary of the possible modifications falling within the scope of the present invention and are not intended to be limiting.

First Embodiment

A preferred interrelationship between the tables of databases 34 and 70 is illustrated in FIG. 136.

The structure of database 34 is preferably as follows:

DiaBox.DB is a Paradox table that stores the attributes of the dialog boxes of the computerized system.

The attributes of the user interface components of the computerized system are stored in Paradox tables Button.DB, MenuBar.DB, MenuItem.DB, Popup.DB and Toolbar.DB. Each table has a field for reference to the dialog box that contains the user interface component.

The user task breakdown is stored in the following Paradox tables: MainTask.DB, SubTask.DB, Goal.DB, Method.DB, Step.DB. The hierarchy from MainTask to Step is structured by reference to the upper level tables. The Trigger.DB table connects a step of the task breakdown to user interface components that actuate this step.

The test setup data are organized hierarchically: For example, Intervention.DB may identify the user interface components that indicate putative user difficulties. UserProfile.DB may identify customization of the applicability of each indicator of putative user difficulties for each end user participating in a test plan. UserProfile.DB also may identify the number of sessions planned for testing by each end user participating in the test plan. UserClass.DB identifies the applicability of each indicator of putative user difficulties for each user group. Product.DB identifies the computerized system being tested, including the EXE file name and the name of the current end user and user class. Also, Product.DB stores a default value for the customization of the applicability of each indicator of putative user difficulties.

The structure of database 70 is preferably as follows:

The record of activation of the user interface components by the end user is stored in the Action.DB table. Particulars of a user difficulties report, comprising the time, user ID and session number, task specification and identification of the sources of user information that the end user fails to use, as illustrated in FIG. 50, are stored in Problem.DB.

FIGS. 2–11 are screen displays generated by user interface learning unit 20 of FIG. 1. FIG. 2 illustrates a main screen display used to control activation of other screen displays. The screen display of FIG. 3 allows a software developer/designer to select a computerized system whose usability is to be evaluated. The screen displays of FIGS. 4–11 allow a software developer/designer to define the user interface components of the computerized system for the apparatus of the present invention.

FIGS. 12–32 are screen displays generated by user task breakdown unit 30 of FIG. 1. FIG. 12 is an initial, main screen display, used to control activation of the screen displays of FIGS. 12–32. The screen display of FIG. 13 is a lower-level control screen. The screen display of FIG. 14 allows a software developer/designer to designate, for each user input option in the user interface of the computerized system, a process of the computerized system activated responsive to that user input option.

The screen display of FIG. 15 allows a software developer/designer to define events in the computerized system generated by the end user, i.e. to define all input options available to the end user. The screen displays of FIGS. 16–20 allow a software developer/designer to define how a task of the end user is to be broken down into user actions. The screen displays of FIGS. 21–22 allow a software developer/designer to select a user interface component (i.e. computerized system input option) from among those which the software developer/designer has defined in user interface learning unit 20.

Figure 32:
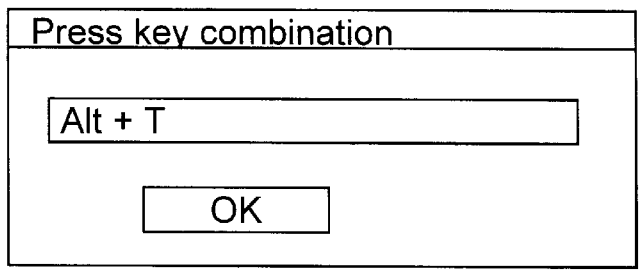

The screen displays of FIGS. 23 and 32 allow a software developer/designer to define user interface components of the computerized system which are to be regarded as indicating putative instances of user difficulty when operating the computerized system. Examples of user interface components which fall within this category for many computerized systems are Help menu items, the Escape key and Cancel buttons. The screen display of FIG. 24 controls activation of the screen displays of FIGS. 25–31 which check completeness of the breakdown into tasks.

Figure 34:
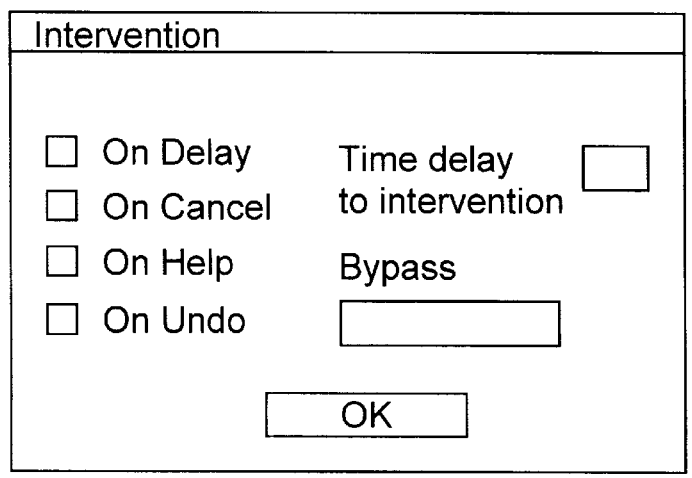

The screen displays of FIGS. 33–36 are generated by test set-up unit 32 of FIG. 1. The screen of FIG. 33 is an initial, main screen. FIGS. 33–34 allows a software developer/tester to characterize user groups. FIG. 35 allows a software developer/tester to characterize individual users within user groups. FIG. 36 is a display screen displaying to a software developer/tester the current status of each end user in each defined user group.

The screen displays of FIGS. 37–48 are generated by unit 40 of FIG. 1 which is operative to perform computerized identification of putative user difficulties. The screen display of FIG. 37 is an initial screen. The screen display of FIG. 38 displays parameters of a selected end user. The screen display of FIG. 39 allows the end user to report usability problems of his own initiative as opposed to usability problems detected by the apparatus of the present invention. The screen display of FIG. 40 shows all captured user actions. The screen display of FIG. 41 shows all previously generated reports on user difficulties.

Figure 43:
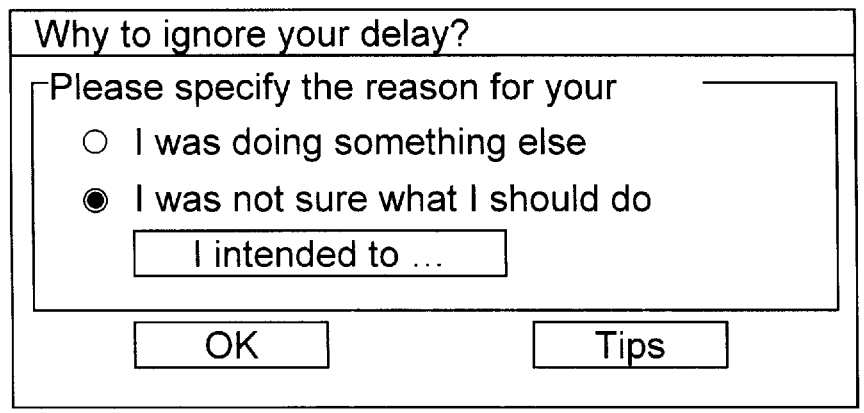
Figure 47:
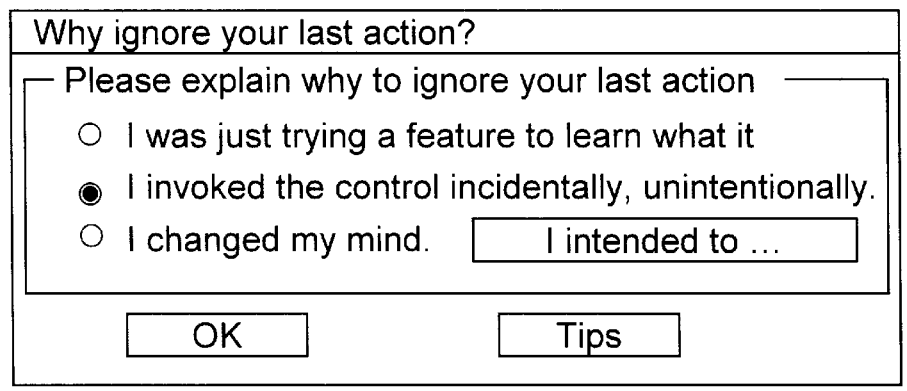
Figure 48:
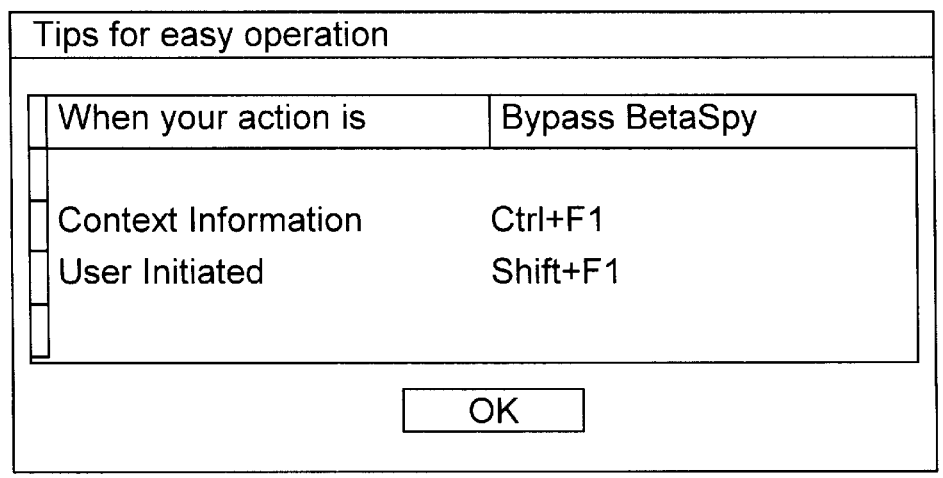

The screen displays of FIGS. 42–48 are activated when a putative user difficulty is identified and are operative to allow an end user to characterize difficulties s/he is experiencing, if any. The screen of FIG. 42 is activated when the end user pauses for a duration of time exceeding a predetermined threshold. The screen display of FIG. 43 is activated when the end user asks the system to ignore a pause, i.e. denies that s/he is experiencing any difficulty despite the fact that a significant pause has taken place. The screen display of FIG. 44 is activated when the end user presses "cancel" or "ESC". The screen display of FIG. 45 is activated when the end user invokes the on-line Help. The screen display of FIG. 46 is activated when the end user presses "undo". The screen display of FIG. 47 is activated when the end user asks the system to ignore a "cancel", "ESC", on-line Help request or "undo", i.e. denies that s/he is experiencing any difficulty despite the fact that s/he has activated a user interface component that indicates a putative instance of difficulty. The screen display of FIG. 48 provides a way for the end user to avoid the dialog illustrated by FIGS. 42–47, which is normally established whenever a putative user difficulty is identified.

The screen displays of FIGS. 49–56 are generated by unit 50 which is operative to hold a dialog in order to establish user intention regarding a putative user difficulty. The screen display of FIG. 50 allows the end user to specify the sources of user information, such as user's manual, user's guide, on-line help and on-line tutorial, that s/he referred to before reporting that s/he is not able to find a particular task in the user task breakdown.

The screen displays of FIGS. 57–68 are generated by developers' access unit 90. The screen display of FIG. 57 is an initial screen. The screen display of FIG. 58 is a control screen. The screen display of FIG. 59 shows statistics of internal processes such as "FindString", regardless of the input option the end user used to activate these processes (shortcut key activation, menu bar activation, etc.) The screen displays of FIGS. 60–65 show the statistics of usage by the end user of each input option within each of 6 user input option categories (Dialog box, menu bar, menu item, pop-up menu, push button, tool bar button) respectively. The system display of FIG. 66 allows a software developer/evaluator to show statistics of usage of additional user input option categories.

FIG. 67 is a screen display of intentions defined in the end user's own words, as illustrated by FIG. 50. The end user is prompted to define his intentions in his own words in situations in which because s/he has been unable to identify his intention from among the hierarchy of intentions (tasks, subtasks, goals, methods, operational sequences) defined by the apparatus of the present invention in the present embodiment.

FIG. 68 is a screen display showing statistics regarding instances of user confusion between input options, such as using the (Ctrl+shift+F) short-cut key combination instead of (Ctrl+F). Statistics may include number of occurrences in a testing session and total cost, e.g., total waste time. Instances of such user confusion are also termed herein "conflicts".

Second Embodiment

A preferred interrelationship between the tables of databases 34 and 70 is illustrated in FIG. 137.

The structure of database 34 is preferably as follows:

The user interface components are identified by the fields of the Paradox table Component.DB. The identifier is preferably unique, allowing components to be identified across operation sessions.

Component attributes common to a component class are stored in the Paradox table ObjectClass.DB. The attribute 'IsStatic' controls the inclusion of the value of the 'location' field in the component identifier. The attribute 'IsMode' is used for management of mode errors: a component is a candidate for a system mode if and only if the corresponding 'IsMode' field is set to 'True'.

The user task breakdown is stored in Paradox tables MainTask.DB, SubTask.DB, Goal.DB, Method.DB and Step.DB (FIG. 137). The hierarchy from MainTask to Step is structured by reference to the upper level tables. The system modes are specified using the Paradox table Condition.DB. Each system mode is a record of this table, containing data on the context in terms of the task breakdown, on the component and on the condition on the component value, that determine the applicability of the task to the system mode.

The components used as indicators of putative user difficulty are stored in the Paradox table entitled ProblemIndicator.DB. The value of the Field 'Type' identifies the screen display that shows up when an instance of putative user difficulty is encountered.

The structure of database 70 is preferably as follows:

The actions of the end user of the computerized system are stored in the Paradox table Actions.DB. Each record in this table includes information on the time and attributes of the user interface component actuated.

Each time the end user reports on a difficulty in operating the computerized system, a record is added to the Paradox table entitled Problem.DB. Each record typically contains information on the time when the end user experiences the difficulty, the intention of the end user, the user interface component which the end user intended to use, and identification of the sources of user information that the end user failed to use, as illustrated in FIG. 102 and the state of mode controls. Mode controls are controls whose values affect the ongoing behavior of the computerized system. Examples of mode controls are check boxes, radio buttons and toggling keys, such as Caps Lock, Insert and Num Lock.

The Paradox tables UsageSummary.DB, TaskSummary.DB, DocSummary.DB, ConflictSummary.DB and ModeError.DB (FIG. 137) are used to evaluate the difficulties the end user has experienced. The UsageSummary.DB table provides measures of the total number and total amount of time the end user spent when using each of the user interface components. The GoalSummary.DB table provides these measures for tasks and subtasks which the end user thought are candidates for specifying the goal s/he intended, but then realized that s/he could not find the intended goal among the list of goals associated with the specified task and subtask. The DocSummary.DB table provides these measures for each goal in the task breakdown for which the user failed to follow the operational procedure, with reference to the sources of user information that the user failed to use. The ConflictSummary.DB table provides these measures for each scheme of usage of the wrong user input option. Table ModeError.DB provides these measures for mode errors, each record typically containing information on the user intended task, the mode button state and the total time the user wasted because of the error.

Product.DB is a Paradox table that contains the threshold of time delay required to conclude that an instance of a putative user difficulty has been encountered.

FIGS. 69–76 are screen displays generated by user interface learning unit 20 of FIG. 1 when operating according to a second preferred embodiment of the present invention. FIG. 69 illustrates a main screen display used to control activation of screen displays of other screen displays. The screen display of unit 70 allows a software developer/designer to select a computerized system whose usability is to be evaluated.

The screen display of FIG. 71 allows the software developer/designer to monitor the user interface components before they are saved in a "component table" of the user task database 34 of FIG. 1, to add a description that will be displayed to the end user when operating the computerized system and to review the user interface components afterwards.

The screen display of FIG. 72 allows the software developer/designer to review the tasks which are already associated with a particular user interface component.

Figures 75, 76:
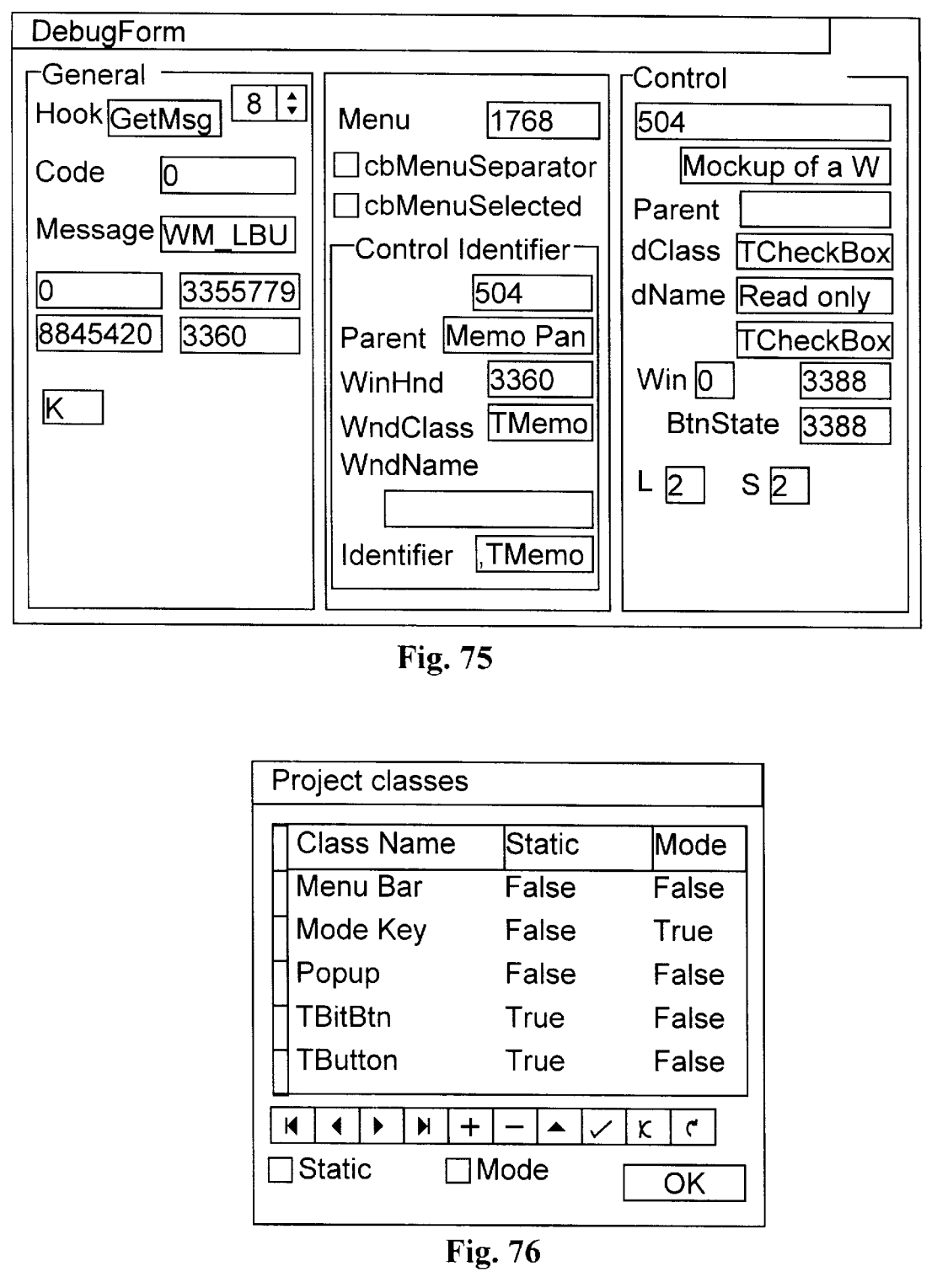

The screen displays of FIGS. 73–75 are auxiliary screen displays generated in the course of interpreting Window messages indicating operation of the computerized system by the end user. These auxilary screen displays are useful in analyzing the system of the present invention.

The screen display of FIG. 76 allows the software developer/designer to review and characterize the Windows classes automatically generated from the Windows messages.

FIGS. 77–84 are screen displays generated by user task breakdown unit 30 of FIG. 1. FIG. 77 illustrates a main screen display used to control activation of other screen displays.

The screen displays of FIGS. 78–82 allow the software developer/designer to specify the user task breakdown, from the user's main tasks, downward to subtasks, goals, methods and procedure steps, which are stored in the user task database 34.

Figure 83:
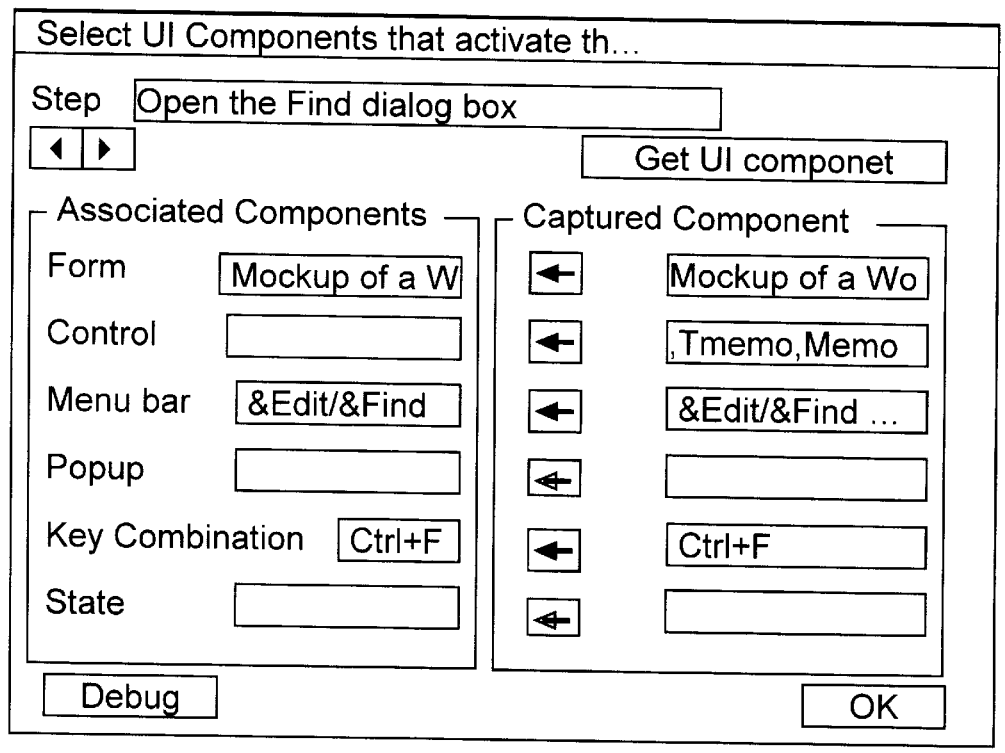

The screen display of FIG. 83 allows the software developer to associate an operation and a user interface component to a particular procedure step.

Figure 84:
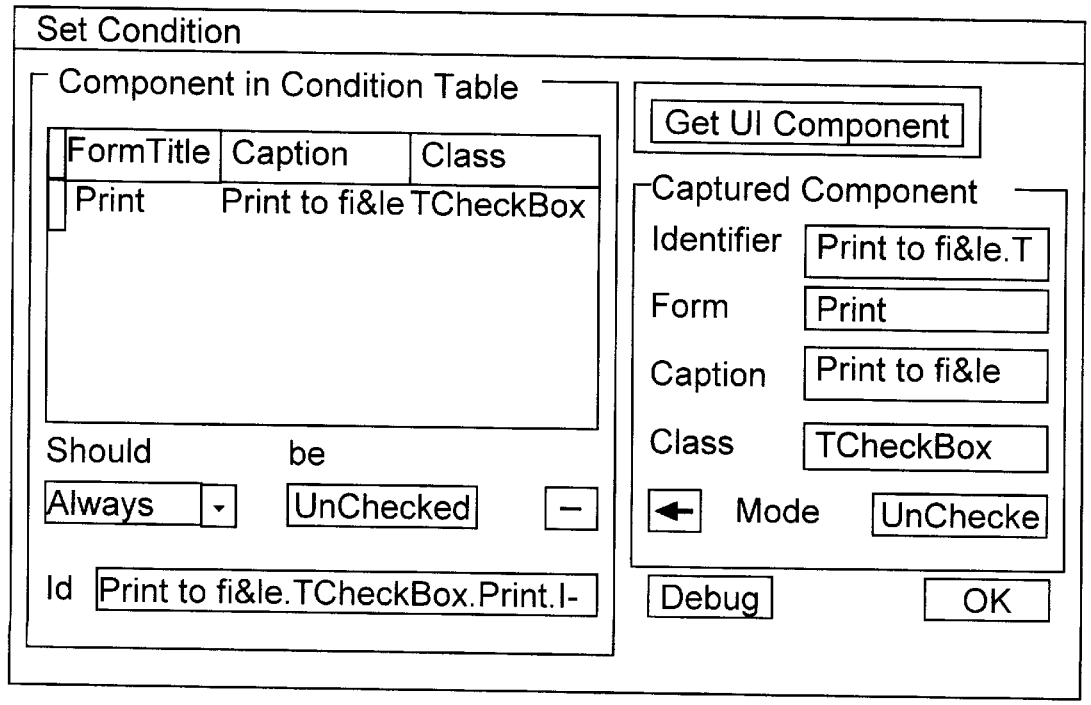

A "mode error" refers to a situation in which the end user has commanded the computerized system to perform a particular operation, however, unknown to the end user, the computerized system is in a particular mode which does not allow that operation to be performed. The screen display of FIG. 84 is intended to allow the system of the present invention to identify mode errors. Specifically, the screen display of FIG. 84 typically allows the software developer to specify conditions for applicability of each operation, where "operation" refers to either a main task, a subtask, a goal, a method or a procedure step. Typically, certain operations cannot be performed if the computerized system is in certain modes. The conditions defining the appropriate computerized system modes for each operation are preferably defined in terms of states of user interface components, such as check boxes and radio buttons. The conditions are used at run time of the computerized system, in order to identify mode errors.

FIGS. 85–86 are screen displays generated by test set-up unit 32 of FIG. 1. FIG. 85 illustrates a main screen display of the set-up unit 32. The screen display of FIG. 86 allows the software developer/designer to monitor the user interface components which are taken to indicate user difficulties. Examples of user interface components which are typically suitable indicators of user difficulties in operating a computerized system include Help menu items, the Escape key and Cancel buttons.

Figure 88:
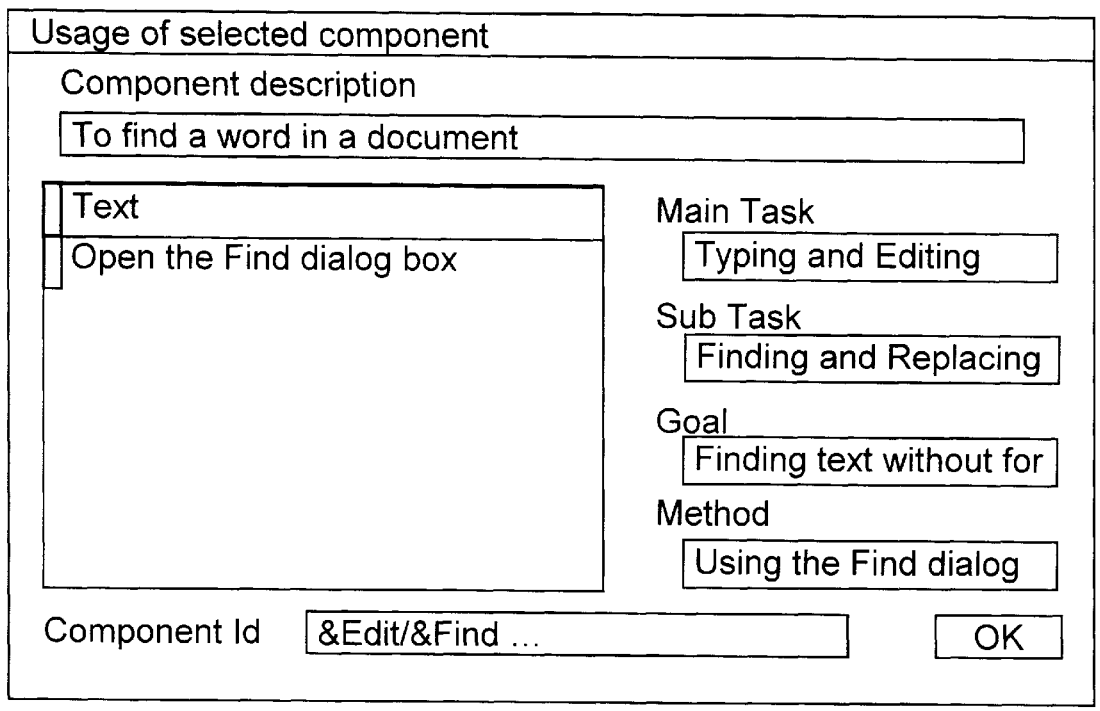

FIGS. 87–105 are screen displays generated by usability problem identifier unit 35 of FIG. 1. FIG. 87 illustrates a main screen display used to control activation of other screen displays. FIG. 88 illustrates a screen display, which presents to the end user all the tasks in the user task database 34 associated with the user interface component most recently activated.

Figure 89:
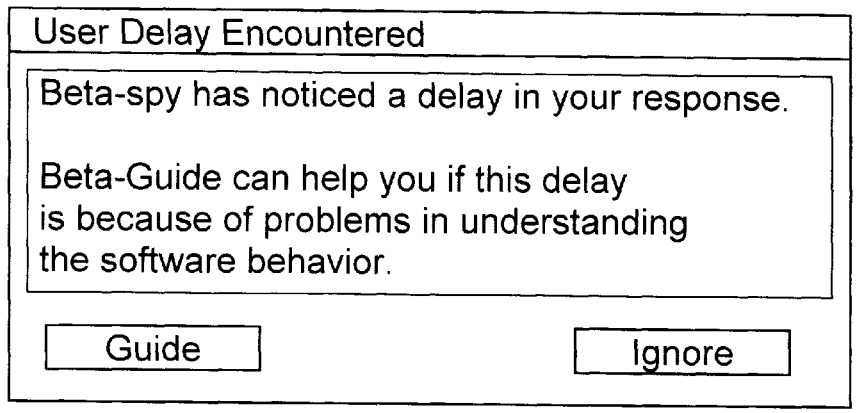
Figure 90:
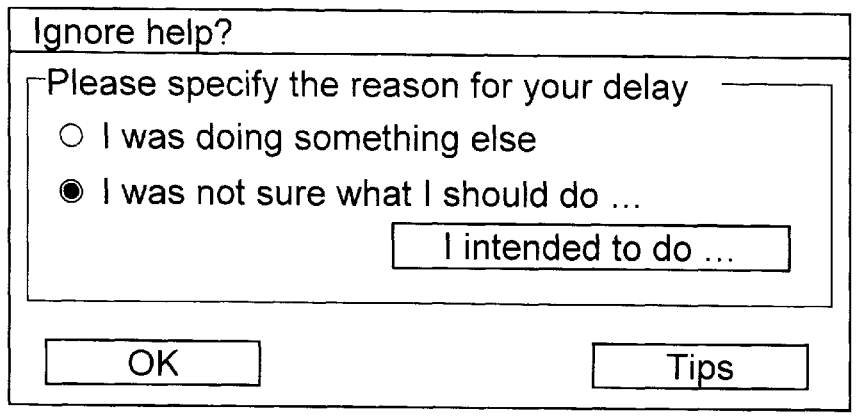
Figure 91:
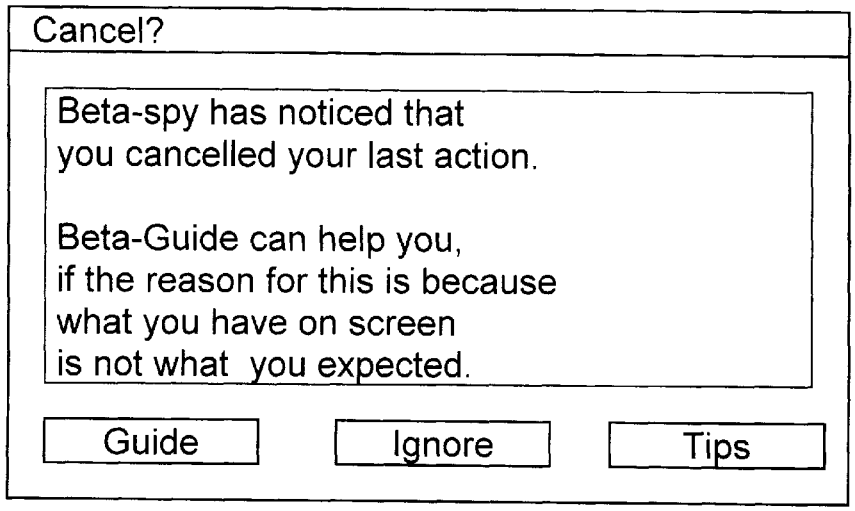

The screen displays of FIGS. 89–95 are generated by User difficulty identifying unit 40 of FIG. 1. The screen display of FIG. 89 is activated whenever the end user pauses for a duration of time exceeding a threshold defined in FIG. 104. The screen display of FIG. 90 is activated when the end user asks the system to ignore a pause, i.e. denies that s/he is experiencing any difficulty despite the fact that a significant pause has take place. The screen display of FIG. 91 is activated when the end user presses "Cancel" or "Esc".

Figure 92:
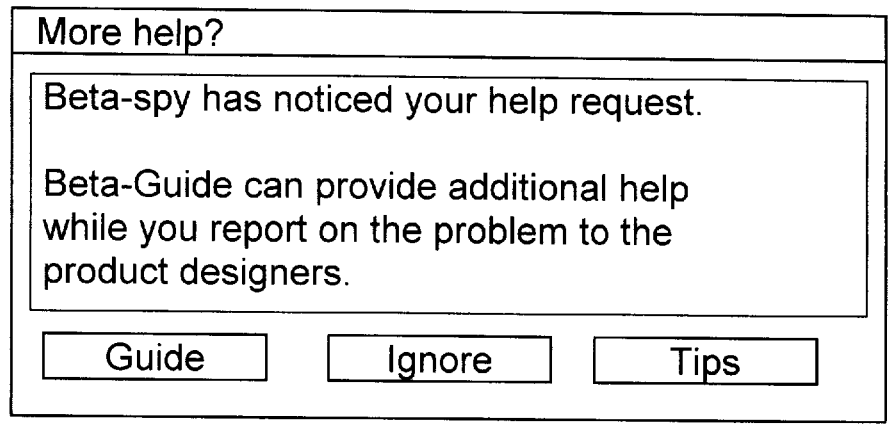
Figure 93:
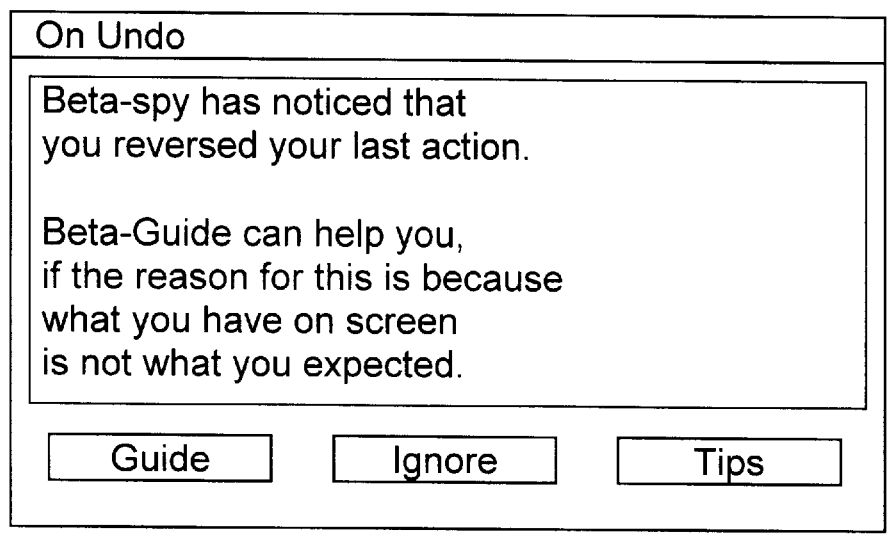
Figure 94:
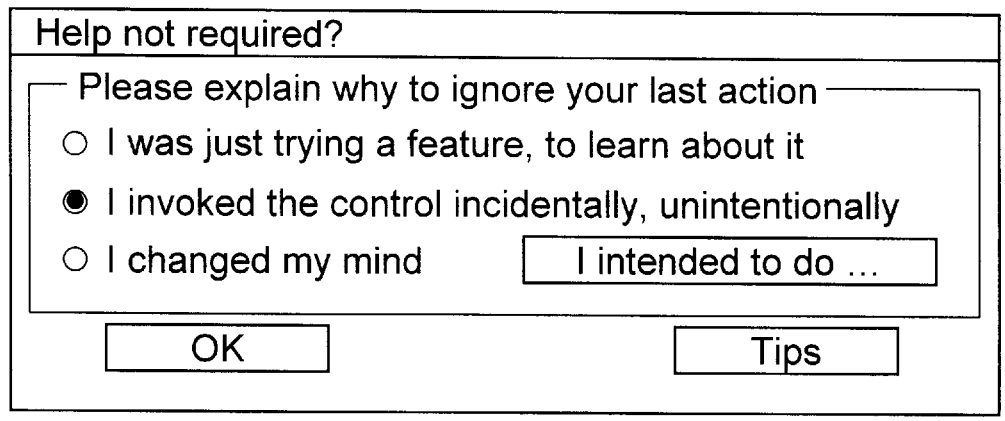

The screen display of FIG. 92 is activated when the end user invokes the on-line Help. The screen display of FIG. 93 is activated when the end user invokes an "undo" feature. The screen display of FIG. 94 is activated when the end user denies that s/he is experiencing any difficulty, despite the fact that s/he has activated a user interface components that indicates a putative instance of difficulty in operating the computerized system.

The screen display of FIG. 95 shows the end user how to avoid entering the putative user difficulty monitoring sequence of FIGS. 89–94. The screen display of FIG. 95 also shows the end user how to initiate a manual reporting session in which difficulties are reported only at the initiative of the end user rather than the system of the present invention prompting the end user when a putative difficulty is detected.

Figures 103, 104:
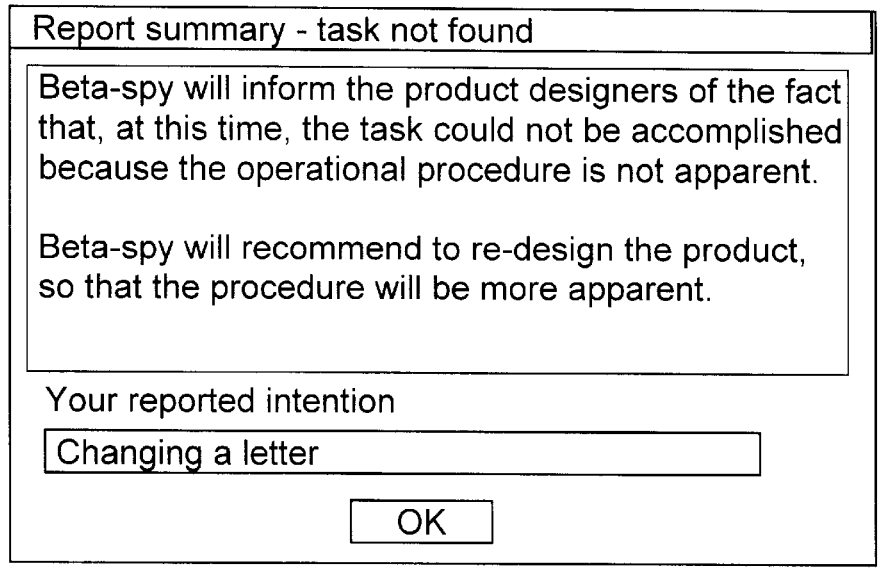

The screen displays of FIGS. 96–103 are generated by unit 50 which is operative to hold a dialog in order to establish user intention regarding a putative user difficulty. The screen display of FIG. 96 shows a list of all the user tasks in the user task database 34 associated with the user interface component which the end user activated most recently. The screen displays for FIGS. 97–101 show the way the end user specifies her intention by a sequence of list selections generated from the task breakdown. The screen display of FIG. 102 allows the end user to specify her intention in case it was not found in the task breakdown. Also, it allows the end user to specify the sources of user information where she looked for the operational procedure to accomplish her intended task. The screen display of FIG. 103 is a confirmation for the end user that the difficulty s/he experienced is reported to the developers of the computerized system.

The screen display of FIG. 104 is generated by unit 54 of FIG. 1 which is operative to hold a dialog in order to confirm the usage of user interface components. The screen display of FIG. 104 preferably allows the end user to review the user interface components s/he has activated during a session with the computerized system.

Figure 106:
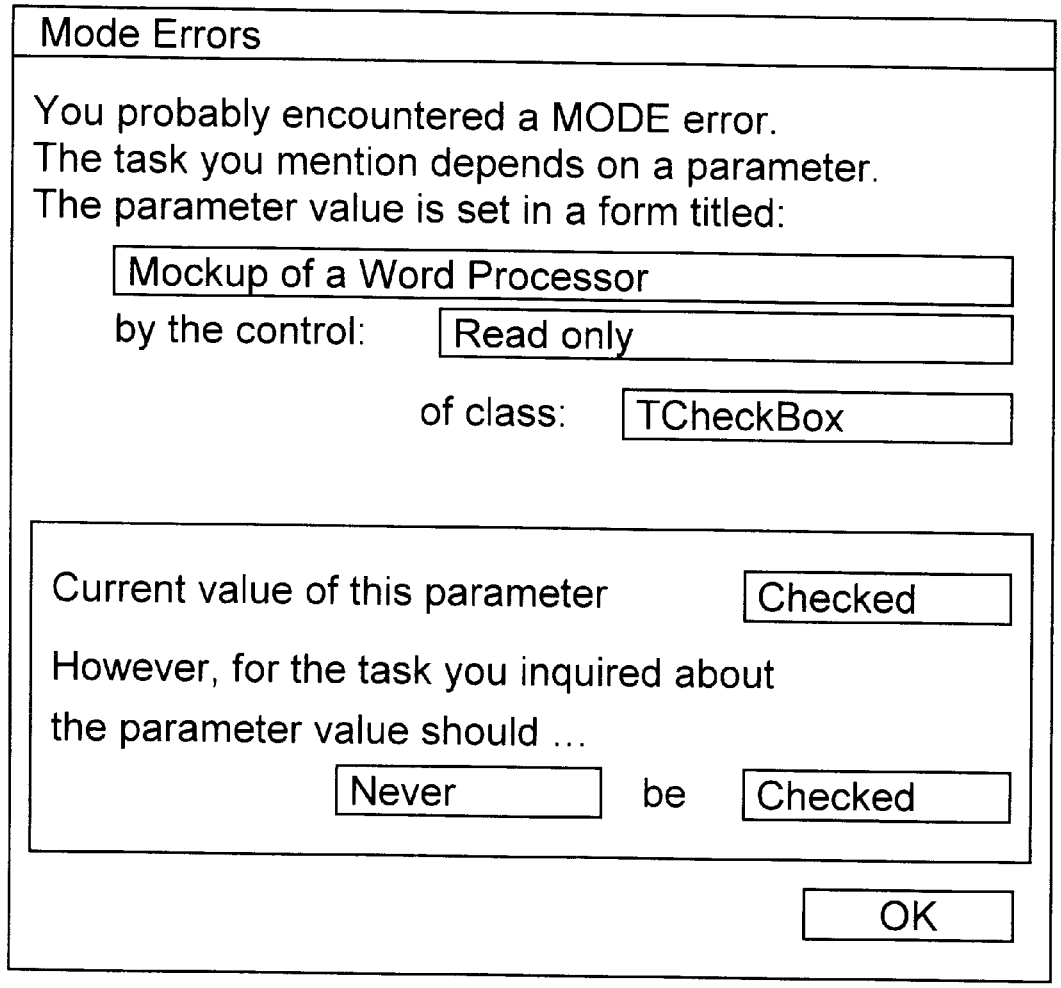

The screen displays of FIGS. 105–106 are generated by computerized help desk unit 60 of FIG. 1. The screen display of FIG. 105 allows the end user to review a list of the user interface components s/he has activated and to identify any unintentional actions, by comparing the user interface components associated with a particular procedure step which the end user intended to use with the record user actions. The screen display of FIG. 106 allows the end user to review parameter values which tend to result in mode errors.

The screen displays of FIGS. 107–123 are generated by usability problem solver unit 80. FIG. 107 illustrates a main screen display used to control activation of other screen displays. The screen displays of FIGS. 108–118 are generated by the developer's access unit 90. The screen displays of FIGS. 119–123 are generated by the help desk access unit 100.

The screen display of FIG. 108 allows the software developer/evaluator to review the total number of, and total time of usage of, each of the user interface components.

The screen display of FIG. 109 allows the software developer/evaluator to review the total number of, and total amount of time wasted as a result of, confusion between input options such as between the following two shortcut key combinations: (Ctrl+F) and (Ctrl+Alt+F). The screen display of FIG. 109 provides a recommendation for the system designer, labeled by "Advice for re design", generated by the computerized human factors engineering expert unit 94, for improving the system usability regarding the identified user confusion. The screen display of FIG. 109 allows the software developer/designer to add notes of requirements for changes in the user interface of the computerized system and/or of help desk information.

The screen display of FIG. 110 allows the software developer/evaluator to review the cases of user confusion between input options.

The screen display of FIG. 111 allows the software developer/evaluator to review the list of actions associated by means of a time stamp with a particular instance of identification of a usability problem.

The screen display of FIG. 112 allows the software developer/evaluator to review the total count and total time waste by the end user when failing to identify her intended goal among the goals stored in the user task breakdown database 34. The screen display of FIG. 112 allows the software developer/designer to add notes of requirements for changes in the user interface of the computerized system and/or of help desk information.

The screen display of FIG. 113 allows the software developer/evaluator to review the intentions of the end user, defined in his or her own words, in cases where s/he could not identify his or her intention within the user task breakdown generated by unit 30.

The screen display of FIG. 114 allows the software developer to change the captions used in the user task breakdown of database 34 to terms specified by the end user in his or her own words, used to describe her intended goal.

The screen display of FIG. 115 allows the software developer/evaluator to review the total count and total of time waste by the end user when looking for the procedure for a particular goal. The screen display of FIG. 115 allows the software developer/designer to add notes of requirements for changes in the user interface of the computerized system and/or of help desk information.

The screen display of FIG. 116 allows the software developer/evaluator to review the instances of user difficulty in finding the operational procedure of a particular goal.

The screen display of FIG. 117 allows the software developer/evaluator to review the total count and the total of time waste by the end user where mode errors occurred. The screen display of FIG. 117 provides a recommendation for the system designer, labeled by "Advice", generated by the computerized human factors engineering expert unit 94, for improving the system usability regarding the identified mode error. The screen display of FIG. 117 allows the software developer/designer to add notes of requirements for changes in the user interface of the computerized system and/or of help desk information.

The screen display of FIG. 118 allows the software developer/evaluator to review the instances of user difficulty result from a particular type of mode errors.

The screen displays of FIGS. 119–122 allow the software technical assistant to review help desk information on usability problems which are expressed in terms of the user intention. The help desk information that the software technical assistant can review comprises the user interface components available for a particular operational procedure and developer notes for help desk information generated by the developer access unit 90.

The screen display of FIG. 123 allows the software technical assistant to review help desk information on usability problems which are expressed in terms of the user action. The help desk information that the software technical assistant can review comprises instances of user difficulty generated by the usability problem identifier unit 35, associated with a particular user interface component.

FIG. 124 is a simplified functional block diagram of a preferred embodiment of the user action capture unit 36 of FIG. 1, which is particularly suited for applications in which the computerized system is a Windows system, the embodiment of FIG. 124 also being useful in implementing units 20, 30 and 32 of FIG. 1.

The 'Windows Operating System' block 212 is the host operating system. In the implemented example, the Windows Operating System is Windows 95. Block 214, 'Windows Application Under Test', is the computerized system being tested.

All Windows 95 applications send various kinds of messages to the Windows operating system, including messages resulting from user initiated events, such as mouse or key pressing. Hook DLL unit 220 typically comprises a Windows DLL (Dynamic Link Library) described by the program listings of the HookDLL.dpr project file in Appendix 7. The Hook DLL unit 220 holds hook procedures that Windows can actuate in case of a user event and is operative to capture a subset of the Windows messages sent by the computerized system under test, to filter them further and to send the selected messages to the component capture unit 230.

Hook setup unit 210 typically comprises the MainSetup.pas unit listed in Appendix 7. It is operative to set the data for hooking the application under test to the apparatus described in the second preferred embodiment of the present invention. The hook data comprise the identification of the thread of the application under test, the identification of the hook procedures that Windows typically actuates in case of a user event, the identification of Hook DLL unit 220 that holds these hook procedures and identification of the Pascal unit which instantiates the virtual Component capture unit 230. Preferred units that set the hook data using Hook setup unit 210 comprise user interface learning unit 20, user task breakdown unit 30, test setup unit 32 and user action capture unit 36 of FIG. 1.

Component capture unit 230 typically comprises a virtual unit, instantiated to any of the following Pascal units:
 a. Unit GetComponent.pas listed in Appendix 8 associated with the screen display illustrated in FIG. 71, operative to capture the user interface components when activating the user learning unit 20
 b. Unit Activation.pas listed in Appendix 9 associated with the screen display illustrated in FIG. 83, operative to capture a user interface component associated with a step of and operational procedure
 c. Unit SetCondition.pas listed in Appendix 9 associated with the screen display illustrated in FIG. 84, operative to capture a user interface component associated with a condition for the applicability of a user task
 d. Unit GetIndicators.pas listed in Appendix 10 associated with the screen display illustrated in FIG. 86, operative to capture a user interface component that indicate a putative instance of user difficulty
 e. Unit GetUserAction.pas listed in Appendix 11 associated with the screen display illustrated in FIG. 88, operative to capture the user actions at run time.

Component interpretation unit 240 is described by the Pascal unit file HyperSpy.pas and the associated Pascal files listed in Appendix 7. Unit 240 is operative to convert the user events to characteristics of the user interface component the user has actuated.

Unit 240 is a subunit of each of the Pascal units above. The interpretation is typically made in two stages: First, HyperSpy.pas passes control to Spy.pas, where the messages from HookDLL are converted to component attributes. Typically, component attributes obtained by such conversion are not complete. Therefore, at the second stage, HyperSpy.pas integrates the attributes obtained by different messages. If the Windows class of the user interface component received is not in the ObjectClass.DB table, a screen display such as that of FIG. 76 pops up, prompting the user to specify the 'IsStatic' and 'IsMode' attributes of the new class.

FIG. 125 is a simplified flowchart illustration of a preferred mode of operation for user interface learning unit 20 of FIG. 1.

Process 2010 of FIG. 125 typically comprises the GetComponentMain.pas unit listed in Appendix 8 and typically generates the screen display illustrated in FIG. 69.

Process 2020 of FIG. 125 sets the Windows hooks for capturing the user's actions using subunit 210 of FIG. 124. Process 2020 is typically actuated by a developer's activation of the Start button of FIG. 69.

Process 2030 of FIG. 125 typically comprises the GecComponent.pas unit listed in Appendix 8 and typically generates the screen display illustrated in FIG. 71. Process 2030 receives messages from the Hook DLL as described above with reference to subunit 230 of FIG. 124.

Process 2040 of FIG. 125 typically comprises subunit 240 of FIG. 124.

Process 2050 of FIG. 125 typically comprises the GecComponent.pas unit listed in Appendix 8.

FIG. 126 is a simplified flowchart illustration of a preferred mode of operation for user interface learning unit 30 of FIG. 1.

Process 3001 of FIG. 126 typically comprises the DefTaskMain.pas unit listed in Appendix 9 and typically generates the screen display illustrated in FIG. 77.

Process 3002 of FIG. 126 typically comprises the MainTask.pas unit listed in Appendix 9 and typically generates the screen display illustrated in FIG. 78.

Process 3003 of FIG. 126 typically comprises the SubTask.pas unit listed in Appendix 9 and typically generates the screen display illustrated in FIG. 79.

Process 3004 of FIG. 126 typically comprises the Goal.pas unit listed in Appendix 9 and typically generates the screen display illustrated in FIG. 80.

Process 3005 of FIG. 126 typically comprises the Method.pas unit listed in Appendix 9 and typically generates the screen display illustrated in FIG. 81.

Process 3006 of FIG. 126 typically comprises the Steps.pas unit listed in Appendix 9 and typically generates the screen display illustrated in FIG. 82.

Process 3007 of FIG. 126 typically comprises the Activation.pas unit listed in Appendix 9 and typically generates the screen display illustrated in FIG. 83.

Process 3008 of FIG. 126 typically comprises the SetCondition.pas unit listed in Appendix 9 and typically generates the screen display illustrated in FIG. 84.

FIG. 127 is a simplified flowchart illustration of a preferred mode of operation for process 3010 of FIG. 126. The method of FIG. 127 typically prompts the designer to associate components with a procedure step.

Process 3011 of FIG. 127 allows the designer to view the components already associated with the selected procedure step, as illustrated in FIG. 83.

Process 3012 of FIG. 127 sets the Windows hooks for capturing the user's actions using subunit 210 of FIG. 124. Process 3012 is typically actuated by a developer's activation of the Get UI Component button of FIG. 83.

Process 3013 of FIG. 127 receives messages from the Hook DLL as described above with reference to subunit 230 of FIG. 124.

Process 3014 of FIG. 127 interprets the messages and elicits the component attributes, as described above with reference to subunits 240 and 250 of FIG. 124.

Process 3015 of FIG. 127 saves the component attributes in the Component table as described above with reference to FIG. 137.

Process 3016 of FIG. 127 prompts the user to associate any of the captured components to the procedure step which is displayed on the screen.

FIG. 128 is a simplified flowchart illustration of a preferred mode of operation for process 3020 of FIG. 126. The method of FIG. 128 typically prompts the designer to associate modes with tasks.

Process 3021 of FIG. 128 allows the developer to view the modes already associated with a selected task, as illustrated in FIG. 84.

Process 3022 of FIG. 128 sets the Windows hooks for capturing the user's actions using subunit 210 of FIG. 124. Process 3022 is typically actuated by a developer's activation of the Start button of FIG. 84.

Process 3023 of FIG. 128 receives messages from the Hook DLL as described above with reference to subunit 230 of FIG. 124.

Process 3024 of FIG. 128 interprets the messages and elicits the component attributes, as described above with reference to subunits 240 and 250 of FIG. 124.

Process 3025 of FIG. 128 saves the component attributes in the Component table described herein with reference to FIG. 137.

Process 3026 of FIG. 128 saves the condition in the Condition table described herein with reference to FIG. 137.

Process 3027 of FIG. 128 prompts the developer to specify the expected likelihood of the condition occurring in association with a user task.

FIG. 129 is a simplified flowchart illustration of a preferred mode of operation for unit 32 of FIG. 1.

Process 3210 of FIG. 129 typically comprises the GetIndicator.pas unit listed in Appendix 10 and typically generates the screen display illustrated in FIG. 85. Process 3220 of FIG. 129 sets the Windows hooks for capturing the user's actions using subunit 210 of FIG. 124. Process 3220 is actuated by a developer's activation of the Start button of FIG. 85.

Process 3230 of FIG. 129 typically comprises the GetIndicator.pas unit listed in Appendix 11 and typically generates the screen display illustrated in FIG. 86. Process 3230 typically receives messages from the Hook DLL described above with reference to subunit 230 of FIG. 124.

Process 3240 of FIG. 129 interprets the messages and elicits the component attributes, as described above with reference to subunits 240 and 250 of FIG. 124.

Process 3250 of FIG. 129 saves the component attributes in the Component table described herein with reference to FIG. 137.

Process 3260 of FIG. 129 saves the problem indicators in the Indicator table described herein with reference to FIG. 137.

Process 3270 of FIG. 129 prompts the user to define the type of indicator in the Indicator table described herein with reference to FIG. 137.

FIG. 130 is a simplified flowchart illustration of a preferred mode of operation for unit 36 of FIG. 1.

Process 3610 typically comprises the RTmonitor.pas unit listed in Appendix 11 and typically generates the screen display illustrated in FIG. 87.

Process 3620 of FIG. 130 sets the Windows hooks for capturing the user's actions using subunit 210 of FIG. 124. Process 3620 is actuated by the end user's activation of either the Start button or the Learn User Interface button of FIG. 87.

Process 3630 of FIG. 130 typically comprises the GetUserAction.pas unit listed in Appendix 11 and typically generates the screen display illustrated in FIG. 88. Process 3630 receives messages from the Hook DLL as described above with reference to subunit 230 of FIG. 124.

Process 3640 of FIG. 130 interprets the messages and elicits the component attributes, as described above with reference to subunits 240 and 250 of FIG. 124.

Process 3650 of FIG. 130 saves the component attributes in the Action table described herein with reference to FIG. 137.

FIG. 131 is a simplified flowchart illustration of a preferred mode of operation for unit 40 of FIG. 1. The method of FIG. 131 is operative to identify user difficulty in operating a computerized system.

Process 4010 of FIG. 131 looks for the component identifier in the ProblemIndicator table described herein with reference to FIG. 137.

Process 4020 of FIG. 131 retrieves the type of problem indicator from the ProblemIndicator table described herein with reference to FIG. 137.

Process 4030 of FIG. 131 computes the time elapsed from the most recent user activation of a user interface component.

Process 4040 of FIG. 131 compares the time elapsed to the threshold for deciding that the user delay in activating the computerized system is an indication of putative difficulty.

Process 4050 of FIG. 131 is a dialog with the user, prompting her to report on her difficulty, as described herein with reference to FIG. 131.

Process 4060 of FIG. 131 saves the time for the last action for later use, for computing the elapsed time as described above with reference to Process 4030 of FIG. 131.

FIG. 132 is a simplified flowchart illustration of a preferred mode of operation for process 4050 of FIG. 131. The method of FIG. 131 prompts the end user to report the difficulty s/he encounters when operating the computerized system.

Process 4051 of FIG. 132 prompts the end user to report her difficulty according to the identified type of putative user difficulty described in FIG. 131, as follows:

According to the Pascal unit OnDelay.pas listed in Appendix 11 as illustrated in FIG. 89, if the putative user difficulty is identified as delay in the user response According to the Pascal unit OnCancel.pas listed in Appendix 11 as illustrated in FIG. 91, if the putative user difficulty is identified as a 'Cancel' request According to the Pascal unit OnHelp.pas listed in Appendix 11 as illustrated in FIG. 92, if the putative user difficulty is identified as a 'Help' request According to the Pascal unit OnUndo.pas listed in Appendix 11 as illustrated in FIG. 93, if the putative user difficulty is identified as an 'Undo' request.

Process 4052 of FIG. 132 is activated when the end user activates the Ignore button of the screen display of process 4051 of FIG. 132. Process 4052 of FIG. 132 prompts the user to report her intention according to the identified type of putative user difficulty described in FIG. 131, as follows:

According to the Pascal unit OnIgnoreDelay.pas listed in Appendix 11 as illustrated in FIG. 90, if the putative user difficulty is identified as a delay in the user response According to the Pascal unit OnIgnore.pas listed in Appendix 11 as illustrated in FIG. 94, if the type of putative user difficulty identified is any of the following: 'Cancel', 'Help' or 'Undo'.

Process 4053 of FIG. 132 typically comprises the OnTips.pas unit listed in Appendix 11 and typically generates the screen display illustrated in FIG. 95. Process 4053 is activated when the end user activates the Tips button in any of the screen displays illustrated in FIGS. 90, 91, 92, 93 and 94. Process 4053 presents to the end user instructions on how to initiate a reporting session manually and how to avoid the interruption of fluent operation in subsequent instances of putative user difficulty.

Process 4054 of FIG. 132 typically comprises the InquireComponent.pas unit listed in Appendix 11 and typically generates the screen display illustrated in FIG. 96. Process 4054 typically presents a list of the tasks that are associated with the user interface component actuated just before the component that indicates a putative user difficulty.

Process 4055 of FIG. 132 is a dialog with the end user, prompting her to specify her intention by a sequence of list selections following the task breakdown of database 34, as described herein with reference to FIG. 133.

FIG. 133 is a simplified flowchart illustration of a preferred mode of operation for unit 50 of FIG. 1. The method of FIG. 133 holds dialog to the end user intention.

Process 5010 of FIG. 133 typically comprises the InquireMainTask.pas unit listed in Appendix 11 and typically generates the screen display illustrated in FIG. 97. Process 5010 typically prompts the end user to select the intended main task from a list.

Process 5020 of FIG. 133 typically comprises the InquireSubTask.pas unit listed in Appendix 11 and typically generates the screen display illustrated in FIG. 98. Process 5020 typically prompts the user to select the intended subtask from a list.

Process 5030 of FIG. 133 typically comprises the InquireGoal.pas unit listed in Appendix 11 and typically generates the screen display illustrated in FIG. 99. Process 5030 typically prompts the end user to select the intended goal from a list.

Process 5040 of FIG. 133 typically comprises the InquireMethod.pas unit listed in Appendix 11 and typically generates the screen display illustrated in FIG. 100. Process 5040 typically prompts the end user to select the intended method from a list.

Process 5050 of FIG. 133 typically comprises the InquireStep.pas unit listed in Appendix 11 and typically generates the screen display illustrated in FIG. 101. Process 5050 typically prompts the end user to select the intended procedure step from a list.

Process 5060 of FIG. 133 typically comprises the ShowReason.pas unit listed in Appendix 11 and typically generates the screen display illustrated in FIG. 105. Process 5060 typically presents to the end user the input options designed to actuate the specified procedure step, as well as the user interface component the user actually invoked.

Process 5070 of FIG. 133 typically comprises the ModeError.pas unit listed in Appendix 11 and typically generates the screen display illustrated in FIG. 106. Process 5070 typically presents to the end user a list of the system modes relating to a specified user task.

Process 5080 of FIG. 133 typically comprises the TaskNotFound.pas unit listed in Appendix 11 and typically generates the screen display illustrated in FIG. 102. Process 5080 typically prompts the end user to check the boxes corresponding to sources of user information where s/he looked for the instructions on how to accomplish a user task.

Process 5090 of FIG. 133 typically comprises the Promise.pas unit listed in Appendix 11 and typically generates the screen display illustrated in FIG. 103. Process 5090 typically notifies the end user about the reporting of the difficulty the end user has encountered to the developers of the computerized system.

FIG. 134 is a simplified flowchart illustration of a preferred mode of operation for unit 90 of FIG. 1. The method of FIG. 134 is preferably operative to provide to the software developer/evaluator of the computerized system detailed information and statistics on situations of user difficulty, to propose changes in the user interface that may reduce these situations and to receive input from the software developer/evaluator for use as requirements by the software developer/designer and as help desk information by the software technical assistant.

Process 9010 of FIG. 134 typically comprises the ComponentUsage.pas unit listed in Appendix 12 and typically generates the screen display illustrated in FIG. 108. Process 9010 typically shows the total number and the total time the end user has spent when using each of the input options.

Process 9012 of FIG. 134 typically comprises the ConflictSummary.pas unit listed in Appendix 12 and typically generates the screen display illustrated in FIG. 109. Process 9020 typically shows the total number and the total time the end user has wasted to recover from an error in using the input options, accumulated by types of errors. Process 9012 typically provides recommendations for changes in the user interface design. Process 9012 typically allows the software developer to enter notes for design changes and for technical assistance.

Process 9014 of FIG. 134 typically comprises the ConflictReport.pas unit listed in Appendix 12 and typically generates the screen display illustrated in FIG. 110. Process 9014 typically shows a list of the instances of confusion between a particular pair of input options.

Process 9020 of FIG. 134 typically comprises the GoalSummary.pas unit listed in Appendix 12 and typically generates the screen display illustrated in FIG. 112. Process 9020 typically shows the total number and the total time the end user has wasted when looking for her intended goal in the list of goals associated with a particular subtask. Process 9020 typically allows the developer to enter notes for design changes and for technical assistance.

Process 9022 of FIG. 134 typically comprises the User-Term.pas unit listed in Appendix 12 and typically generates the screen display illustrated in FIG. 113. Process 9022 typically presents a list of the user intentions which the user could not find in the user task breakdown database 34, phrased in her own words.

Process 9024 of FIG. 134 typically comprises the Solve-Term.pas unit listed in Appendix 12 and typically generates the screen display illustrated in FIG. 114. Process 9024 typically allows the developer to change the terms stored in the user task database 34.

Process 9030 of FIG. 134 typically comprises the ProcedureSummary.pas unit listed in Appendix 12 and typically generates the screen display illustrated in FIG. 115. Process 9030 typically shows the total number and the total time the end user has wasted when looking for the operational procedure required to accomplish an intended goal. Process 9030 typically classifies the problems of knowing the operational procedures by the source of information, comprising on-line help information and user documentation, which the end user looked in order to find the required operational procedure. Process 9030 typically allows the developer to enter notes for design changes and for technical assistance.

Process 9032 of FIG. 134 typically comprises the ProcedureKnowledgeReport.pas unit listed in Appendix 12 and typically generates the screen display illustrated in FIG. 116. Process 9032 typically shows a list of the instances of failure in finding the operational procedure associated with a particular goal.

Process 9040 of FIG. 134 typically comprises the ModeErrorSummary.pas unit listed in Appendix 12 and typically generates the screen display illustrated in FIG. 117. Process 9040 typically shows the total number and the total time the end user has wasted because of error modes. Process 9040 typically classifies the error modes by the user task and by the user interface component, such as check box or radio button, whose state determines the system mode. Process 9040 typically provides recommendations for changes in the user interface design. Process 9040 typically allows the developer to enter notes for design changes and for technical assistance.

Process 9042 of FIG. 134 typically comprises the ModeReport.pas unit listed in Appendix 12 and typically generates the screen display illustrated in FIG. 118. Process 9042 typically shows a list of instances of mode errors associated with a particular user task and condition.

Process 9050 of FIG. 134 typically comprises the BackTrack.pas unit listed in Appendix 12 and typically generates the screen display illustrated in FIG. 111. Process 9050 typically allows the software evaluator to review the record of user activation of input options, typically synchronized using time stamp with a particular instance of reported user difficulties.

FIG. 135 is a simplified flowchart illustration of a preferred mode of operation for unit 100 of FIG. 1. The method of FIG. 135 is preferably operative to provide to personnel of the help desk of the computerized system, information about common usability problems, which is useful to answer user calls for technical assistance. Process 10010 of FIG. 135 typically comprises the HelpByUserIntention.pas unit listed in Appendix 12 and typically generates the screen display illustrated in FIG. 119. Process 10010 typically allows the technical assistant to set the task and sub task elicited from the end user and to view the associated note generated for technical assistance by developer's access unit 90.

Process 10020 of FIG. 135 typically comprises the HelpGoal.pas unit listed in Appendix 12 and typically generates the screen display illustrated in FIG. 120. Process 10020 typically allows the technical assistant to set the intended goal elicited from the end user and to view the associated note generated for technical assistance by developer's access unit 90.

Process 10030 of FIG. 135 typically comprises the HelpProcedure.pas unit listed in Appendix 12 and typically generates the screen display illustrated in FIG. 121. Process 10030 typically allows the technical assistant to set the intended method and procedure step elicited from the end user.

Process 10040 of FIG. 135 typically comprises the AssociatedComponents.pas unit listed in Appendix 12 and typically generates the screen display illustrated in FIG. 122. Process 10040 typically presents to the technical assistant the input options designed to operate a particular procedure step.

Process 10050 of FIG. 135 typically comprises the User-Term.pas unit listed in Appendix 12 and typically generates the screen display illustrated in FIG. 113. Process 10050 typically allows the technical assistant to view a list of the user intentions which the user could not find in the user task breakdown database 34, phrased in her own words.

Process 10060 of FIG. 135 typically comprises the ProcedureKnowledgeReport.pas unit listed in Appendix 12 and typically generates the screen display illustrated in FIG. 116. Process 10060 typically allows a technical assistant to view a list of the instances of failure in finding the operational procedure associated with a particular goal.

The terms "input option" and "user interface component" are used generally interchangeably.

The terms "user difficulty" and "usability problem" are used generally interchangeably.

The terms "help desk" and "technical assistance" are used generally interchangeably.

The terms "mode", "state" and "condition" are used generally interchangeably. Levels within a hierarchy of functions performed by a computerized system are referred to herein as "main task" (highest level), "subtask" (next level) and "goal" (lowest level). An "intention" is a decision made by the user to cause the system to perform a particular sequence of one or more of its functions.

The illustrated embodiments of the present invention are useful for monitoring usability of Windows-based computerized systems however it is appreciated that more generally, the invention shown and described herein is applicable to any type of family of computerized systems or even to computerized systems in general.

It is appreciated that the software components of the present invention may, if desired, be implemented in ROM (read-only memory) form. The software components may, generally, be implemented in hardware, if desired, using conventional techniques.

It is appreciated that the particular embodiment described in the Figures and Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. Computerized apparatus for identifying usability problems occurring in the course of operating a computerized system, the apparatus including:
    a candidate usability problem identifier operative to generate records of occurrences of putative usability problems by monitoring an end user who is using the computerized system;
    a candidate usability problem database operative to store the records of occurrences of putative usability problems; and
    a database accessing unit operative to access the database and to derive therefrom information useful for resolving the usability problems.

2. Apparatus according to claim 1 wherein the database accessing unit includes a helpdesk access unit operative to access the database and to derive therefrom, on-line, information useful for operating a helpdesk.

3. Apparatus according to claim 1 wherein the database accessing unit includes a developer's access unit operative to access the database and to derive therefrom information useful for redesigning the computerized system.

4. Computerized apparatus for identifying human difficulties in operating a computerized system, the apparatus including:
    a human difficulty identifier operative to identify putative instances of an end user's experience of difficulty in operating the computerized system;
    an operation recorder operative to store a record of the end user's operations during each said putative instance; and
    an output generator operative to generate an output indication of the record of operations for each of the putative instances of experiences of difficulty.

5. Apparatus for identifying usability problems encountered when using developer-defined computerized systems each having a user interface, the apparatus including:
    a user interface description elicitor operative to elicit from a developer of a developer-defined computerized system, and to record, a description of the user interface of the computerized system;
    a usability problem recorder operative to record usability problem data; and
    a usability problem occurrence analyzer using the description to analyze occurrences of usability problems recorded by the usability problem recorder.

6. Apparatus according to claim 5 wherein the usability problem recorder is operative to monitor an end user's interaction with the computerized system in order to identify automatically detectable usability problems.

7. Apparatus according to claim 6 wherein the usability problem recorder is also operative to request the end user's confirmation of automatically detectable usability problems.

8. Apparatus according to claim 6 wherein the usability problem recorder is operative to accept a user-initiated report of a usability problem.

9. Apparatus according to claim 5 wherein the usability problem recorder is operative to accept a user-initiated report of a usability problem.

10. Apparatus according to claim 5 wherein the user interface description elicitor is operative to store associations between components of a user interface of a computerized system and between functions of the computerized system.

11. Apparatus according to claim 5 wherein the user interface includes a plurality of input options, the apparatus also including an input option frequency recorder operative to accumulate input option frequency information including frequency of utilization for each of said plurality of input options.

12. Apparatus according to claim 11 and also including a user interface redeveloper operative to recommend a modification of at least a portion of the user interface based at least partly on the input option frequency information.

13. Apparatus according to claim 12 and also including a user interface redeveloper operative to recommend a modification of at least a portion of the user interface based at least partly on the usability problem data.

14. Apparatus according to claim 5 wherein the usability problem data includes a record of each occurrence of a usability problem, expressed in terms of the description.

15. Apparatus according to claim 5 wherein the usability problem recorder is operative, when recording the occurrence of a usability problem, to prompt the end user to indicate his intention when the usability problem occurred.

16. Apparatus according to claim 15 wherein the usability problem recorder is operative to accept from an end user an explanation of his intention phrased in his own words.

17. Apparatus according to claim 15 wherein the capability problem recorder is operative to prompt an end user to indicate his intention as a combination of at least one functions of a computerized system.

18. Apparatus according to claim 15 and also including a troubleshooter operative to troubleshoot by analyzing an end user's indicated intention.

19. Apparatus for developing a computerized system operative to perform a multiplicity of system functions responsive to a corresponding multiplicity of user interface components respectively, the multiplicity of user interface components forming a user interface, the apparatus including a computerized system usage statistics accumulator operative to accumulate computerized statistics regarding usage of the computerized system; and a user interface modification aid operative to propose a modification of the user interface based on the computerized statistics; a user interface description elicitor operative to elicit from a developer of a developer-defined computerized system, and to record, a description of the user interface of the computerized system; a usability problem recorder operative to record usability problem data; and a usability problem occurrence analyzer using the description to analyze occurrences of usability problems recorded by the usability problem recorder.

20. Apparatus according to claim 19 wherein the computerized system usage statistics accumulator includes a user difficulty accumulator operative to accumulate computerized statistics regarding difficulties encountered by end users of the computerized system.

21. Apparatus according to claim 20 wherein if the statistics indicate that an individual user interface compo nent causes substantial difficulty, the user interface modification aid is operative to propose that the user interface be modified such that the system function is not performed responsive to the individual user interface component.

22. Apparatus according to claim 20 wherein the user difficulty accumulator is operative to identify mode errors based on the computerized statistics regarding difficulties.

23. Apparatus according to claim 19 wherein the computerized system usage statistics accumulator includes a user interface component counter operative to count the number of times each user interface component is activated by at least one end user of the computerized system.

* * * * *